US 8,290,347 B2

(12) United States Patent
Yahata et al.

(10) Patent No.: US 8,290,347 B2
(45) Date of Patent: Oct. 16, 2012

(54) INFORMATION RECORDING MEDIUM, AND APPARATUS AND METHOD FOR RECORDING INFORMATION TO INFORMATION RECORDING MEDIUM

(75) Inventors: Hiroshi Yahata, Kadomi (JP); Tomotaka Yagi, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 1718 days.

(21) Appl. No.: 11/593,513

(22) Filed: Nov. 7, 2006

(65) Prior Publication Data
US 2007/0053663 A1    Mar. 8, 2007

Related U.S. Application Data

(62) Division of application No. 10/552,372, filed as application No. PCT/JP2004/004997 on Apr. 7, 2004, now Pat. No. 7,274,861.

(30) Foreign Application Priority Data

Apr. 10, 2003   (JP) .................................. 2003-106399

(51) Int. Cl.
*H04N 5/84*   (2006.01)
(52) U.S. Cl. ........................................ 386/334; 386/330
(58) Field of Classification Search ........................ None
See application file for complete search history.

(56) References Cited

U.S. PATENT DOCUMENTS

| | | | |
|---|---|---|---|
| 5,373,498 A | 12/1994 | Tagiri | |
| 5,392,344 A | 2/1995 | Ash et al. | |
| 5,619,337 A | 4/1997 | Naimpally | |
| 5,699,117 A | 12/1997 | Uramoto et al. | |
| 5,949,792 A * | 9/1999 | Yasuda et al. | ................. 370/474 |
| 6,011,896 A | 1/2000 | Higurashi et al. | |
| 6,014,368 A | 1/2000 | Sanami | |
| 6,122,436 A | 9/2000 | Okada et al. | |
| 6,125,432 A | 9/2000 | Hanami et al. | |
| 6,141,490 A | 10/2000 | Oishi et al. | |
| 6,211,800 B1 | 4/2001 | Yanagihara et al. | |

(Continued)

FOREIGN PATENT DOCUMENTS

EP    0 535 857    4/1993

(Continued)

OTHER PUBLICATIONS

U.S. Patent Office Action dated Jul. 7, 2009 issued in U.S. Appl. No. 10/484,453.

(Continued)

*Primary Examiner* — Sath V Perungavoor
*Assistant Examiner* — Christopher Findley
(74) *Attorney, Agent, or Firm* — Wenderoth, Lind & Ponack, L.L.P.

(57)    ABSTRACT

Provided is an information recording medium which achieves high speed conversion of a signal input externally from MPEG-TS to MPEG-PS complying with DVD standard. An apparatus and a method for recording information to the information recording medium are also provided. A constrained format which enables conversion from a first stream (for example, MPEG transport stream) to a second stream (for example, MPEG program stream) is provided. The constrained format defines that a presentation order of the video information including continuous complete data block starts at a top field (Pf) and ends at a bottom field (Pl). The continuous complete data block is included in a reference time (STC) of continuous presentation of video information and audio information with the reference time including at least one data block.

8 Claims, 89 Drawing Sheets

PCR PACKET : ▽

CONTINOUS STC SECTION (STC-sequence)

| INCOMPLETE SESF capsule | COMPLETE SESF capsule | (COMPLETE SESF capsules) | COMPLETE SESF capsule | INCOMPLETE SESF capsule |

TOP
BOTTOM

Pf                Pl

U.S. PATENT DOCUMENTS

| | | |
|---|---|---|
| 6,236,663 B1 | 5/2001 | Kawakami |
| 6,266,483 B1 | 7/2001 | Okada et al. |
| 6,289,169 B1 | 9/2001 | Okuyama |
| 6,374,037 B1 | 4/2002 | Okada et al. |
| 6,445,877 B1 | 9/2002 | Okada et al. |
| 6,456,783 B1 | 9/2002 | Ando et al. |
| 6,470,135 B1 | 10/2002 | Kim et al. |
| 6,504,996 B1 | 1/2003 | Na et al. |
| 6,567,409 B1 | 5/2003 | Tozaki et al. |
| 6,594,442 B1 | 7/2003 | Kageyama et al. |
| 6,671,323 B1 | 12/2003 | Tahara et al. |
| 6,724,981 B1 | 4/2004 | Park et al. |
| 6,741,793 B1 | 5/2004 | Sugiyama |
| 6,741,795 B1 | 5/2004 | Takehiko et al. |
| 6,801,707 B1 | 10/2004 | Harumoto et al. |
| 6,868,125 B2 | 3/2005 | Gendel |
| 6,873,629 B2 | 3/2005 | Morris |
| 6,901,078 B2 | 5/2005 | Morris |
| 6,973,258 B1 | 12/2005 | Yoo et al. |
| 7,292,781 B1 | 11/2007 | Ito et al. |
| 2001/0009548 A1 | 7/2001 | Morris |
| 2002/0018643 A1 | 2/2002 | Okada et al. |
| 2002/0064376 A1 | 5/2002 | Fukushima |
| 2002/0196857 A1 | 12/2002 | Kono et al. |
| 2003/0128970 A1 | 7/2003 | Lan et al. |
| 2003/0133699 A1 | 7/2003 | Ando et al. |
| 2003/0170008 A1* | 9/2003 | Ohiro et al. .................... 386/111 |
| 2004/0184764 A1 | 9/2004 | Yagi et al. |
| 2004/0208135 A1 | 10/2004 | Nakamura et al. |
| 2004/0240856 A1 | 12/2004 | Yahata et al. |

FOREIGN PATENT DOCUMENTS

| | | |
|---|---|---|
| EP | 0 731 422 | 9/1996 |
| EP | 0 785 675 | 7/1997 |
| EP | 0 805 601 | 11/1997 |
| EP | 0 843 482 | 5/1998 |
| EP | 0 899 964 | 3/1999 |
| EP | 0 949 825 | 10/1999 |
| EP | 0 965 991 | 12/1999 |
| EP | 0 994 480 | 4/2000 |
| EP | 1 003 337 | 5/2000 |
| EP | 1 021 048 | 7/2000 |
| EP | 1 030 307 | 8/2000 |
| EP | 1 032 203 | 8/2000 |
| EP | 1 085 465 | 3/2001 |
| EP | 1 087 402 | 3/2001 |
| EP | 1 209 922 | 5/2002 |
| EP | 1 271 959 | 1/2003 |
| EP | 1 377 053 | 1/2004 |
| EP | 1 422 710 | 5/2004 |
| HU | 224 095 | 4/2001 |
| JP | 7-170327 A | 7/1995 |
| JP | 8-123953 A | 5/1996 |
| JP | 8-251595 A | 9/1996 |
| JP | 10-83632 A | 3/1998 |
| JP | 10-210504 | 8/1998 |
| JP | 11-127438 | 5/1999 |
| JP | 2000-187963 | 7/2000 |
| JP | 2000-217066 | 8/2000 |
| JP | 2000-268537 | 9/2000 |
| JP | 2000-312341 A | 11/2000 |
| JP | 2000-324070 | 11/2000 |
| JP | 2002-290894 | 10/2002 |
| JP | 2002-304856 | 10/2002 |
| JP | 2002-344888 | 11/2002 |
| JP | 2003-009083 | 1/2003 |
| JP | 2003-9086 | 1/2003 |
| JP | 2003-203466 | 7/2003 |
| WO | 00/14967 | 3/2000 |
| WO | 00/30357 | 5/2000 |
| WO | 03/010766 | 2/2003 |

OTHER PUBLICATIONS

U.S. Patent Office Action mailed Sep. 12, 2007 for U.S. Appl. No. 10/552,371.

* cited by examiner

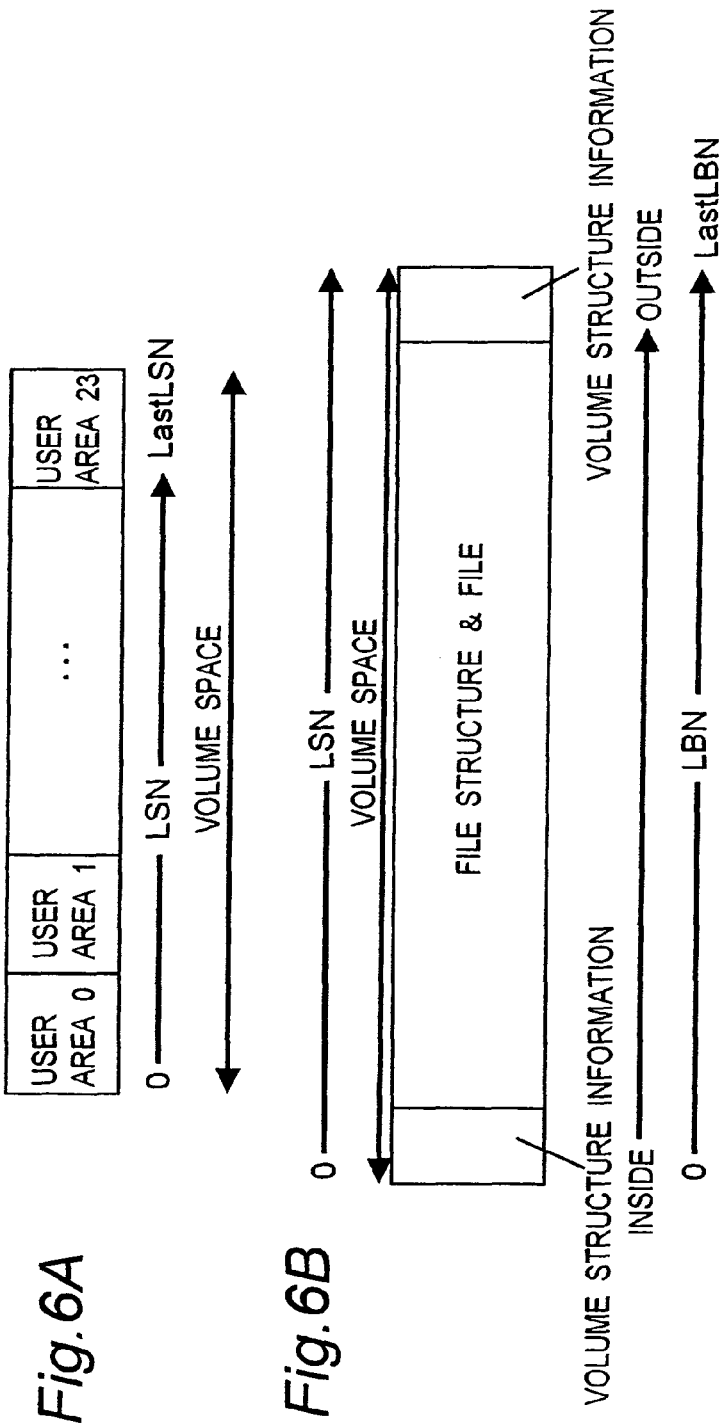

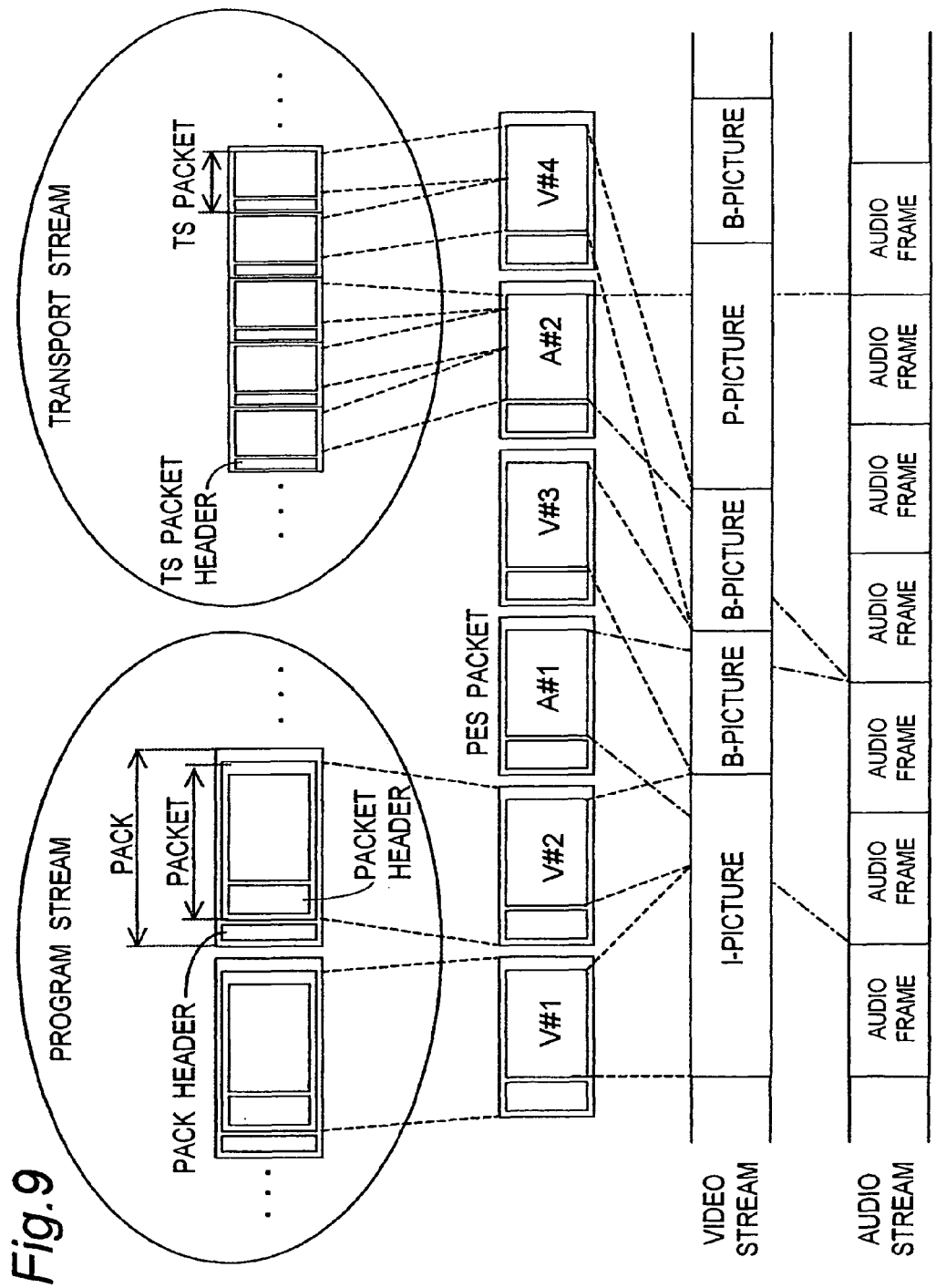

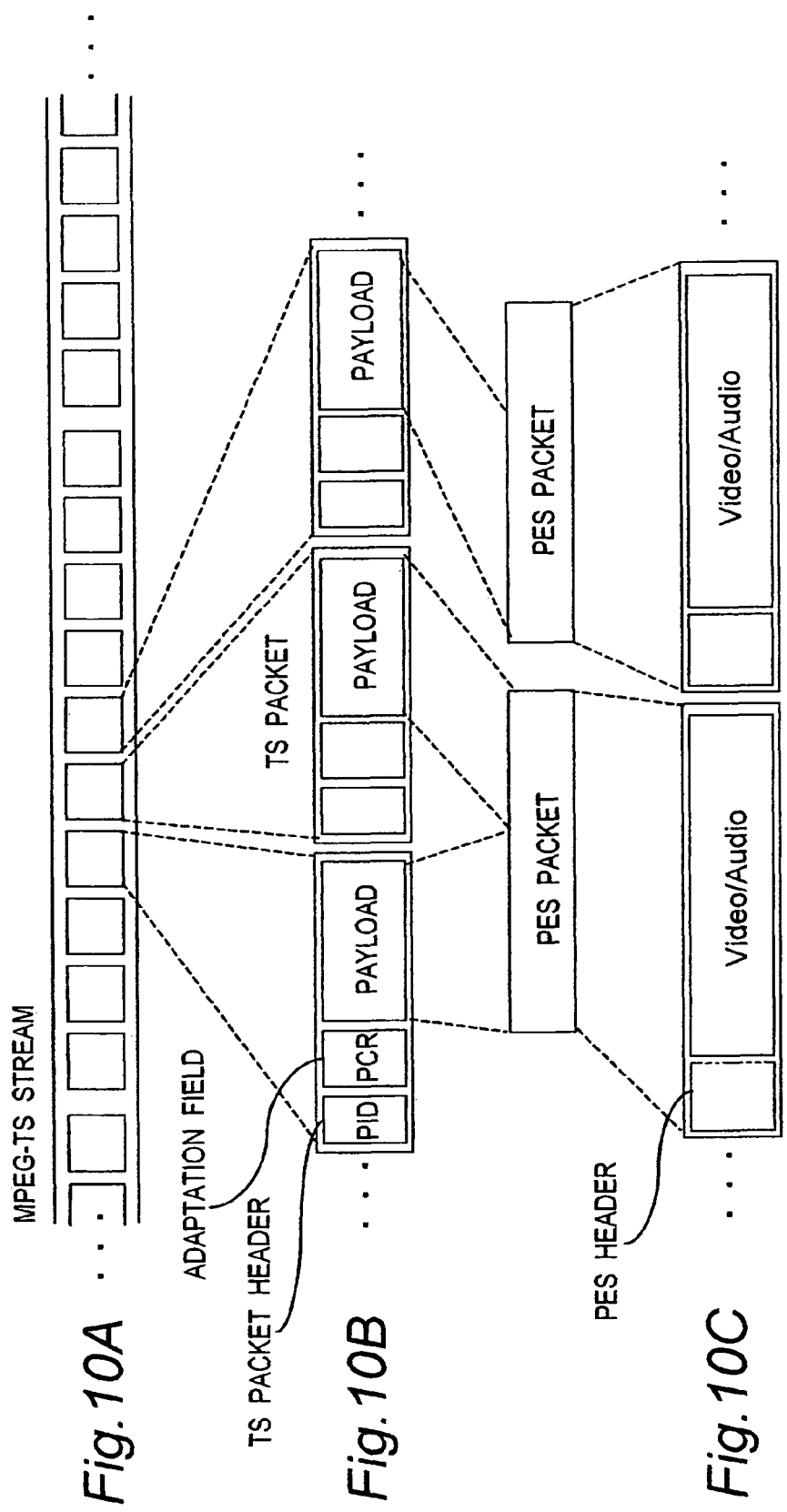

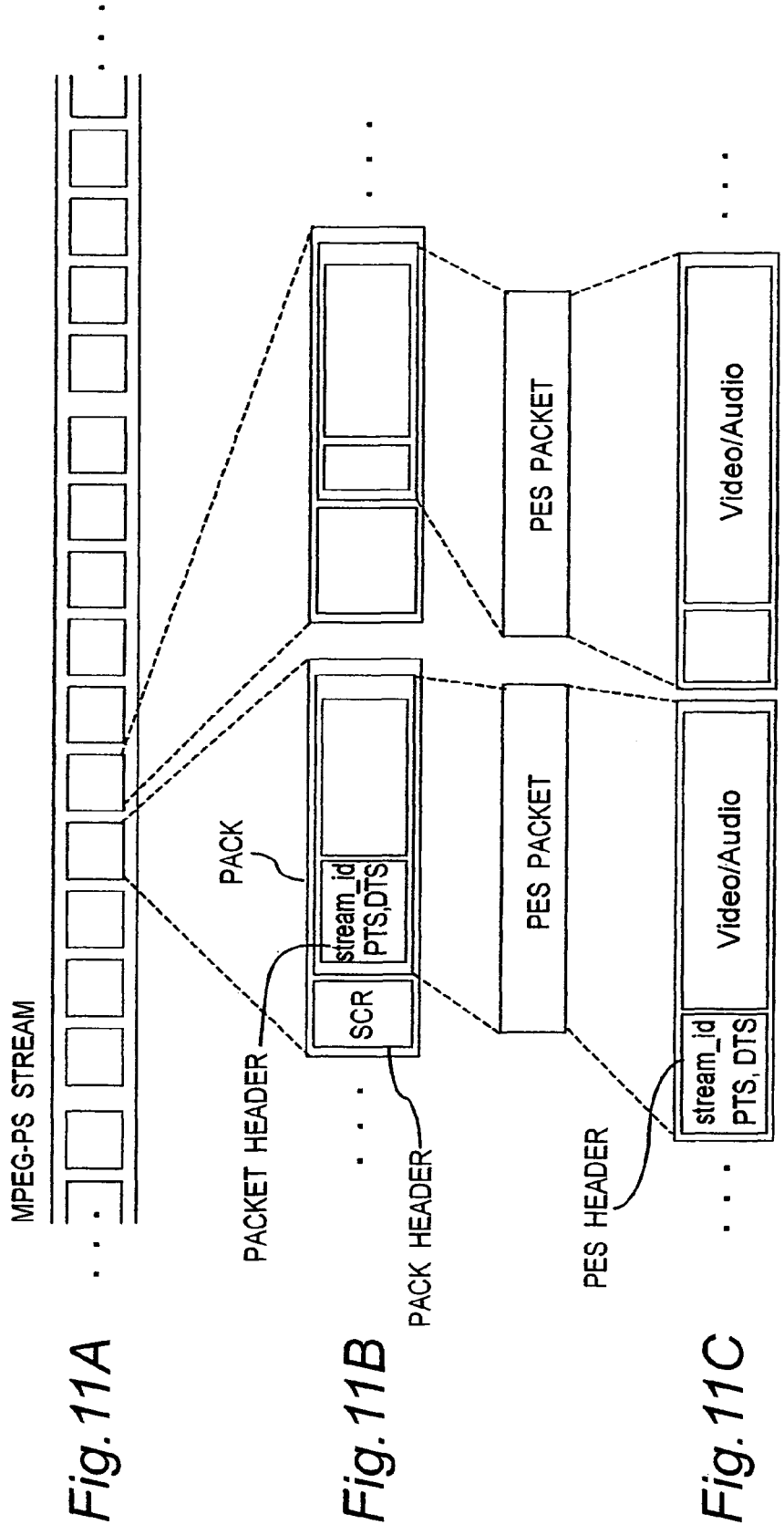

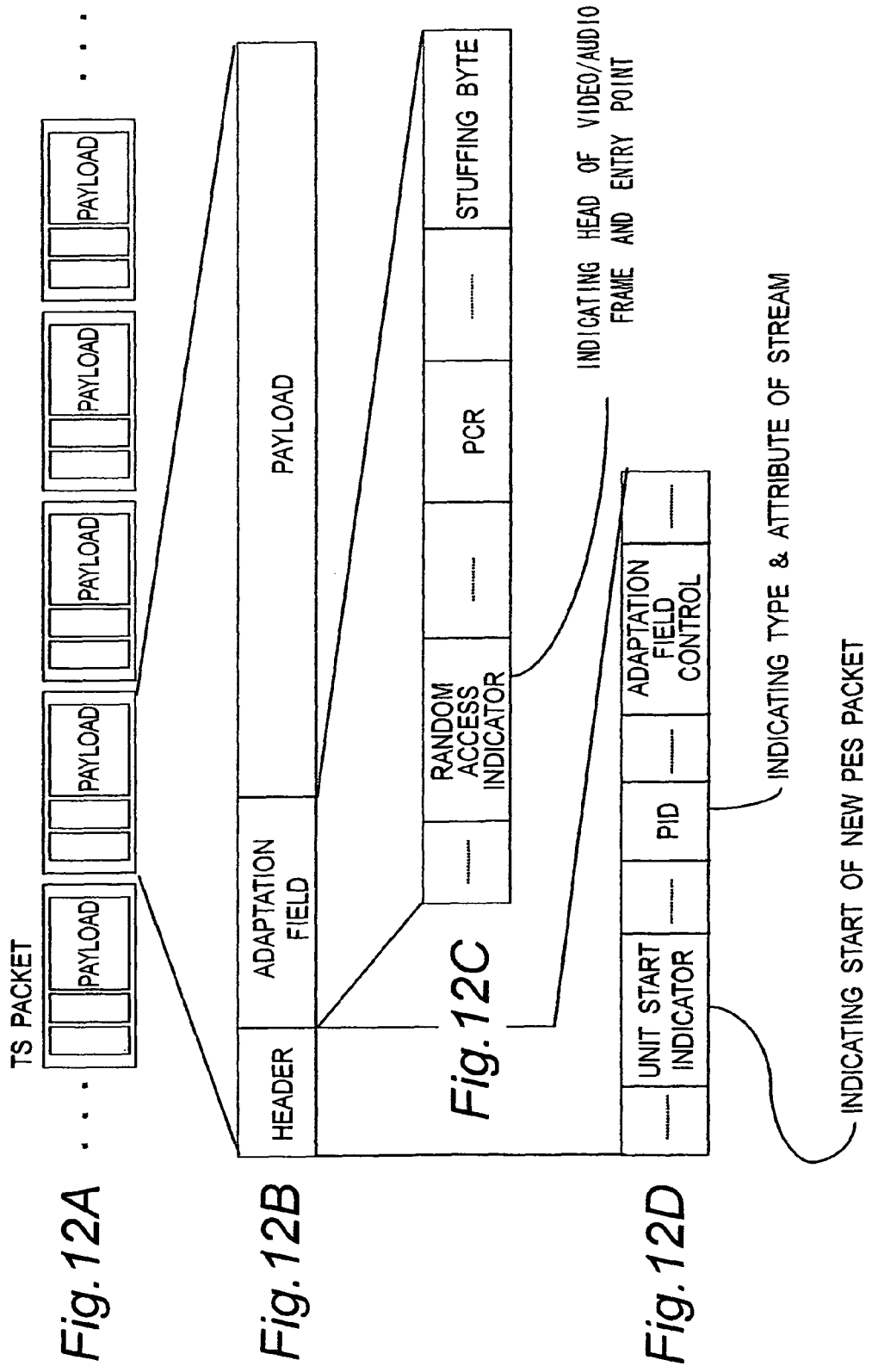

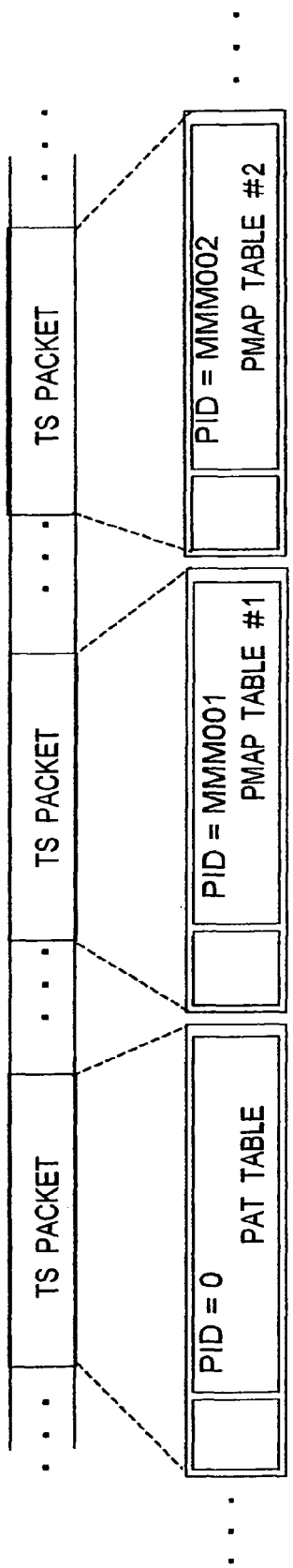

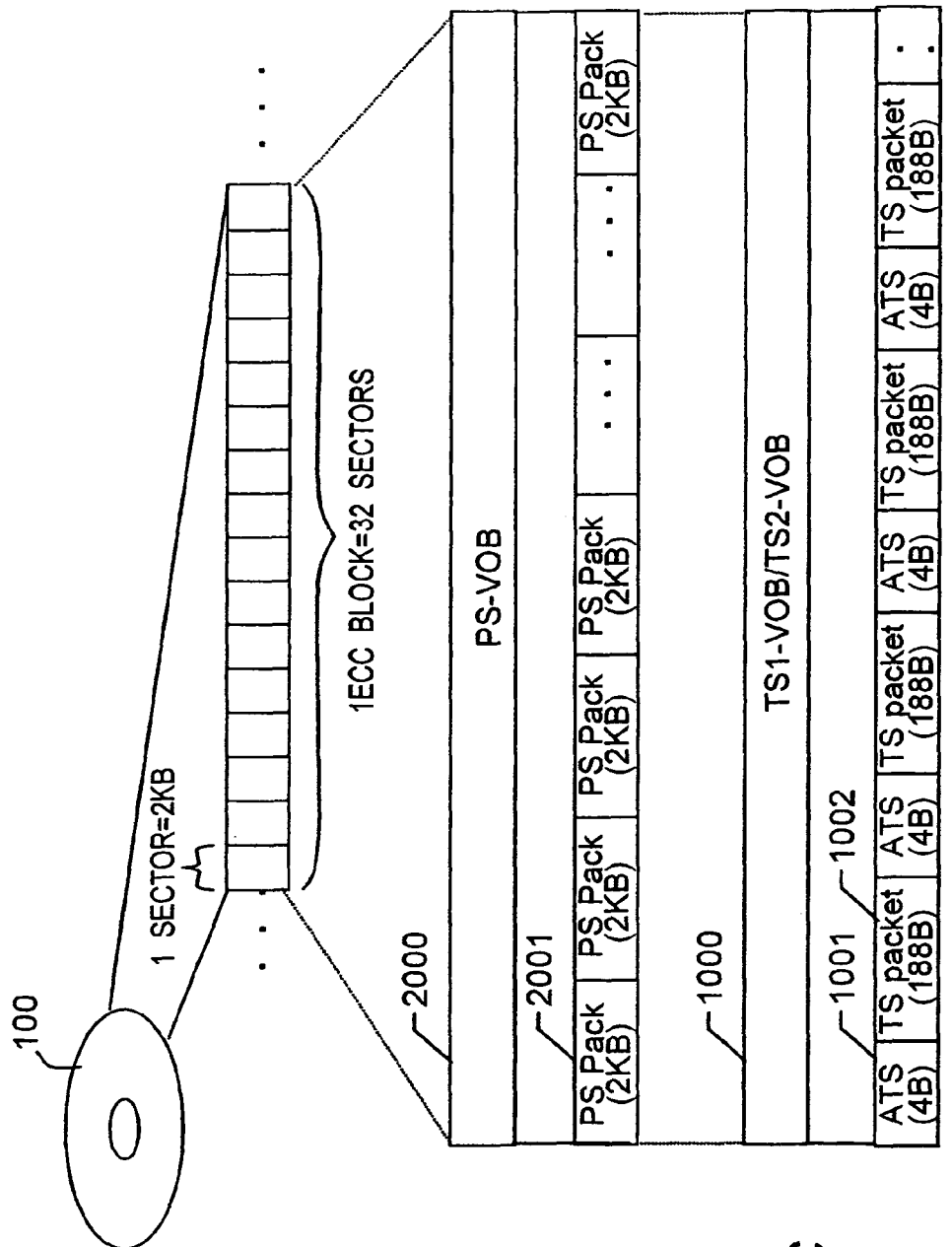

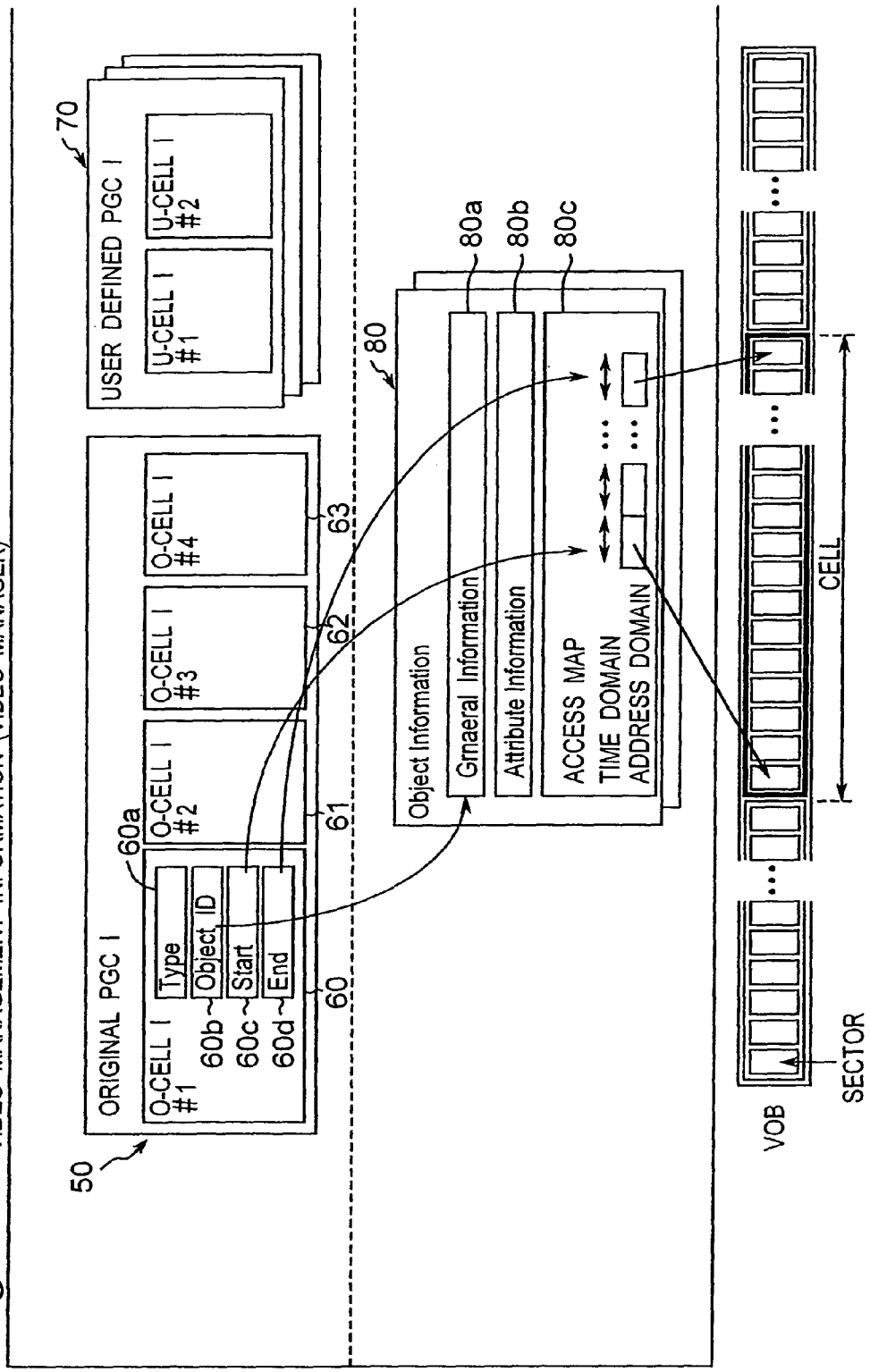
Fig.17 VIDEO MANAGEMENT INFORMATION (VIDEO MANAGER)

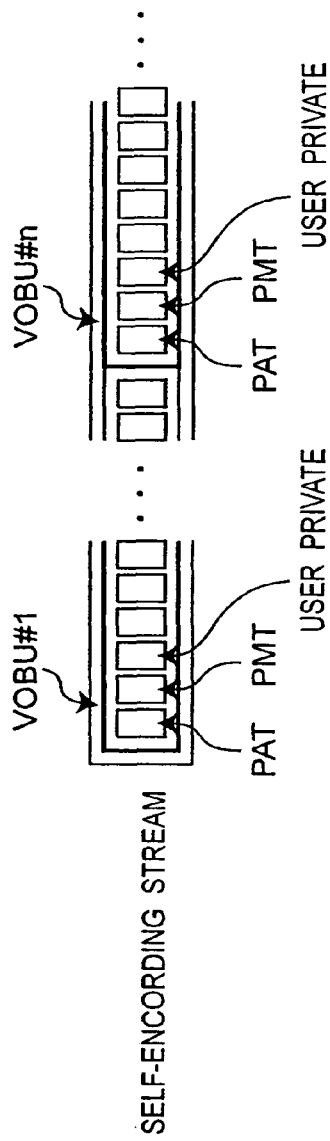
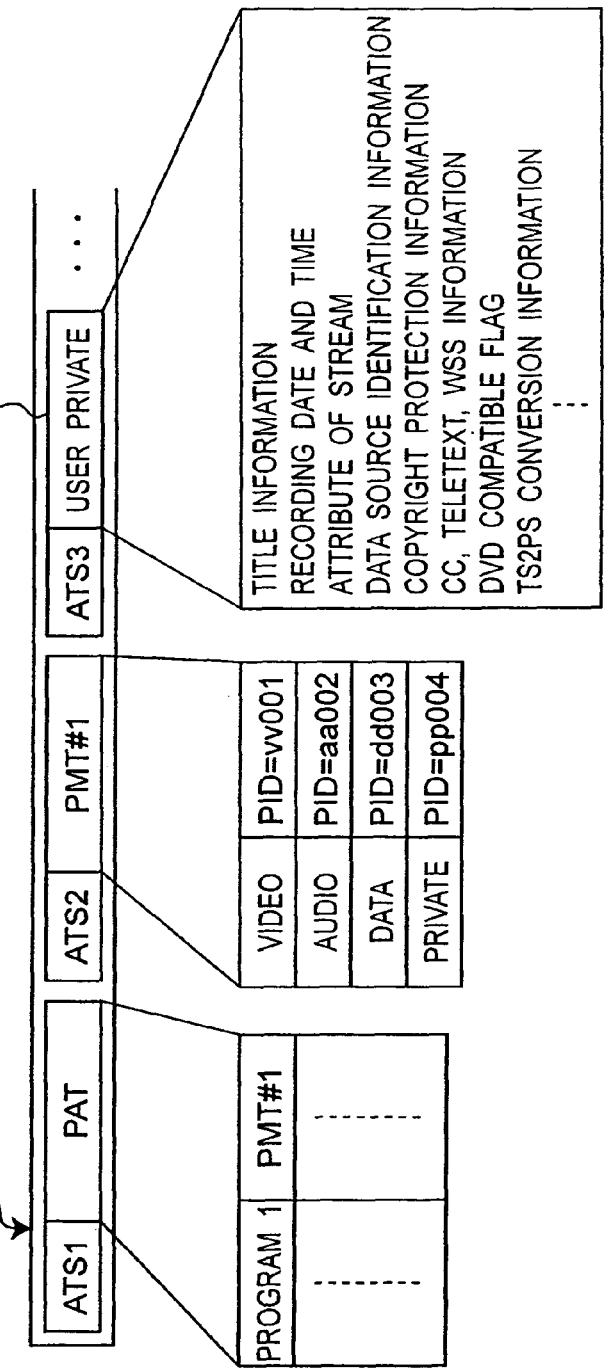
Fig. 21A
Fig. 21B

Fig. 31

```
User_Private_transport_packet() {
    sync_byte                           8b      0x47
    transport_error_indicator           1b
    payload_unit_start_indicator        1b
    transport_priority                  1b
    PID                                 13b
    transport_scrambling_control        2b
    adaptation_field_control            2b      01b     // no adaptation_field, payload only
    continuity_counter                  4b
    pointer_field                       8b      0x00    // no stuffing before private_section()
    private_section() {
        table_id                        8b      0xBF    // 0x40-0xFE for User private
        section_syntax_indicator        1b      0               // short version of private_section()
        private_indicator               1b      0               // reserved for future use
        reserved                        2b      11b
        private_section_length          12b     180             // following private_data_byte length RDI_GI (Real-time Data Information General Information)
            VOBU_S_PTM                  6B              presentation starting time of this VOBU
            Line21_data_length          1B              length of the Line21 data for this VOBU     // max.120 = 60fields * 2B DCI_CCI (Display Control Information and Copy Control Information)
            DCI_CCI_SS                  1B              Status of DCI and CCI
            DCI                         1B              Display Control Information
            CCI                         1B              Copy Control Information ES_ATRI (Elementary Stream Attribute Information)
            V_ATR                       2B              video_format(3b)/codec(3b)/resolution(3b)/bitrate(3b)/reserved(4b)   // same as DVD-Video/VR spec.
            A_ATR                       4B              codec(3b)/bitrate(5b)/channel(4b)/quantization(2b)// max. 2 audio stream // same as DVD-Video/VR spec.

if ( Line21_data_length != 0 ) {
            Line21_switch ceil((Line21_data_length/8))B  valid/invalid flags of each Line21_data
            Line21_data          (Line21_data_length)B   Line21_data
            MNF_ID                      16B
            MNF_PRI                     13-145B         148 - ceil(Line21_data_length/8) - Line21_data_length
        }
        else {
            MNF_ID                      16B
            MNF_PRI                     148B
        }
    }
}
```

(*) Ceil() means round-up

Fig.34

| | CONVERSION FROM SELF-ENCODING MPEG-TS TO DVD-Video / DVD VR FORMAT | |
|---|---|---|
| | MPEG-TS ENCODED WITH NORMAL SYSTEM ENCODE (SESF) | MPEG-TS ENCODED WITH SYSTEM ENCODE CAPABLE OF EASY CONVERSION TO MPEG-TS (CONSTRAINED SESF) |
| WHEN ENCODED TO ELEMENTARY STREAM COMPATIBLE WITH DVD-Video | (CONVERSION TO DVD-Video) ELEMENTARY CAN BE USED AS IT IS. IN RE-ENCODING TO MPEG-PS, ELEMENTARY STREAM HAS TO BE ANALYZED. THE PROCESS IS COMPLICATED. | (CONVERSION TO DVD-Video) ELEMENTARY CAN BE USED AS IT IS. IN RE-ENCODING TO MPEG-PS, ELEMENTARY STREAM DO NOT HAVE TO BE ANALYZED, AND BUFFER MANAGEMENT IS ALSO NOT NEEDED. |
| WHEN ENCODED TO ELEMENTARY STREAM COMPATIBLE WITH DVD VR | (CONVERSION TO DVD VR) ELEMENTARY CAN BE USED AS IT IS. IN RE-ENCODING TO MPEG-PS, ELEMENTARY STREAM HAS TO BE ANALYZED. THE PROCESS IS COMPLICATED. | (CONVERSION TO DVD VR) ELEMENTARY CAN BE USED AS IT IS. IN RE-ENCODING TO MPEG-PS, ELEMENTARY STREAM DO NOT HAVE TO BE ANALYZED, AND BUFFER MANAGEMENT IS ALSO NOT NEEDED. |

Fig.35

Tip PACKET

| Syntax | No. of bits | Mnemonic |
|---|---|---|
| transport_packet(){ | | |
| sync_byte | 8 | bslbf |
| transport_error_indicator | 1 | bslbf |
| payload_unit_start_indicator | 1 | bslbf |
| transport_priority | 1 | bslbf |
| PID | 13 | uimsbf |
| transport_scrambling_control | 2 | bslbf |
| adaptation_filed_control | 2 | bslbf |
| continuity_counter | 4 | uimsbf |
| adaptation_field() | | |
| Tip_Data(){ | | |
| Data_ID() | 4 * 8 | |
| display_and_copy_info() | 8 * 8 | |
| encode_info() | 141 * 8 | |
| MakersPrivateData() | 41 * 8 | |
| } | | |
| } | | |

Fig.36

| Syntax | No. of bits | Mnemonic |
|---|---|---|
| adaptation_field() { | | |
| adaptation_field_length | 8 | uimsbf |
| discontinuity_indicator | 1 | bslbf |
| random_access_indicator | 1 | bslbf |
| elementary_stream_priority_indicator | 1 | bslbf |
| PCR_flag | 1 | bslbf |
| OPCR_flag | 1 | bslbf |
| splicing_point_flag | 1 | bslbf |
| transport_private_data_flag | 1 | bslbf |
| adaptation_field_extension_flag | 1 | bslbf |
| program_clock_reference_base | 33 | uimsbf |
| reserved | 6 | bslbf |
| program_clock_reference_extension | 9 | uimsbf |
| } | | |

Fig.37

| Data_ID() | | |
|---|---|---|
| Syntax | No. of bits | Mnemonic |
| Data_ID (){ | | |
| Data_Identifier | 24 | uimsbf |
| reserved | 8 | bslbf |
| } | | |

Fig.38

| Syntax | No. of bits | Value |
|---|---|---|
| display_and_copy_info() | | |
| display_and_copy_info (){ | | |
| reserved | 40 | bslbf |
| display_control_info_status | 2 | bslbf |
| reserved | 2 | bslbf |
| copy_control_info_status | 3 | bslbf |
| reserved | 1 | bslbf |
| Aspect ratio | 4 | bslbf |
| Subtitling mode | 2 | bslbf |
| reserved | 1 | bslbf |
| Film camera mode | 1 | bslbf |
| CGMS | 2 | bslbf |
| APSTB | 2 | bslbf |
| Source | 1 | bslbf |
| reserved | 3 | bslbf |
| } | | |

Fig.39

| Syntax | No. of bits | Value |
|---|---|---|
| encode_info() | | |
| encode_info(){ | | |
|     video_resolution | 4 | bslbf |
|     reserved | 2 | bslbf |
|     encode_condition | 2 | bslbf |
|     reserved | 8 | bslbf |
|     FVFPST | 48 | bslbf |
|     reserved | 8 | bslbf |
|     PES-info() | 976(=8*122) | |
| } | | |

Fig. 40

| PES_INFO( | | |
|---|---|---|
| SYNTA | NO. OF BITS | VALU |
| PES_info(){ | | |
| for(j=0;j<136;j++){ | | |
| PES_existence_flag | 1 | bslbf |
| PES_payload_identifier | 1 | bslbf |
| If(PES_payload_identifier==0b){ | | |
| picture_coding_type | 2 | bslbf |
| } | | |
| If(PES_payload_identifier==1b){ | | |
| stream_identifier | 1 | bslbf |
| sync_presentation_flag | 1 | bslbf |
| } | | |
| } | | |
| while(!bytealigned) | | |
| zero_bit | 1 | bslbf |
| } | | |

Fig. 41

| Syntax | No. of bits | Value |
|---|---|---|
| MakersPrivateData() | | |
| MakersPrivateData(){ | | |
| maker_ID | 16 | uimsbf |
| maker_private_data | 312(=39 * 8) | bslbf |
| } | | |

Fig. 42A

| PID assignments | |
|---|---|
| PID value | meaning |
| 0x1031 | The PID of the transport packets which carry the Tip data stream |

Fig. 42B

| stream_type assignments | |
|---|---|
| stream_type value | Description |
| 0xC3 | Tip data stream |

Fig.43

| PES PACKET HEADER OF PES PACKET IN CONSTRAINED SESF | |
|---|---|
| fields | Permitted value in Constrained SESF |
| PES_packet_length | CONFOM TO ISO/IEC13818-1 |
| PES_priority | 0b |
| data_alignment_indicator | 0b |
| copyright | 0b |
| PTS_DTS_flags | 00b,10b or 11b |
| ESCR_flag | 0b |
| ES_rate_flag | 0b |
| DSM_trick_mode_flag | 0b |
| additional_copy_info_flag | 0b |
| PES_CRC_flag | 0b |
| PES_extension_flag | Refer to Fig.31 |
| PES_header_data_length | Refer to Fig.31 |
| PES_private_data_flag | 0b, if exists |
| pack_header_field_flag | 0b, if exists |
| program_packet_sequence_counter_flag | 0b, if exists |
| P-STD_buffer_flag | 0b, if exists |
| PES_extension_flag_2 | 0b, if exists |
| stuffing_byte | STUFFED FULLY WITH '0xFF' |

Fig.44

| PES packet | | | CONSTRAINT FOR PES_extension_flag AND PES_header_data_length | | | |
|---|---|---|---|---|---|---|
| | | | encode_condition=01b | | encode_condition=11b | |
| STORED DATA | MULTIPLEXED POSITION | | VALUE OF PES_extension_flag AND PES_header_data_length | BYTE LENGTH OF stuffing_byte | VALUE OF PES_extension_flag AND PES_header_data_length | BYTE LENGTH OF stuffing_byte |
| MPEG2-Video, MPEG1-Audio | FIRST FOLLOWING TIP PACKET | | PES_extension_flag=1b PES_header_data_length=VPD+3 | 2 | PES_extension_flag=0b PES_header_data_length=VPD | 0 |
| | OTHERS | | PES_extension_flag=0b PES_header_data_length=VPD | 0 | | |
| AC-3 audio | FIRST FOLLOWING TIP PACKET | | PES_extension_flag=1b PES_header_data_length=VPD+7 | 6 | PES_extension_flag=0b PES_header_data_length=VPD+4 | 4 |
| | OTHERS | | PES_extension_flag=0b PES_header_data_length=VPD+4 | 4 | | |

$$VPD = \begin{cases} 0, & \text{(WHEN PTS\_DTS\_flags=00b)} \\ 5, & \text{(WHEN PTS\_DTS\_flags=01b)} \\ 10, & \text{(WHEN PTS\_DTS\_flags=11b)} \end{cases}$$

Fig.48

| | | ATTRIBUTE OF ELEMENTARY STREAM FOR encode_condition=11b | |
|---|---|---|---|
| | | NTSC | PAL |
| Video | Source picture resolution | 720x480,704x480, 352x480,352x240 (*Note1) | 720x576,704x576, 352x576,352x288 (*Note1) |
| | Aspect ratio | Display aspect ratio (*Note1) of 4:3 or 16:9 | |
| | Bit rate | 9.8Mbps (MAXIMUM) | |
| | GOP length | 36 or less display fields | 30 or less display field |
| | Sequence_end_code | once in end of VOB | |
| | Closed Captioning data | GOP layer user_data (same format as DVD VR) Picture layer (same format as ATSC) | N/A |
| | Teletext | N/A | Teletext transport packet (same format as DVB) |
| | WSS | (Tip transport packet) | Tip transport packet Picture layer user_data (SESF original formaT) |
| Audio | Quantization | 16bits | |
| | Sampling frequency | 48KHz | |
| | Bit rate | 64-384Kbps for MPEG-1 Audio, 64-448Kbps for AC-3 (*Note1) | |
| | Number of audio channels | 1-2ch for MPEG-1 Audio, 1-5.1ch for AC-3 (*Note1) | |

Fig.49

| ATTRIBUTE OF ELEMENTARY STREAM FOR encode_condition=01b | | NTSC | PAL |
|---|---|---|---|
| Video | Source picture resolution | 720x480, 704x480, 544x480, 480x480, 352x480, 352x240 (*Note2) | 720x576, 704x576, 544x576, 480x576, 352x576, 352x288 (*Note2) |
| | Aspect ratio | Display aspect ratio (*Note2) of 4:3 or 16:9 | |
| | Bit rate | 9.8Mbps (MAXIMUM) | |
| | GOP length | 36 or less display fields | 30 or less display fields |
| | Sequence_end_code | at least 90 display fields for sequence_end_code (*Note3) | at least 75 display fields for sequence_end_code (*Note3) |
| | Closed Captioning data | GOP layer user_data (same format as DVD VR) Picture layer (same format as ATSC) | N/A |
| | Teletext | N/A | Teletext transport packet (same format as DVB) |
| | WSS | (Tip transport packet) | Tip transport packet Picture layer user_data (SESF original format) |
| Audio | Quantization | 16bits | |
| | Sampling frequency | 48KHz | |
| | Bit rate | 64-384Kbps for MPEG-1 Audio, 64-448Kbps for AC-3 (*Note1) | |
| | Number of audio channels | 1-2ch and dual mono for MPEG-1 Audio, 1-5.1ch and dual mono for AC-3 (*Note4) | |

Fig. 51

| PCI OF NV_PCK | | |
|---|---|---|
| SYNTAX | NO. OF BITS | MNEMONIC |
| PCI () { | | |
| PCI_GI () | 480 (=8*60) | |
| NSML_AGLI () | 288 (=8*36) | |
| HLI () | 5552 (=8*694) | |
| RECI () | 1512 (=8*189) | |
| } | | |

Fig. 52

PCI_GI OF NV_PCK

| SYNTAX | NO. OF BITS | MNEMONIC |
|---|---|---|
| PCI_GI() { | | |
|     NV_PCK_LBN | 32 | uimsbf |
|     VOBU_CAT | 16 | bslbf |
|     reserved | 16 | bslbf |
|     VOBU_UOP_CTL | 32 | bslbf |
|     VOBU_S_PTM | 32 | uimsbf |
|     VOBU_E_PTM | 32 | uimsbf |
|     VOBU_SE_E_PTM | 32 | bslbf |
|     C_ELTM | 32 | bslbf |
|     reserved | 256 | |
| } | | |

Fig. 53

| DSI OF NV_PCK | | |
|---|---|---|
| SYNTAX | NO. OF BITS | MNEMONIC |
| DSI () { | | |
|     DSI_GI () | 256 (=8*32) | |
|     SML_PBI () | 1184 (=8*148) | |
|     SML_AGLI () | 432 (=8*54) | |
|     VOBU_SRI () | 1344 (=8*168) | |
|     SYNCI () | 1152 (=8*144) | |
|     reserved | 3768 (=8*471) | bslbf |
| } | | |

Fig. 54

| DSI_GI OF NV_PCK | | |
|---|---|---|
| SYNTAX | NO. OF BITS | MNEMONIC |
| DSI_GI() { | | |
|    NV_PCK_SCR | 32 | uimsbf |
|    NV_PCK_LBN | 32 | uimsbf |
|    VOBU_EA | 32 | uimsbf |
|    VOBU_1STREF_EA | 32 | uimsbf |
|    VOBU_2NDREF_EA | 32 | uimsbf |
|    VOBU_3RDREF_EA | 32 | uimsbf |
|    VOBU_VOB_IDN | 16 | uimsbf |
|    reserved | 8 | bslbf |
|    VOBU_C_IDN | 8 | uimsbf |
|    C_ELTM | 32 | bslbf |
| } | | |

Fig. 55

| SML_PBI OF NV_PCK | | | |
|---|---|---|---|
| SYNTAX | | NO. OF BITS | MNEMONIC |
| PML_PBI() { | | | |
| | VOBU_SML_CAT | 16 | bslbf |
| | ILVU_EA | 32 | uimsbf |
| | NXT_ILVU_SA | 32 | uimsbf |
| | NXT_ILVU_SZ | 16 | uimsbf |
| | VOB_V_S_PTM | 32 | uimsbf |
| | VOB_V_E_PTM | 32 | uimsbf |
| | VOB_A_STP_PTM | 512 (=8*64) | bslbf |
| | VOB_A_GAP_LEN | 512 (=8*64) | bslbf |
| } | | | |

Fig. 56

| SYNCI OF NV_PCK | | |
|---|---|---|
| SYNTAX | NO. OF BITS | MNEMONIC |
| SYNCI () { | | |
|    A_SYNCA0 | 16 | bslbf |
|    .. | | |
|    A_SYNCA7 | 16 | bslbf |
|    SP_SYNCA0 | 32 | bslbf |
|    .. | | |
|    SP_SYNCA31 | 32 | bslbf |
| } | | |

Fig. 60

| PACK HEADER OF PACK IN MPEG2-PS | | |
|---|---|---|
| Field | Number of bits | Permitted value |
| Pack_start_code | 32 | 000001BAh |
| '01' | 2 | 01b |
| SCR_base[32..30] | 3 | |
| marker_bit | 1 | 1b |
| SCR_base[29..15] | 15 | |
| marker_bit | 1 | 1b |
| SCR_base[14..0] | 15 | |
| marker_bit | 1 | 1b |
| SCR_extension | 9 | |
| marker_bit | 1 | 1b |
| program_mux_rate | 22 | 6270h |
| marker_bit | 1 | 1b |
| marker_bit | 1 | 1b |
| reserved | 5 | 11111b |
| pack_stuffing_length | 3 | 000b |

Fig. 61

| SYSTEM HEADER OF DVD FORMAT | | |
|---|---|---|
| FIELD | NUMBER OF BITS | PERMITTED VALUE |
| system_header_start_code | 32 | 000001BBh |
| header_length | 16 | 18 |
| marker_bit | 1 | 1b |
| rate_bound | 22 | 6270h |
| marker_bit | 1 | 1b |
| audio_bound | 6 | 0 to 2 |
| fixed_flag | 1 | 0b |
| CSPS_flag | 1 | Provider defined |
| system_audio_lock_flag | 1 | 1b |
| system_video_lock_flag | 1 | 1b |
| marker_bit | 1 | 1b |
| video_bound | 5 | 1 |
| Packet_rate_restriction_flag | 1 | Provider defined |
| reserved_bits | 7 | 7Fh |
| stream_id | 8 | B9h (all video streams) |
| '11' | 2 | 11b |
| P-STD_buf_bound_scale | 1 | 1b |
| P-STD_buf_size_bound | 13 | 232 |
| stream_id | 8 | B8h (all audio streams) |
| '11' | 2 | 11b |
| P-STD_buf_bound_scale | 1 | 0 |
| P-STD_buf_size_bound | 13 | 32 |
| stream_id | 8 | BDh (private_stream_1) |
| '11' | 2 | 11b |
| P-STD_buf_bound_scale | 1 | 1b |
| P-STD_buf_size_bound | 13 | 58 |
| stream_id | 8 | BFh (private_stream_2) |
| '11' | 2 | 11b |
| P-STD_buf_bound_scale | 1 | 1b |
| P-STD_buf_size_bound | 13 | 2 |

Fig. 62A

| PACKET HEADER OF RDI_PCK | | |
|---|---|---|
| FIELD | NUMBER OF BITS | PERMITTED VALUE |
| packet_strat_code_prefix | 24 | 000001h |
| stream_id | 8 | BFh (private_stream_2) |
| PES_packet_legnth | 16 | 07D4h |

Fig. 62B

| PRIVATE HEADER OF RDI_PCK | | |
|---|---|---|
| FIELD | NUMBER OF BITS | PERMITTED VALUE |
| sub_stream_id | 8 | 50h |

Fig.63

| PACKET HEADER OF PACKET IN MPEG2-PS | | |
|---|---|---|
| Field | Number of bits | Permitted value |
| PES_priority | 1 | 0b |
| data_alignment_indicator | 1 | 0b |
| copyright | 1 | 0b |
| ESCR_flag | 1 | 0b |
| ES_rate_flag | 1 | 0b |
| DSM_trick_mode_flag | 1 | 0b |
| additional_copy_info_flag | 1 | 0b |
| PES_CRC_flag | 1 | 0b |
| PES_extension_flag | 1 | same value as Constrained SESF |
| PES_header_data_length | 8 | same value as Constrained SESF |
| PES_private_data_flag | 1 | 0b, if exists |
| pack_header_field_flag | 1 | 0b, if exists |
| Program_packet_sequence_counter_flag | 1 | 0b, if exists |
| P-STD_buffer_flag | 1 | 1b, if exists |
| PES_extension_flag_2 | 1 | 0b, if exists |
| stuffing_byte | 8*N | stuffed fully with '0×FF' |

Fig. 64

| PRIVATE HEADER OF AC-3 IN DVD FORMAT | | |
|---|---|---|
| FIELD | NUMBER OF BITS | PERMITTED VALUE |
| sub_stream_id | 8 | 80h(primary) or 81h(secondary) |
| number_of_frame_headers | 8 | Provider defined |
| first_access_unit_pointer | 16 | 0 |

Fig.67

| BIT RATE ALLOWED IN Constrained SESF | MAXIMUM BYTE LENGTH OF PES PACKET PAYLOAD (AC-3 audio) | MAXIMUM BYTE LENGTH OF PES PACKET PAYLOAD (MPEG1-audio) |
|---|---|---|
| 64 Kbps | 1792 | 1920 |
| 80 Kbps | 1920 | 1920 |
| 96 Kbps | 1920 | 1728 |
| 112 Kbps | 1792 | 1680 |
| 128 Kbps | 1536 | 1920 |
| 160 Kbps | 1920 | 1920 |
| 192 Kbps | 1536 | 1728 |
| 224 Kbps | 1792 | 1344 |
| 256 Kbps | 1024 | 1536 |
| 320 Kbps | 1280 | 1920 |
| 384 Kbps | 1536 | 1152 |
| 448 Kbps | 1792 | N/A |

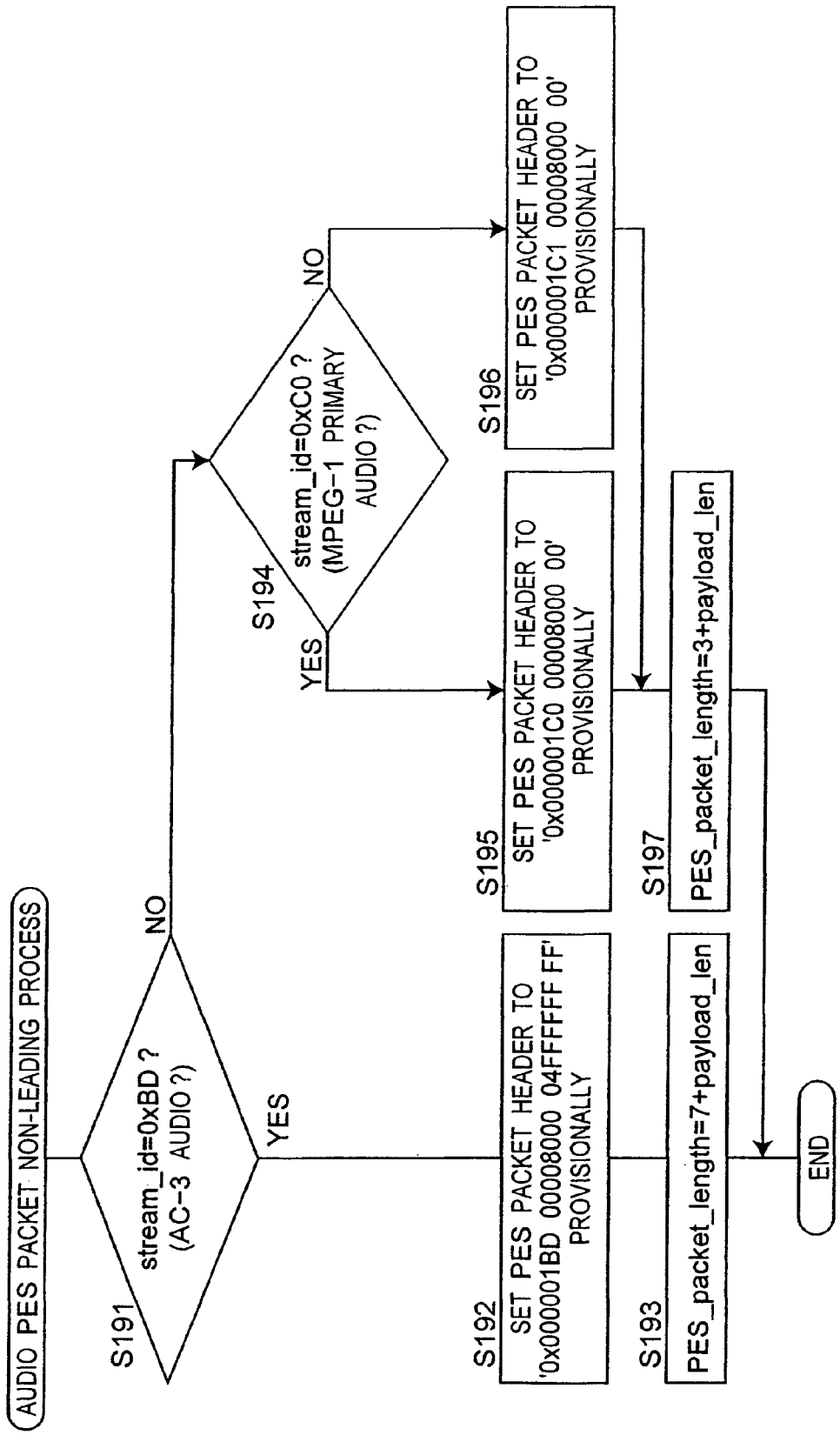

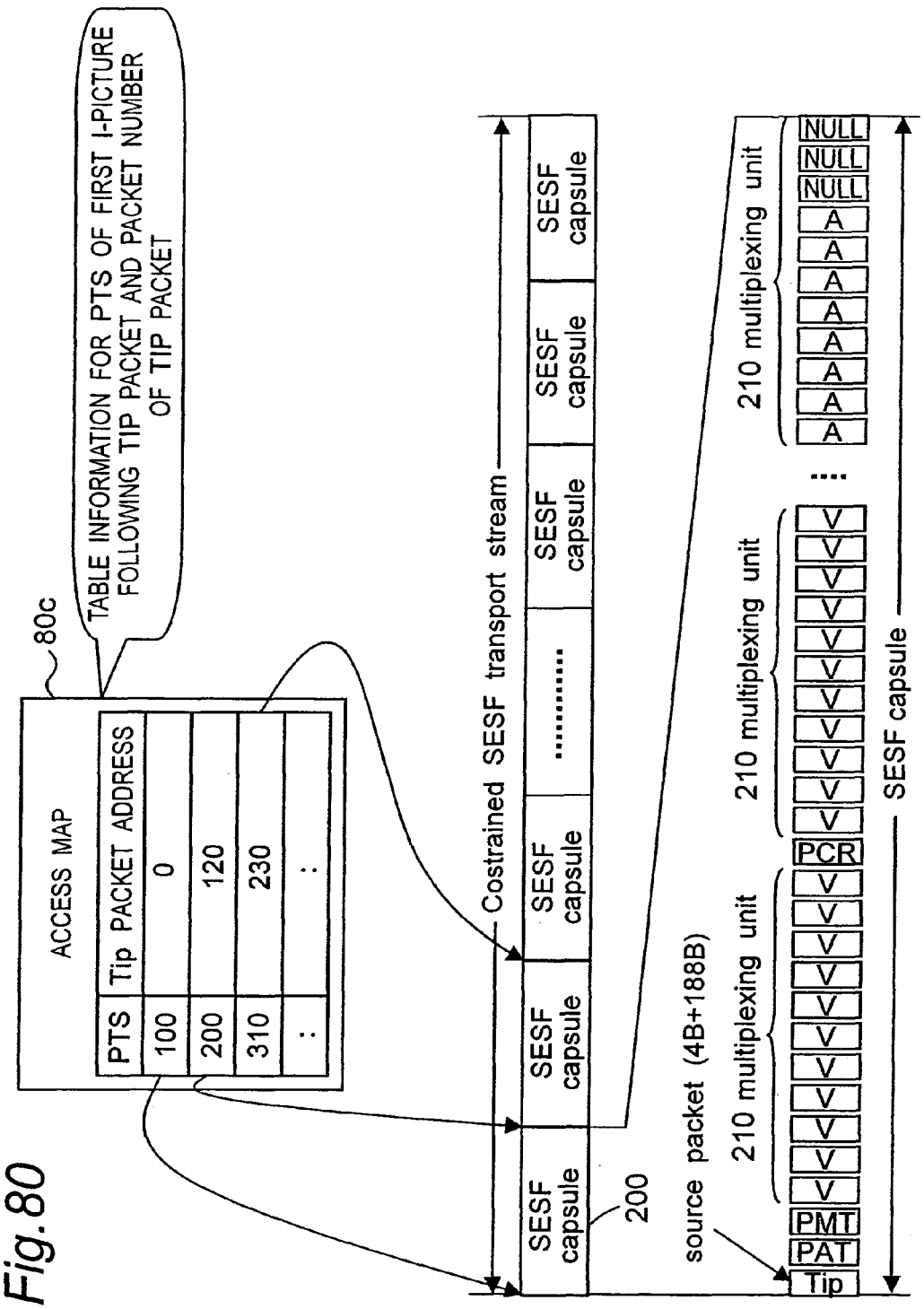

Fig.81

```
PES_packet(){
        packet_start_code_prefix                    24
        stream_id                               8
        PES_packet_length                           16
        '10'                                        2
        PES_scrambling_control                      2
        PES_priority                                1
        data_alignment_indicator                    1
        copyright                               1
        original_or_copy                            1
        PTS_DTS_flags                               2
        ESCR_flag                                   1
        ES_rate_flag                                1
        DSM_trick_mode_flag                         1
        additional_copy_info_flag                   1
        PES_CRC_flag                                1
        PES_extension_flag                          1
        PES_header_data_length                      8
        if (PTS_DTS_flags == '10'){
                '0010'                              4
                PTS                                36
        }
        if (PTS_DTS_flags == '11'){
                '0011'                              4
                PTS                                36
                '0001'                              4
                DTS                                36
        }
        if (PES_extension_flag == '1'){
                PES_private_data_flag               1
                pack_header_field_flag              1
                program_packet_sequence_counter_flag 1
                P-STD_buffer_flag                   1
                reserved                            3
                PES_extension_flag_2                1
                if (P-STD_buffer_flag =='1'){
                        '01'                        2
                        P-STD_buffer_scale          1
                        P-STD_buffer_size          13
                }
        }
        for( i=0 ; i<N1 ; i++){
                stuffing_byte                       8
        }
        for( i=0 ; i<N2 ; i++){
                PES_packet_data_byte                8
        }
}
```

PES packet = PES packet header + PES packet payload

Fig.82

CALCULATION OF INTERNAL DATA OF NV_PCK

| | FIELD | CALCULATION METHOD |
|---|---|---|
| Pack header | SC | CALCULATE FROM ATS AND PCR OF Tip PACKET, AND ATS OF A HEAD Tip PACKET IN Multiplexing unit. |
| PCI data | NV_PCK_LBN | COUNT PACKS CONVERTED IN THE CONVERSION. |
| | VOBU_S_PTM | CALCULATE FROM FVFPST OF Tip PACKET. |
| | VOBU_E_PTM | CALCULATE FROM FVFPST OF NEXT Tip PACKET. ONLY FOR THE LAST NV_PCK, THE VALUE IS EQUAL TO VOB_V_E_PTM. |
| | VOBU_SE_E_PTM | EXCEPT FOR THE LAST NV_PCK, 0x00 IS FILLED. FOR THE LAST NV_PCK, THE VALUE IS EQUAL TO VOB_V_E_PTM. |
| | C_ELTM | CALCULATE FROM VOBU_S_PTM OF A HEAD VOBU IN CELL AND VOBU_S_PTM OF THE VOBU |
| | NV_PCK_SCR | ASSIGN SCR OF NV_PCK TO THIS FILED |
| DSI data | NV_PCK_LBN | SAME TO PCI data |
| | VOBU_EA | COUNT DURING TS2PS TO ASSIGN, OR CALCULATION FROM ACCESS MAP |
| | VOBU_1STREF_EA | COUNT PACKS UNTIL THE LAST PACK OF THE FIRST PES PACKET AFTER TS2PS CONVERSION OF WHICH picture_coding_type IS 01b OR 10b OF Tip PACKET, AND ASSIGN THE COUNT TO THIS FIELD. |
| | VOBU_2NDREF_EA | COUNT PACKS UNTIL THE LAST PACK OF SECOND PES PACKET AFTER TS2PS CONVERSION OF WHICH picture_coding_type IS 01b OR 10b OF Tip PACKET TO SUBSTITUTE. |
| | VOBU_3RDREF_EA | COUNT PACKS UNTIL THE LAST PACK OF THIRD PES PACKET AFTER TS2PS CONVERSION OF WHICH picture_coding_type IS 01b OR 10b OF Tip PACKET TO SUBSTITUTE. |
| | VOBU_C_IDN | ASSIGN THE NUMBER OF CELL TO WHICH THE CORRESPONDING NV_PCK IS BELONG (DESIGNATED BY RECORDER/USER) |
| | C_ELTM | SAME TO PCI data |
| | VOB_V_S_PTM | ASSIGN VOBU_S_PTM OF THE FIRST VOBU. |
| | VOB_V_E_PTM | ASSIGN REPRODUCTION END TIME OF CONVERSION SECTION (IT MAY BE OBTAINED BEFORE TS2PS CONVERSION) |
| | VOBU_SRI | INFORMATION IS EXTRACTED WITH A SET OF NV_PCK_LBN AND VOBU_S_PTM ON TS2PS CONVERSION AND THEN ASSIGNED IT TO THIS FIELD. ALTERNATELY, A VALUE CALCULATED FROM ACCESS MAP. |
| | A_SYNCA | COMPARING VOBU_S_PTM OF NV_PCK WITH AUDIO_PTS, THE NUMBER OF PACKS COUNTED TO ONE PACK BEFORE THE PACK AUDIO PTS IS GREATER THAN VOBU_S_PTM AT THE FIRST TIME IS ASSIGNED TO THIS FIELD. |

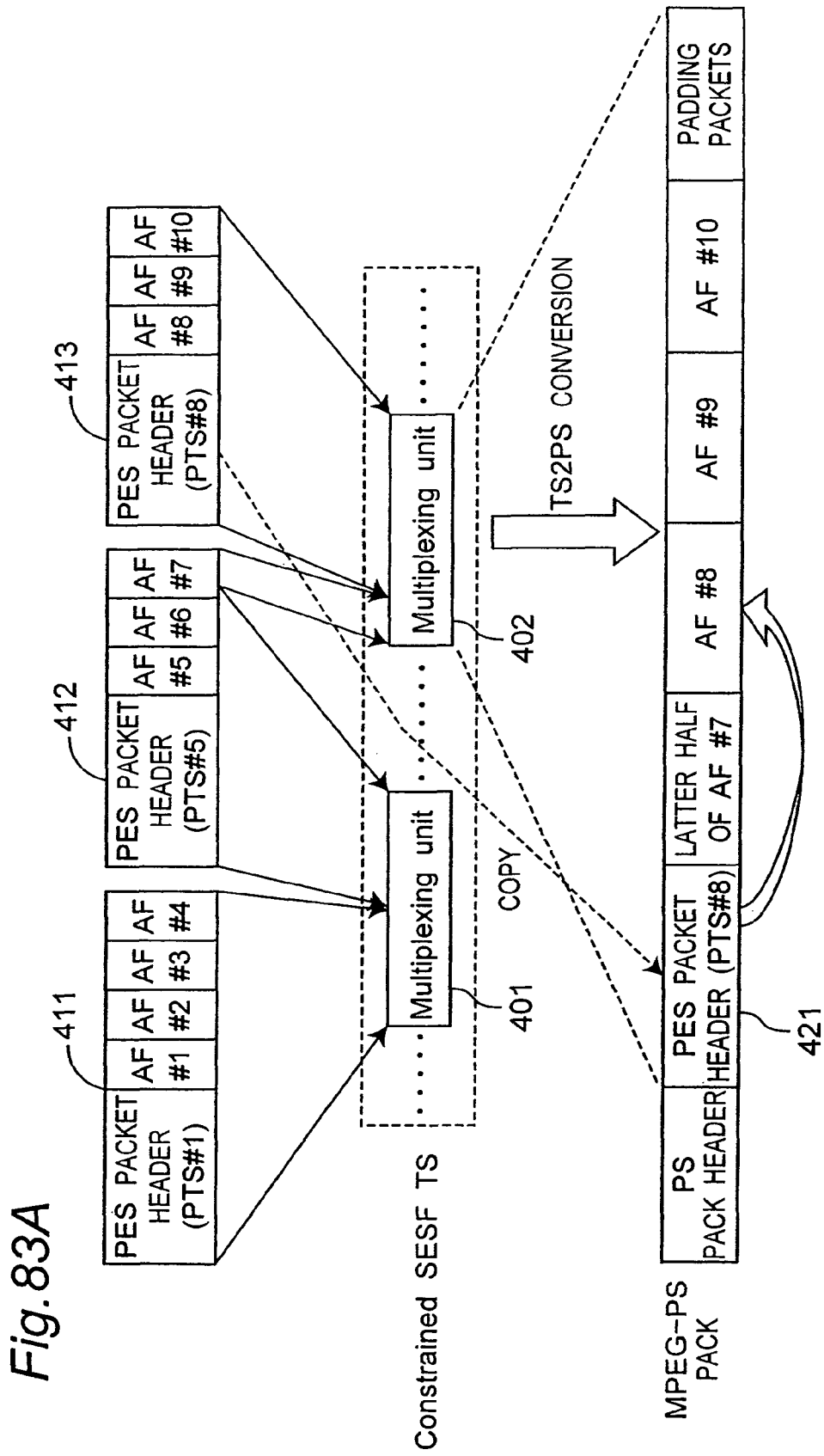

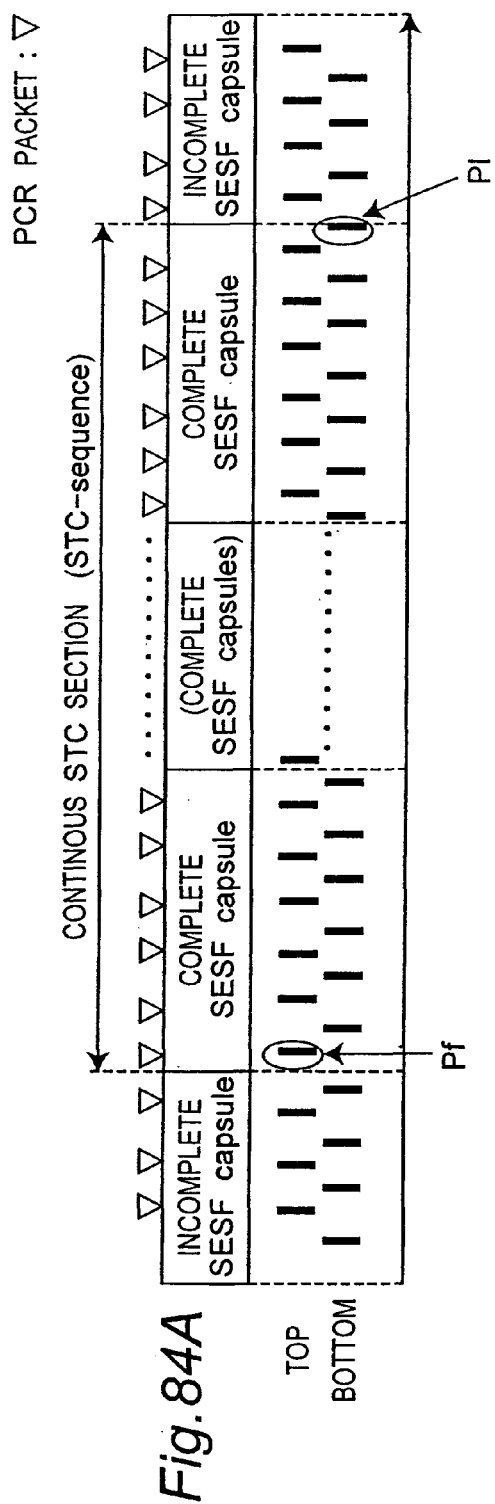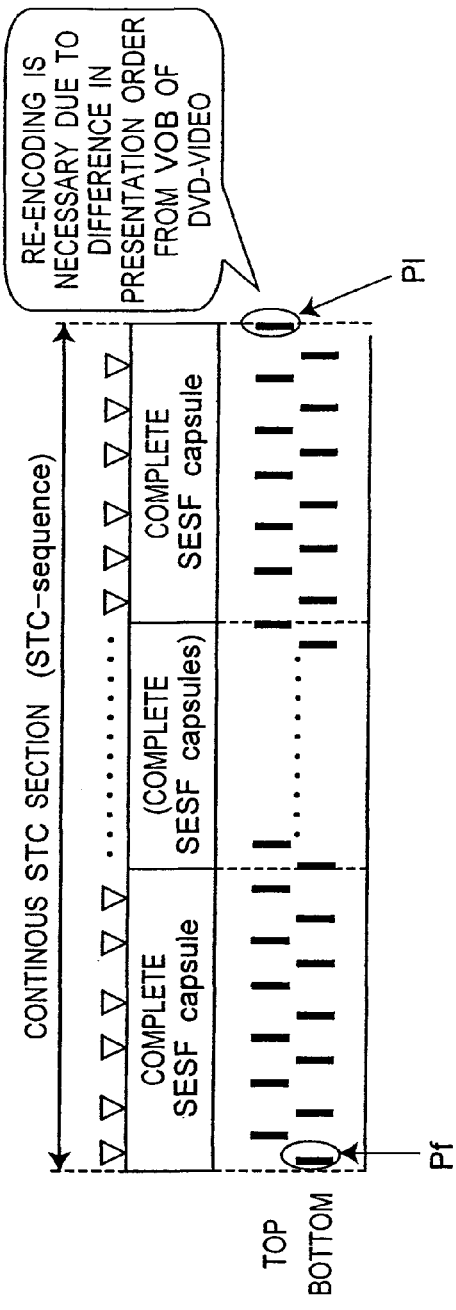
Fig.84A
Fig.84B ary stream generated by encoding video information and
INFORMATION RECORDING MEDIUM, AND APPARATUS AND METHOD FOR RECORDING INFORMATION TO INFORMATION RECORDING MEDIUM This application is a divisional application of Ser. No. 10/552,372 filed Feb. 6, 2006 now U.S. Pat. No. 7,274,861, which is a National Stage Application of International Application Serial No. PCT/JP2004/004997, filed Apr. 7, 2004.

TECHNICAL FIELD

The present invention relates generally to a readable, writable data recording medium, and relates more particularly to a data recording medium for recording moving picture (video) data, still image data, audio data, and other types of multimedia data in data broadcasting and various other formats. The invention also relates to an apparatus and method for recording data to such a data recording medium.

BACKGROUND ART

Rewritable optical discs have had a maximum storage capacity of approximately 650 MB, but this limit has been pushed to several gigabytes by the introduction of DVD-RAM discs, a phase-change type of storage medium. Used in conjunction with practical implementations of MPEG (particularly MPEG-2), a digital AV data encoding standard, DVD-RAM is not limited to computer applications and will soon find widespread use as a recording and playback medium in the audio-video (AV) and even home entertainment industries.

With the start of digital broadcasts in Japan it has become possible to multiplex and simultaneously transmit the video, audio, and data portions of plural programs to the MPEG transport stream ("MPEG_TS" below). Digital broadcast recorders using hard discs or DVD media to record these programs are also available.

These next-generation digital broadcast recorders typically record digital broadcasts in the original broadcast format without converting the MPEG_TS of the broadcast, and are expected to record AV data from an external line input using the MPEG_TS so that the recorder does not need to internally handle both the MPEG program stream ("MPEG_PS" below) and the MPEG_TS.

However, because the current DVD logic standards (including the DVD-Video standard, DVD-Audio standard, DVD Video Recording standard, and DVD Stream Recording standard) use the MPEG_PS for AV stream recording, MPEG_TS to MPEG_PS conversion (TS2PS conversion) is required in order to convert content recorded in the MPEG_TS format, such as by the above-noted digital broadcast recorder, to the DVD-Video format, for example (see for example, JP2002-344888A).

Converting a stream multiplexed to the MPEG_TS to MPEG_PS, however, involves a complex recalculation for decoder buffer management, the TS2PS conversion is time-consuming, and often involves re-encoding the elementary stream, resulting in degraded image quality and sound quality.

DISCLOSURE OF INVENTION

The present invention is directed to solving these problems and an object of the invention is to provide a data recording medium for recording an MPEG_TS stream enabling fast, simple conversion when converting content recorded in the MPEG_TS format to the MPEG_PS format. A further object is to provide an apparatus and a method for recording data using the data recording medium of the invention.

In a first aspect of the invention, provided is a recording medium for storing system stream including video elementary stream generated by encoding video information and audio elementary stream generated by encoding audio information with the video elementary stream and the audio elementary stream being multiplexed. In the recording medium, the system stream is allowed to have a first format (TS) and a second format (PS). The first format is allowed to have a constrained format used for converting the system stream from the first format (TS) to the second format (PS). According to the constrained format, a presentation order of the video information including continuous complete data blocks starts at a top field and ends at a bottom field, in which the continuous complete data blocks are included in continuous reference presentation time for video information and audio information, and the continuous reference presentation time includes at least one data block.

The elementary stream may be encoded in an encoding method which is allowed for both the first format and the second format.

The video elementary stream and the audio elementary stream may be multiplexed to the system stream in the same order as a presentation order in the second format (PS) that is converted according to the constrained format The first format (TS) may have a structure for storing data segmented in packets, and each packet may be provided with time stamp information indicating relative transfer timing. The second format (PS) may have a structure for storing data segmented in packs, and each pack may be provided with time stamp information indicating transfer timing. The pack is larger than the packet in size. In this case, a predetermined number of packets are grouped and managed as a multiplexing unit, and total data size of packets managed in the multiplexing unit is not larger than data size of the pack.

The system stream may include encode information that indicates whether or not the video information including continuous complete data block starts at a top field and ends at a bottom field. The encode information may also be included in management information for managing data stored in the recording medium.

In a second aspect of the invention, provided is an information recording apparatus for encoding video information and audio information to system stream and recording the system stream to a recording medium. The system stream is allowed to have a first format (TS) and a second format (PS). The information recording apparatus includes a first encoding section operable to encode video information and audio information in a predetermined encoding manner according to the first format (TS) to generate video elementary stream and audio elementary stream; a second encoding section operable to perform system-encoding by multiplexing the video elementary stream and the audio elementary stream to generate the system stream according to the first format (TS); and a control section operable to control the first encoding section and the second encoding section.

The first format (TS) is allowed to have a constrained format used for converting the system stream from the first format (TS) to the second format (PS). The control section controls the first and second encoding section so that each encoding is done according to the constrained format. According to the constrained format, a presentation order of the video information including continuous complete data block starts at a top field and ends at a bottom field, the continuous complete data blocks are included in continuous reference presentation time for video information and audio information, and the continuous reference presentation time includes at least one data block.

In a third aspect of the invention, provided is an information recording method including encoding video information and audio information to system stream and recording the system stream to a recording medium.

The system stream is allowed to have a first format (TS) and a second format (PS). The first format (TS) is allowed to have a constrained format used for converting the system stream from the first format (TS) to the second format (PS).

The information recording method includes encoding video information and audio information in a predetermined encoding manner according to the first format (TS) to generate video elementary stream and audio elementary stream; and performing system-encoding by multiplexing the video elementary stream and the audio elementary stream to generate the system stream according to the first format (TS). According to the constrained format, a presentation order of the video information including continuous complete data blocks starts at a top field and ends at a bottom field, the continuous complete data blocks are included in continuous reference presentation time for video information and audio information, and the continuous reference presentation time includes at least one data block.

According to the present invention, video information is recorded so that, according to the constrained format, the video information including continuous complete data blocks starts at a top field and ends at a bottom field, the continuous complete data blocks being included in continuous reference presentation time for video information and audio information, the continuous reference presentation time including at least one data block. Such an arrangement causes re-encoding of video stream to be unnecessary and provides high speed conversion of a signal input externally from MPEG-TS to MPEG-PS complying with DVD standard.

BRIEF DESCRIPTION OF DRAWINGS

FIGS. 6A and 6B show the logical data space of the disc.

FIG. 9 shows the MPEG system stream.

FIGS. 10A to 10C show the MPEG transport stream (MPEG_TS).

FIGS. 11A to 11C show the MPEG program stream (MPEG_PS).

FIGS. 12A to 12D show a TS packet.

FIGS. 13A to 13C2 shows a PAT table.

FIGS. 14A to 14C show the arrangement of video objects on disc.

FIG. 17 shows the relationship between an object, object information, and PGC information in the video management information.

FIG. 21 shows the structure of a self-encoding stream.

FIG. 31 shows the internal data structure of a User Private packet.

FIG. 34 shows differences in processes for converting from a self-encoded MPEG_TS to DVD formats due to differences in system encoding.

FIG. 35 shows the Tip packet data structure.

FIG. 36 shows the adaptation field data structure.

FIG. 37 shows the Data_ID data structure.

FIG. 38 shows the display_and_copy_info data structure.

FIG. 39 shows the encode_info data structure.

FIG. 40 shows the PES_info data structure.

FIG. 41 shows the MakersPrivateData data structure.

FIG. 42A shows PID of the Tip packet.

FIG. 42B shows the stream_type of Tip packet.

FIG. 43 shows field values of the PES packet header in a Constrained SESF stream.

FIG. 44 shows the PES_extension_flag and PES_header_data_length in a Constrained SESF stream.

FIG. 48 shows the elementary stream attributes of a Constrained SESF when encode_condition=11b.

FIG. 49 shows the elementary stream attributes of a Constrained SESF when encode_condition=01b.

FIG. 51 shows the structure of PCI data in NV_PCK.

FIG. 52 shows the structure of PCI_GI data in NV_PCK.

FIG. 53 shows the structure of DSI data in NV_PCK.

FIG. 54 shows the structure of DSI_GI data in NV_PCK.

FIG. 55 shows the structure of SML_PBI data in NV_PCK.

FIG. 56 shows the structure of SYNCI data in NV_PCK.

FIG. 60 shows a part of the data structure of the pack header in an MPEG-2 program stream pack.

FIG. 61 shows a DVD format system header.

FIG. 62A shows the structure of a packet header stored in RDI_PCK.

FIG. 62B shows the structure of a packet header stored in RDI_PCK.

FIG. 63 shows a part of the data structure of the packet header in an MPEG-2 program stream packet.

FIG. 64 shows the structure of an AC-3 standard private header in the DVD format.

FIG. 67 is a table of audio bit rates allowed by the Constrained SESF, and the maximum payload length stored to one audio PES packet for AC-3 and MPEG-1 Audio at the corresponding bit rates.

FIG. 77B is a flow chart of the audio PES packet non-leading process.

FIG. 80 shows the Constrained SESF stream format.

FIG. 81 shows the data structure of an MPEG standard PES packet.

FIG. 82 shows a method of generating NV_PCK data.

FIG. 83A shows efficiency multiplexing method using Multiplexing Unit with audio frames aligned.

FIG. 84A shows encode conditions related to the order of video presentation fields in Constrained SESF (when satisfying DVD-Video standard).

FIG. 84B shows encode conditions related to the order of video presentation fields in Constrained SESF (when not satisfying DVD-Video standard).

BEST MODE FOR CARRYING OUT THE INVENTION

Figure 1:
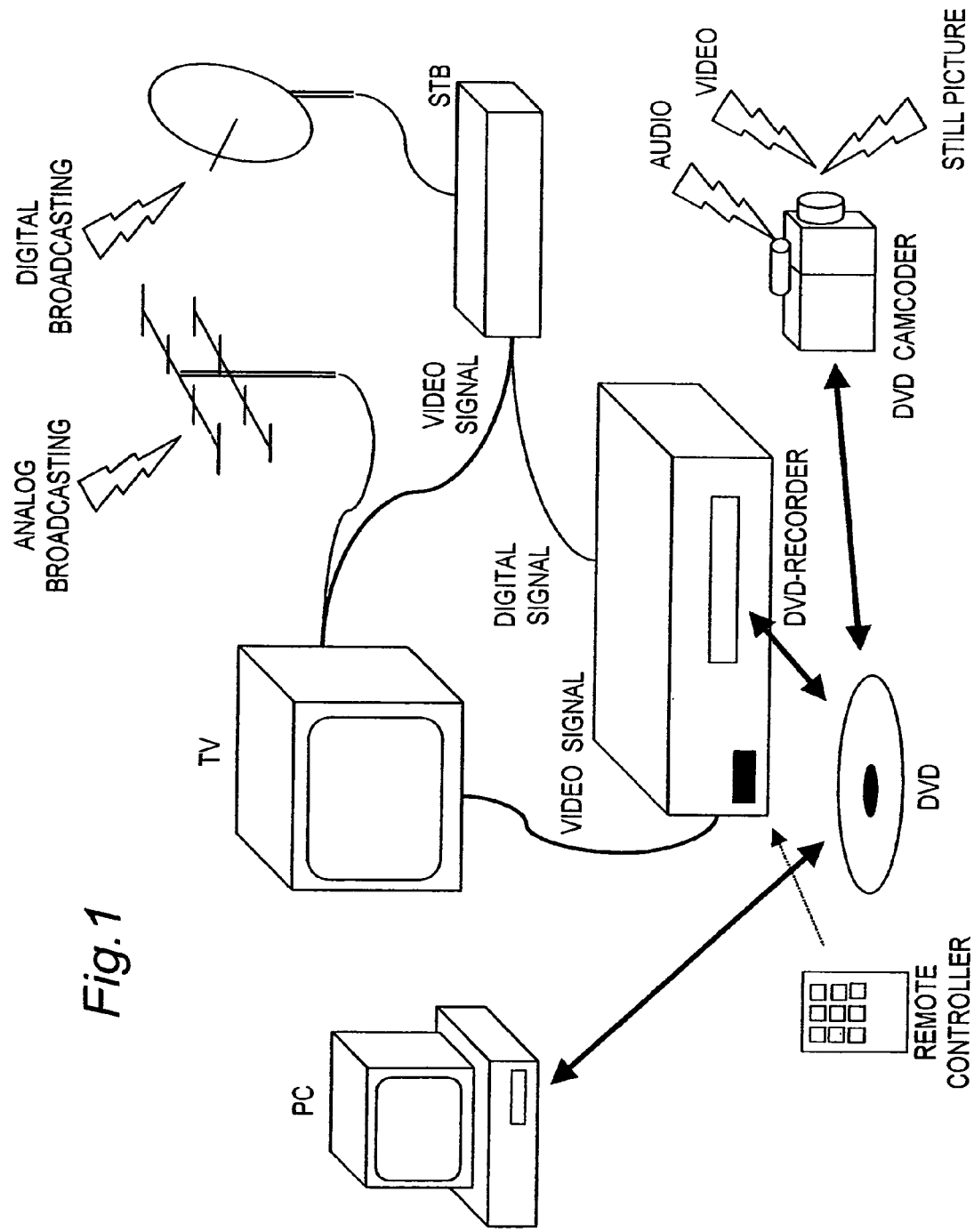
FIG. 1 is a schematic diagram showing a DVD recording apparatus and an exemplary interface between the DVD recording apparatus and other components used in conjunction therewith.

A DVD disc, DVD recorder, and DVD player are described with reference to the accompanying figures in the sequence shown below as preferred embodiments of a data recording medium, recording apparatus, and playback apparatus according to the present invention.

Key points of the present invention are described particularly in the following section 8, outline of the invention, and section 9, detailed embodiments of the invention. While the relationship to the present invention may vary, all of the following describe various aspects of the invention.

1. Outline of the DVD recorder system
2. Function outline of the DVD recorder
3. Outline of the DVD disc
4. Outline of reproduced AV data
5. AV data management information and playback control
6. Basic operation of the playback function
7. Basic operation of the recording function
8. Outline of the invention
9. Detailed embodiments of the invention The following terminology is used below.

"TS2PS conversion" refers to converting the MPEG transport stream (MPEG_TS) to the MPEG program stream (MPEG_PS).

"DVD format" refers to both the DVD-Video standard format and the DVD-Video Recording standard format, each being an MPEG_PS implementation.

1. Outline of the Dvd Recorder Systemt

FIG. 1 shows a typical DVD recorder in relation to other systems and devices used with the DVD recorder.

As shown in FIG. 1 a DVD, which is a type of optical disc, is loaded to the DVD recorder for recording video data to the disc and reproducing video data from the disc. A remote control device is typically used to operate the DVD recorder.

The video data input to the DVD recorder could be an analog signal or a digital signal with analog broadcasts exemplary of analog signals and digital broadcasts exemplary of digital signals. Generally speaking, analog broadcasts are received and demodulated by the receiver built in to a television, and input as an NTSC or other analog video signal to the DVD recorder for recording. Digital broadcasts are demodulated to a digital signal by the digital broadcast receiver (set-top box (STB)) input to the DVD recorder for recording.

Video data recorded to a DVD is reproduced by the DVD recorder and externally output. Like the video input, video output may be an analog signal or digital signal. Analog signals are input directly to the television. Digital signals are passed through the STB and converted to an analog signal, which is then input to the television for video presentation.

Video data may also be recorded to and reproduced from a DVD by a device other than a DVD recorder, such as a DVD camcorder or personal computer. A DVD disc storing video data recorded by a device other than a DVD recorder will also be reproduced by the DVD recorder when loaded therein.

It should be noted that audio data is normally associated with the video data of an analog broadcast or digital broadcast, and this audio data is likewise recorded and reproduced by the DVD recorder.

Furthermore, the video data is generally moving picture data, but could also include still images such as when a still image (photograph) is captured using the snapshot function of a DVD camcorder.

IEEE 1394, ATAPI, SCSI, or other standard could be used for the digital interface between the STB and DVD recorder.

It should also be noted that an NTSC signal is referred to above as the type of component video signal passed between the DVD recorder and television, but a component signal sending separate luminance and color difference signals could be used. Furthermore, changing the interface for transmitting video between AV components and televisions from an analog interface to a digital interface such as DVI is currently being researched, and we anticipate that a digital interface can also be used to connect DVD recorders and televisions.

2. Function Outline of the Dvd Recorder

Figure 2:
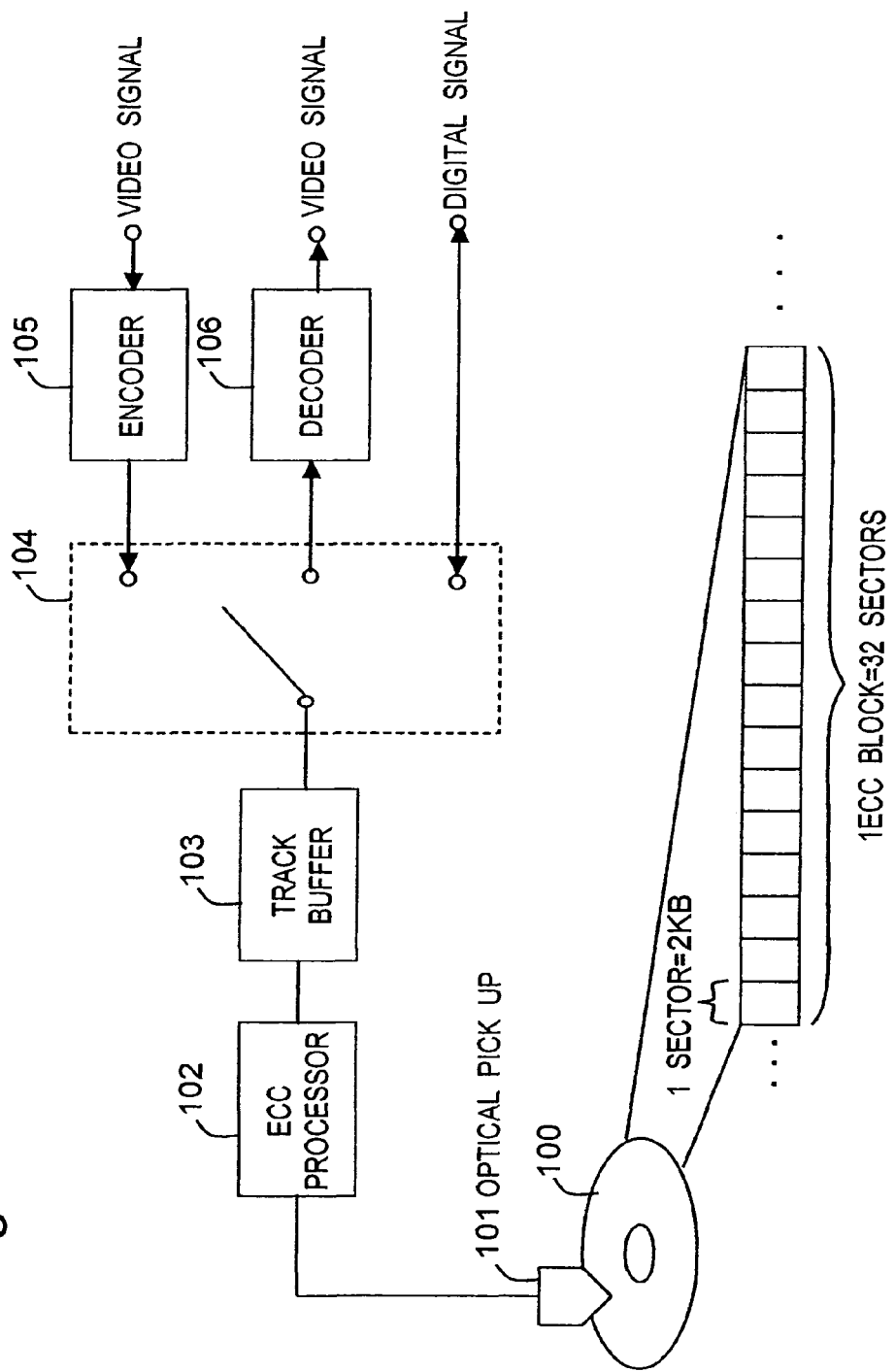
FIG. 2 is a block diagram of the drive apparatus of a DVD recorder.

FIG. 2 is a function block diagram of a DVD recorder. The drive device has an optical pickup 101 for reading data from a DVD-RAM disc 100, an ECC (error correction code) processor 102, track buffer 103, switch 104 for changing track buffer 103 input and output, an encoder 105, and a decoder 106.

As shown in the figure data is recorded to the DVD-RAM disc 100 with the smallest recording unit being one sector (=2 KB). Furthermore, 16 sectors equal 1 ECC block, and the ECC processor 102 applies error correction processing using ECC block units.

Figure 4:
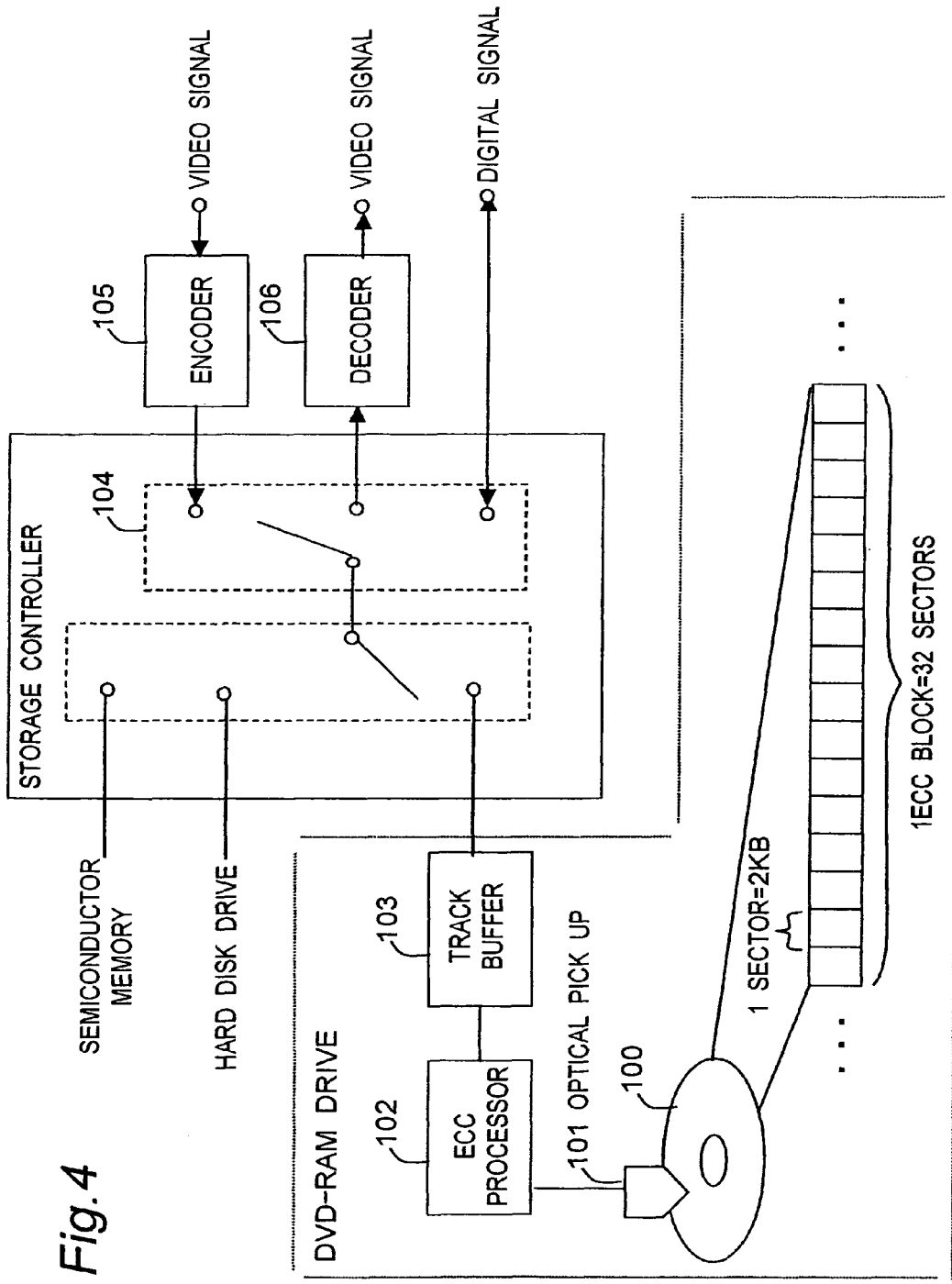
FIG. 4 is a block diagram of a DVD recorder having a semiconductor memory card and hard disk drive.

The DVD recorder could also use semiconductor memory cards or hard disk drives in addition to DVDs as data storage media. FIG. 4 is a block diagram of a DVD recorder having a semiconductor memory card and hard disk drive.

It should also be noted that 1 sector could be 512 bytes, 8 KB, or other size. The ECC block could also contain 1 sector, 16 sectors, 32 sectors, or other configuration. It is expected that the sector size and number of sectors in each ECC block will also increase as the recordable data capacity increases.

The track buffer 103 is a buffer for recording AV data at a variable bit rate (VBR) in order to record AV data more efficiently to the DVD-RAM disc 100. The DVD-RAM disc 100 write rate (Va) is a fixed rate but the bit rate (Vb) of the AV data varies according to the complexity of the AV content (images in the case of video content). The track buffer 103 is used to absorb this bit rate difference.

In order to use this track buffer 103 even more effectively, the AV data can be distributively recorded to the disc 100. This is further described with reference to FIGS. 3A and 3B.

Figure 3:
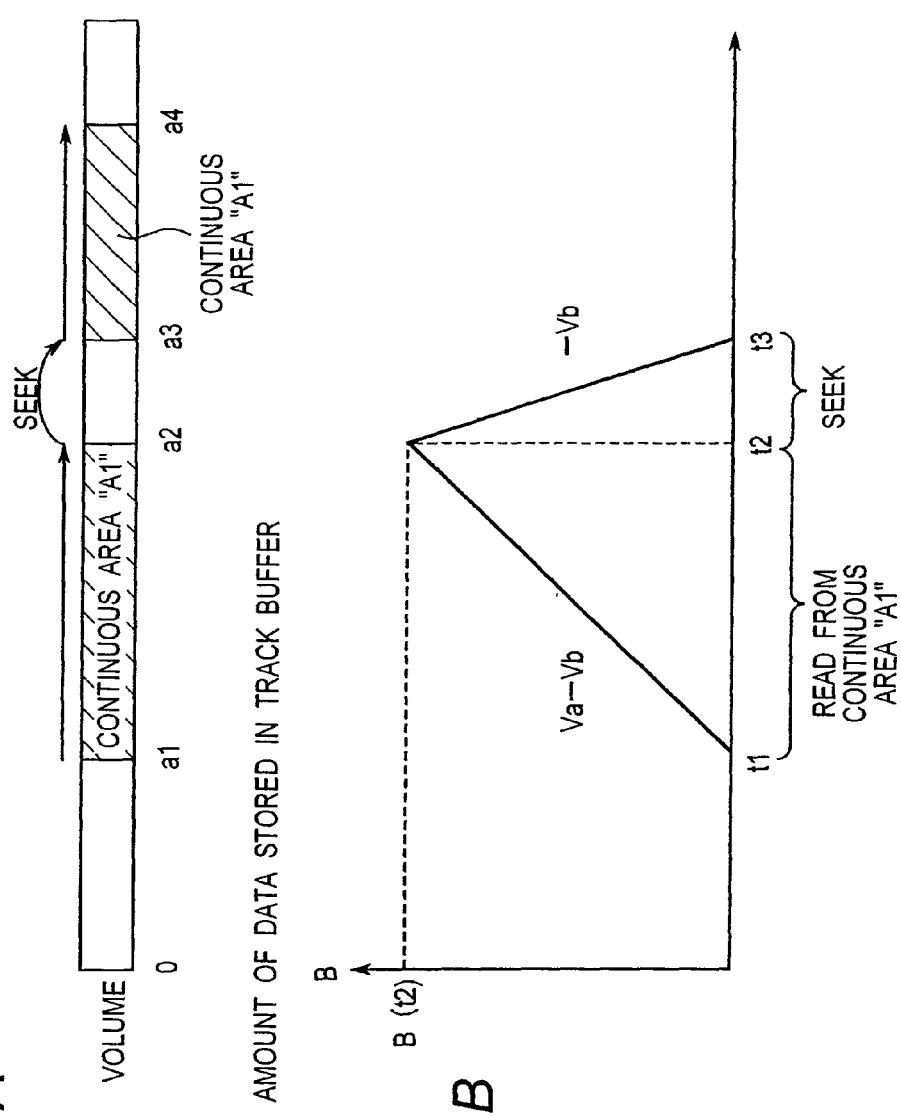
FIG. 3A illustrates a contiguous area on the disc.
FIG. 3B is a graph illustrating the data accumulation in a track buffer.

FIG. 3A shows the disc address space. As shown in FIG. 3A, continuous playback of the AV data is enabled when the AV data is recorded to separate contiguous spaces [a1, a2] and [a3, a4] by supplying data accumulated in the track buffer to the decoder 106 while seeking from a2 to a3. The change in the amount of data stored to the track buffer at this time is shown in FIG. 3B.

When reading starts at address a1, the AV data is input from time t1 to the track buffer 103 and data output from the track buffer 103 also starts. Data then accumulates in the track buffer 103 at the rate (Va−Vb), that is, the difference between the input rate (Va) to the track buffer 103 and the track buffer output rate (Vb). This continues until the search area reaches a2, that is, until time t2. If the data accumulated in the track buffer 103 during this time is B(t2), data can be supplied to the decoder 106 by gradually depleting the data B(t2) accumulated in the track buffer 103 from time t2 to the time t3 at which reading from the address a3 begins.

In other words, a continuous supply of AV data can be maintained during seek operations insofar as at least a specified amount of data ([a1, a2]) has been read before the seek operation starts.

The size of the contiguous area required to enable continuous AV data output when converted to an ECC block count (N_ecc) is shown by the following equation:

$$N\_ecc = Vb*Tj/((N\_sec*8*S\_size)*(1-Vb/Va))$$

where N_sec is the number of sectors in an ECC block, S_size is the sector size, and Tj is the seek performance (maximum seek time).

A defective sector could also occur in a contiguous area. The required size of the contiguous area in this case is shown by the following equation:

$$N\_ecc = dN\_ecc + Vb*Tj/((N\_sec*8*S\_size)*(1-Vb/Va))$$

where dN_ecc is the size of the allowed defective sector, and Ts is the time needed to skip the defective sector within the contiguous area. This equation also returns the size of the contiguous area as the number of ECC blocks.

The above example is described using reading data from a DVD-RAM disc, that is, data playback, by way of example, but it will be obvious that writing, that is, recording, data to the DVD-RAM disc can be handled in the same way.

Continuous data playback and recording can thus be achieved with a DVD-RAM disc even when the AV data is recorded to separate recording areas on the disc insofar as the data is recorded in blocks of a specific size or more. These contiguous areas are referred to as Contiguous Data Areas (CDA) in DVD terminology.

3. Outline of the Dvd Disc

Figure 5A:
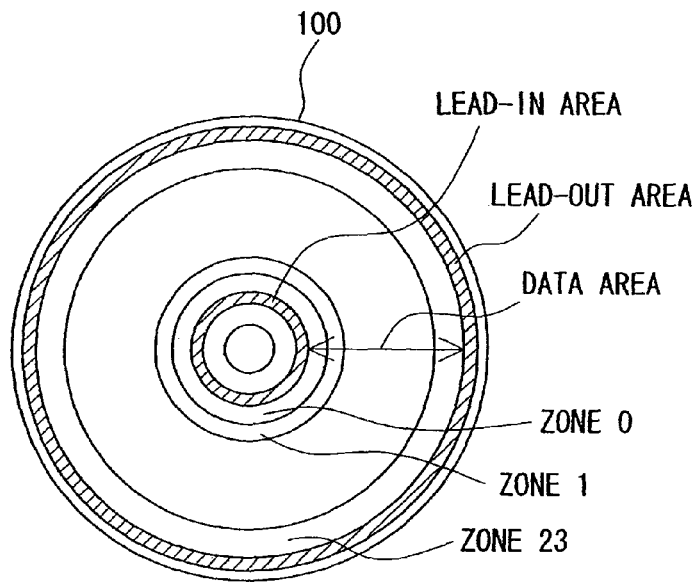
FIGS. 5A and 5B show a data region of a disc and data structure of the disc, respectively.
Figure 5B:
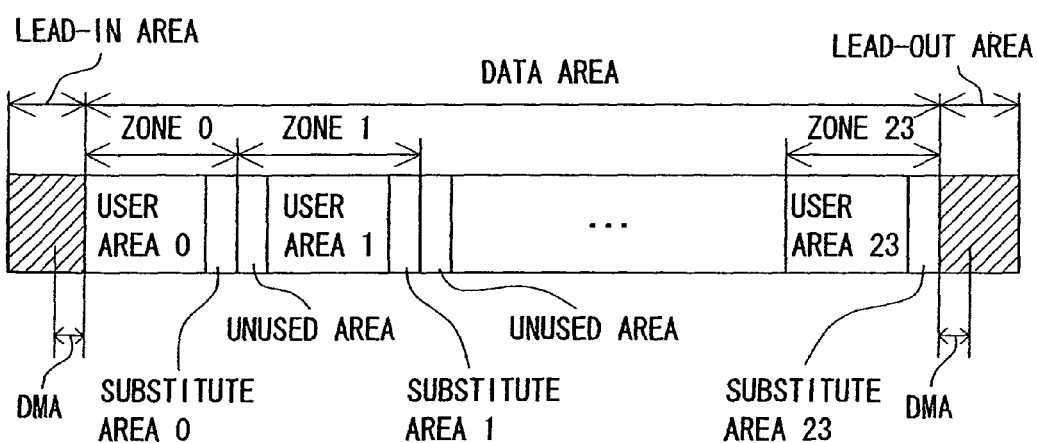

FIGS. 5A and 5B show the physical structure and a plan view of a DVD-RAM, i.e., a recordable optical disc. DVD-RAM discs are typically housed in a cartridge for loading to a DVD recorder. The purpose of the cartridge is to protect the disc. The DVD-RAM disc can, however, be loaded directly to the DVD recorder without being housed in a cartridge if the recording surface can be protected in some other way.

DVD-RAM discs are recorded using a phase-change recording technique. Data on the disc is managed by sector unit, and addresses are added for data access. Groups of 16 sectors are used for error correction, have an error correction code added thereto, and are referred to as ECC blocks.

FIG. 5A shows the recording area of a DVD-RAM disc, i.e., a recordable optical disc. As shown in the figure, a DVD-RAM disc has a lead-in area at the inside circumference, a lead-out area at the outside circumference, and a data area between the lead-in and lead-out areas.

Reference signals for stabilizing the servo when accessing the disc with the optical pickup, and an ID signal for distinguishing a DVD-RAM disc from other types of media, are recorded to the lead-in area.

The same reference signals are also recorded to the lead-out area.

The data area is segmented into sectors (each 2048 bytes) as the smallest access unit. The data area is also segmented into a plurality of zones in order to apply a rotational control technique known as Zone Constant Linear Velocity (Z-CLV) during recording and playback.

FIG. 5A shows plural zones formed concentrically on the DVD-RAM disc. In this example the DVD-RAM disc is divided into 24 zones, labelled zone 0 to zone 23. The rotational angular velocity of the DVD-RAM is set differently in each zone such that it increases in proximity to the inside circumference and is constant while the optical pickup accesses data in the same zone. This increases the recording density of the DVD-RAM and enables easier rotational control during recording and playback.

FIG. 5B shows the lead-in area, lead-out area, and zones 0 to 23 concentrically arranged in FIG. 5A when viewed in a line through the disc radius.

The lead-in area and lead-out area each include a defect management area (DMA). The defect management area is for recording position information indicating the location of a sector containing a defect, and substitute sector position information indicating in which substitute area the sector substituted for the defective sector is located.

Each zone includes a user area between a substitute area and an unused area. The user area is the area that can be used by the file system as a recording area. The substitute area is the area substitutionally used when there is a defective sector. The unused area is an area not used for data recording, and is approximately two tracks wide. The sector address is recorded to the same position in adjacent tracks within each zone, but with Z-CLV the sector address is recorded to a different position in tracks adjacent to the zone boundary. This unused area is therefore provided to prevent sector address detection errors in tracks adjacent to the zone boundary.

There are, therefore, sectors not used for data recording at the zone boundaries. A logical sector number (LSN) is therefore assigned to each physical sector in the user area of a DVD-RAM disc sequentially from the inside circumference in order to continuously identify only those sectors used for data recording.

FIG. 6 shows the logical data space of a DVD-RAM disc comprising logical sectors. The logical data space is called the "volume space" and is used to record user data.

Data recorded in the volume space is managed with a file system. More specifically, a group of sectors storing data is a "file," and volume structure information managing a group of files as a "directory" is recorded to the beginning and end of the volume area. The UDF file system is used in the present embodiment and conforms to ISO 13346.

The above-noted group of sectors is not necessarily contiguous within the volume space, and can be split into separate parts. Of the sectors constituting each file, the file system therefore manages each group of contiguous sectors in the volume space as an extent, and manages each file as a set of related extents.

Figure 7:
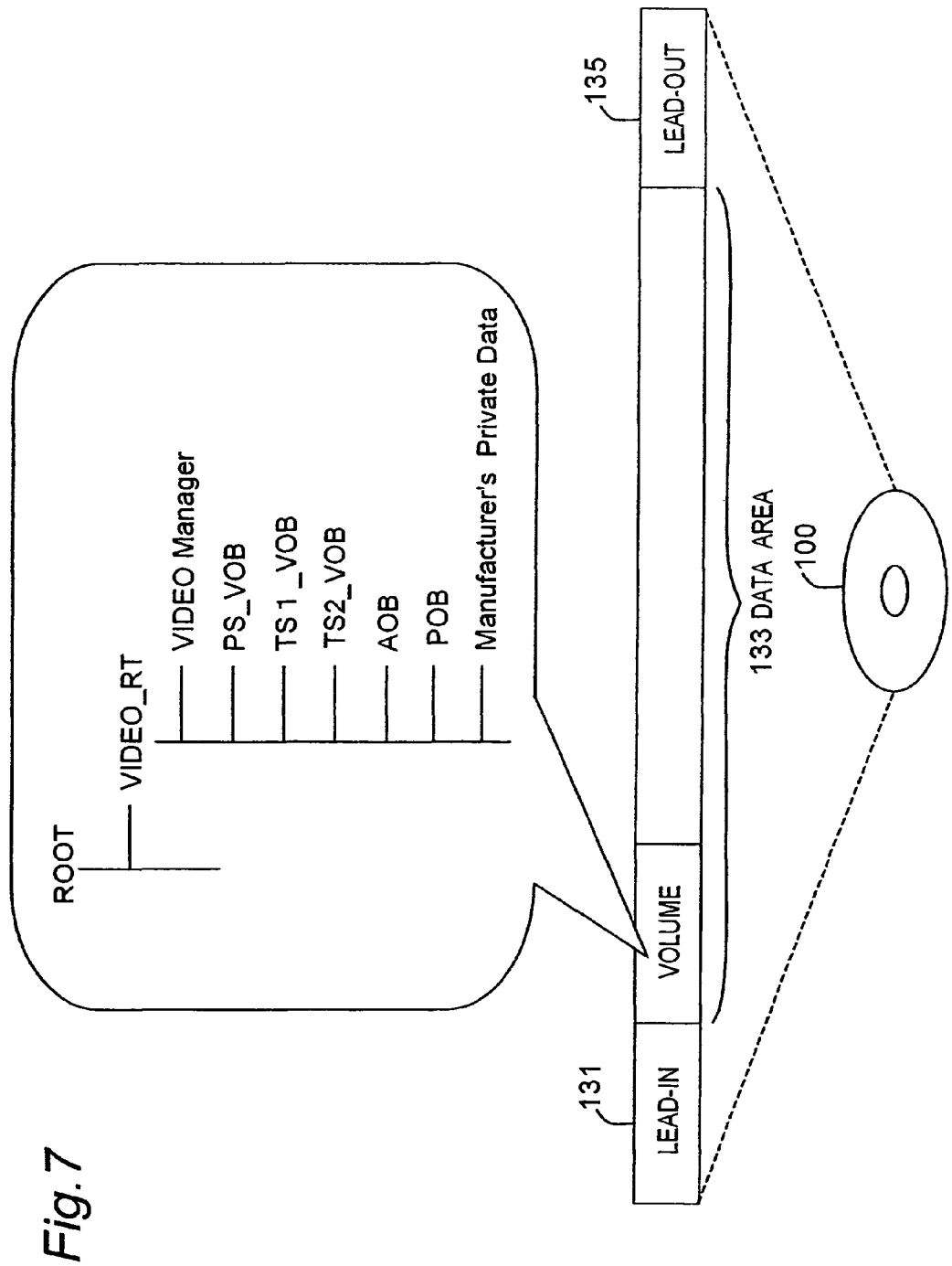
FIG. 7 shows the disc directory and file structure.

FIG. 7 shows the structure of a directory and file recorded to DVD-RAM. Below the root is the VIDEO_RT directory, and below VIDEO_RT are the various object files containing the playback data and a VIDEO Manager file containing management information such as the playback sequence and various attributes.

Objects are data structures conforming to MPEG standards, and include PS_VOB, TS1_VOB, TS2_VOB, AOB, POB, and MNF (Manufacturer's Private Data).

PS_VOB, AOB, and POB are MPEG program streams (PS), and TS1_VOB and TS2_VOB are MPEG transport streams (TS). The program stream has a data structure designed for storing AV data to package media. The transport stream has a data structure intended for communications media.

PS_VOB, TS1_VOB and TS2_VOB are objects of primarily video data but containing both video data and audio data. In principle, TS1_VOB objects are encoded by the DVD recorder with an explicitly managed internal picture structure. TS2_VOB objects are encoded externally to the DVD recorder, and part of the internal picture structure and data structure is unknown.

Typically, TS1_VOB objects are externally input analog video signals encoded by the DVD recorder to the transport stream, and TS2_VOB objects are externally input digital video signal objects recorded directly to disc without further encoding by the DVD recorder. That is, when a DVD recorder records digital broadcasting, TS2_VOB is generally used.

AOB and POB are MPEG program streams. AOB objects contain primarily audio data, and POB objects contain primarily still images.

The MNF (Manufacturer's Private Data) block is used to store information specific to a particular manufacturer.

"Primarily video data" and "primarily audio data" above indicate that a high bit rate is allocated. VOB are used in video and similar applications, and AOB are used in music applications.

4. Outline of Reproduced Av Data

Figure 8:
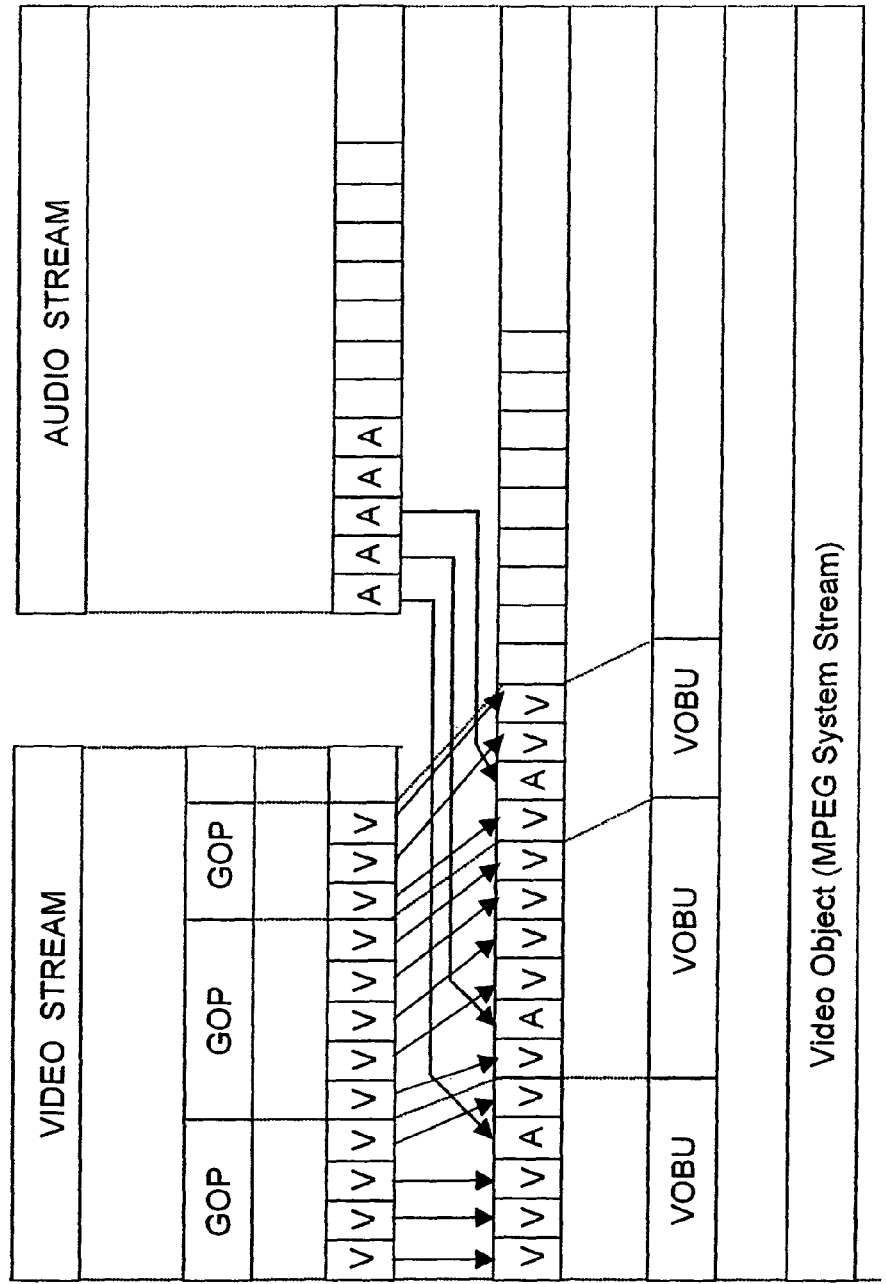
FIG. 8 shows the structure of a video object.

FIG. 8 shows the structure of MPEG data recorded as AV objects to a DVD.

As shown in FIG. 8, the video stream and audio stream are segmented and multiplexed. The MPEG standard refers to the multiplexed streams as the system stream. In the case of DVD, a system stream containing DVD specific settings is called a VOB (Video OBject). The segmentation units are called packs and packets, and are approximately 2 KB in size.

The video stream is encoded according to the MPEG standard, variable bit rate compressed such that the bit rate is increased in complex images such as images containing much movement. The pictures in an MPEG stream are encoded as I-pictures, P-pictures, or B-pictures. I-pictures are spatially compressed and complete within each frame. P-pictures and B-pictures are temporally compressed using inter-frame correlations. A series of pictures including at least one I-picture is referred to as a Group of Pictures (GOP) in MPEG. A GOP is the access point for fast play and other special play modes, which are made possible by the presence of at least one intra-frame compressed I-picture.

In addition to using MPEG audio, the audio stream of a DVD can be encoded using AC-3, LPCM, or other encoding technique.

As also shown in FIG. 8 the Video Object Unit (VOBU) is the data unit multiplexing the video data of a GOP with the associated audio data. Video management data can also be included in a VOBU as header information.

A program stream (PS) and transport stream (TS) are included in the system stream described with reference to FIG. 8. As noted above, the program stream has a data structure intended for package media and the transport stream data structure is intended for communications media.

FIG. 9 shows the concept of the program stream and transport stream data structures.

The program stream comprises fixed length packs that are the smallest unit for data transfer and multiplexing. Each pack contains one or more packets. Both packs and packets comprise a header part and a data part. The data part is referred to as the payload in MPEG. For compatibility with the sector size, the fixed length of a pack in DVD is 2 KB. A pack can contain multiple packets, but because packs storing DVD video and audio contain only one packet, 1 pack equals 1 packet except in special cases.

The data transfer and units for multiplexing of the transport stream comprises fixed length TS packets. TS packet size is 188 bytes for compatibility with ATM transmissions, a communications standard. One or more TS packets form a PES packet.

PES packets are a concept common to both the program stream and transport stream, and the data structure is the same. Packets stored in program stream packs directly form PES packets, and a group of one or more transport stream TS packets form a PES packet.

The PES packet is the smallest encoding unit and stores video data and audio data with common encoding. More specifically, video data and audio data encoded with different coding methods are not present in a same PES packet. However, if the coding method is the same, it is not necessary to ensure the picture boundaries and audio frame boundaries. As shown in FIG. 9 one frame is stored to plural PES packets, and plural frames may be stored to one PES packet.

FIGS. 10A to 10C and FIGS. 11A to 11C show the data structures of the transport stream and program stream.

As shown in FIGS. 10A to 10C and FIGS. 12A to 12D, each TS packet comprises a TS packet header, adaptation field, and payload. The TS packet header stores a Packet Identifier (PID) whereby the video, audio, or other stream to which the TS packet belongs can be identified.

The Program Clock Reference (PCR) is stored to the adaptation field. The PCR is the reference value for the system time clock (STC) of the device decoding the stream. The device typically demultiplexes the system stream based on the PCR timing, and then reassembles the video stream and other streams.

The Decoding Time Stamp (DTS) and Presentation Time Stamp (PTS) are stored to the PES header. The DTS indicates the decoding timing of the picture or audio frame stored to the PES packet, and the PTS indicates the presentation timing of the video or audio output.

It should be noted that the PTS and DTS need not be written to every PES packet header. Decoding and output are possible insofar as the PTS and DTS are written to the header of the PES packet where the first data of the I-picture is stored.

The TS packet structure is shown in detail in FIGS. 12A to 12D.

As shown in FIGS. 12A to 12D the adaptation field stores the PCR and a random access presentation flag. This flag indicates whether data that is at the beginning of the video or audio frame and can be used as an access point is stored in the corresponding payload. In addition to the above-noted PID, the TS packet header also stores a unit start presentation flag indicating the beginning of a PES packet, and adaptation field control data indicating whether an adaptation field follows.

FIGS. 11A to 11C show the structure of packs in the program stream. The pack contains the SCR in the pack header and a stream_id in the packet header of packets stored in the pack. The SCR is effectively identical to the transport stream PCR, and the stream_id to the PID. The PES packet data structure is also the same as in the transport stream, and the PTS and DTS are stored in the PES header.

One major difference between the program stream and transport stream is that the transport stream allows for multiple programs. That is, in terms of program units, the program stream can carry only one program but the transport stream can simultaneously transmit multiple programs. This means that the playback device must be able to identify the video streams and audio streams constituting each program carried in the transport stream.

FIGS. 13A to 13C2 shows the PAT table and PMAP table used to transmit structure information for the audio stream and video stream of each program. As shown in FIGS. 13C1 and 13C2 the PMAP table stores information relating to the combination of video and audio streams used in each program, and the PAT table stores information correlating programs and PMAP tables. The playback device can therefore reference the PAT table and PMAP table to detect the video and audio streams for the program to be output.

How the program stream packs and transport stream TS packets described above are arranged on the disc is described next with reference to FIGS. 14A to 14C.

As shown in FIG. 14A there are 32 sectors in an ECC block.

As shown in FIG. 14B, the packs (PS Packs) forming a video object (PS_VOB) of a program stream type are located at the sector boundaries. This is because the pack size and sector size are both 2 KB.

Video objects (TS1_VOB, TS2_VOB) of the transport stream type, however, are 8 KB units and are therefore contained in the ECC block. Each 8 KB unit contains an 18 byte header area and 43 TS packets containing Arrival Time Stamp (ATS) information in the data area. The ATS information is data generated and added by the DVD recorder, and indicates the timing at which the packet was received by the DVD recorder from an external source.

It should be noted that an MPEG_TS storage format continuously recording combinations of fixed-byte length ATS and MPEG_TS packets is also possible as shown in FIG. 14C.

5. Av Data Management Information and Playback Control

FIGS. 15A to 15B and FIGS. 16A to 16B show the data structure of the video management information file (Video Manager) shown in FIG. 7.

The video management information includes object information describing such management information as where objects are recorded on disc, and presentation control information describing the playback sequence of the objects.

Figure 15A:
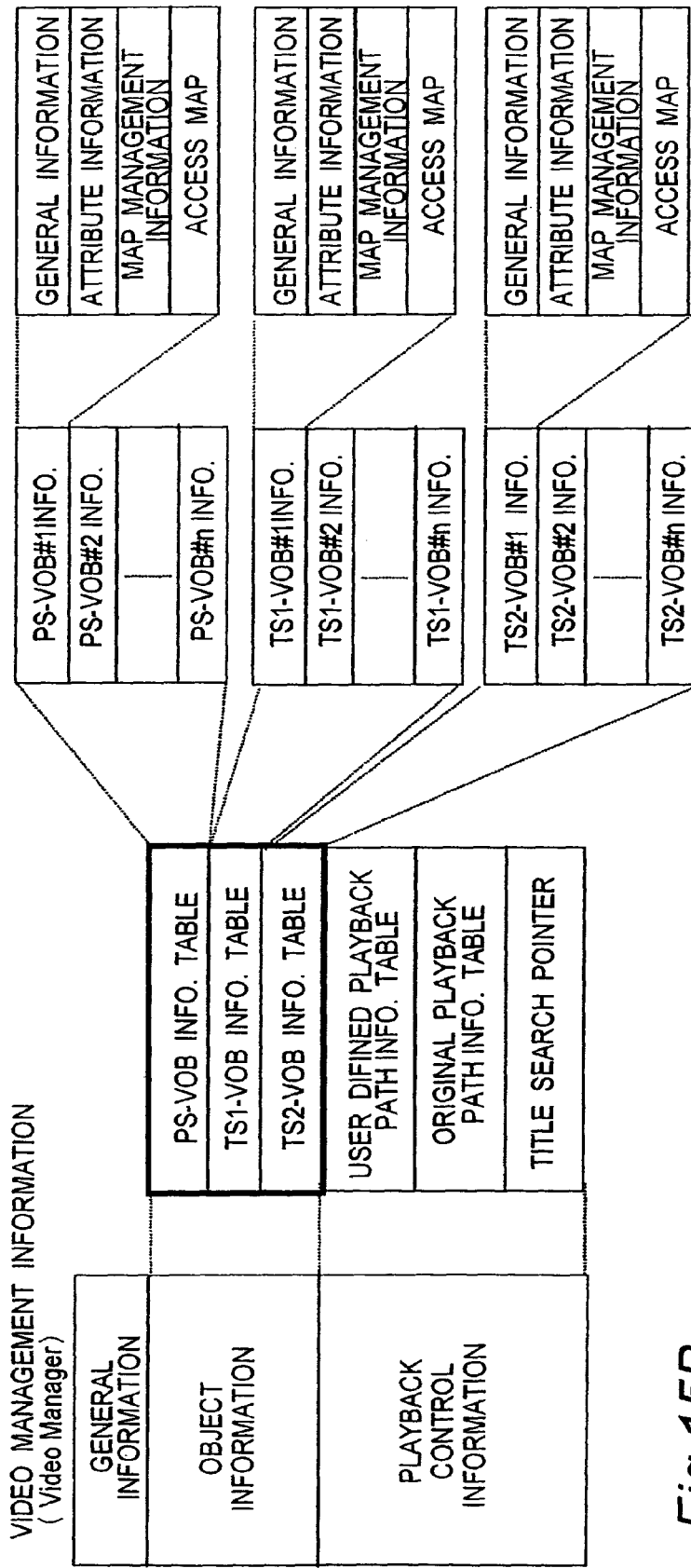
FIGS. 15A and 15B show the data structure of video management information.

FIG. 15A shows an example in which the objects recorded to the disc include PS_VOB#1-PS_VOB#n, TS1_VOB#1-TS1_VOB#n, and TS2_VOB#1-TS2_VOB#n.

As shown in FIG. 15A a PS_VOB information table, TS1_VOB information table, and TS2_VOB information table are separately recorded according to the object types. Each of these tables stores VOB information for each object.

The VOB information includes general information about the corresponding object, object attribute data, an access map for converting the object playback time to a disc address value, and management information for the access map. The general information includes identification information for the corresponding object and object recording time. The attributes include video stream attributes (V_ATR) such as the video stream coding mode, the number of audio streams (AST_Ns), and audio stream attributes (A_ATR) such as the audio stream coding mode.

There are two reasons why an access map is required. The first is so that the playback path information avoids directly referencing object recording positions based on a sector address value, for example, and instead can indirectly reference object locations based on the object playback time. Object recording positions can change with RAM media as a result of editing the object, for example. This increases the amount of playback path information that must be updated if the playback path information references object recording positions directly based on the sector address. If the objects are referenced indirectly based on the playback time, however, it is not necessary to update the playback path information and only the access map needs to be updated.

The second reason is that the audio stream typically has two reference bases, the time base and data (bit stream) base, but the correlation therebetween is not complete.

For example, using a variable bit rate (a method of changing the bit rate according to the complexity of the image) is becoming the norm with MPEG-2 Video, an international standard for video stream encoding. In this case there is no proportional relationship between the amount of data from the stream start and playback time, and random access based on the time base is therefore not possible. An access map is used to resolve this problem by converting between the time base and data (bit stream) base.

As shown in FIG. 15A, the presentation control information includes a user-defined playback path information table, original playback path information table, and title search pointer.

Figure 16A:
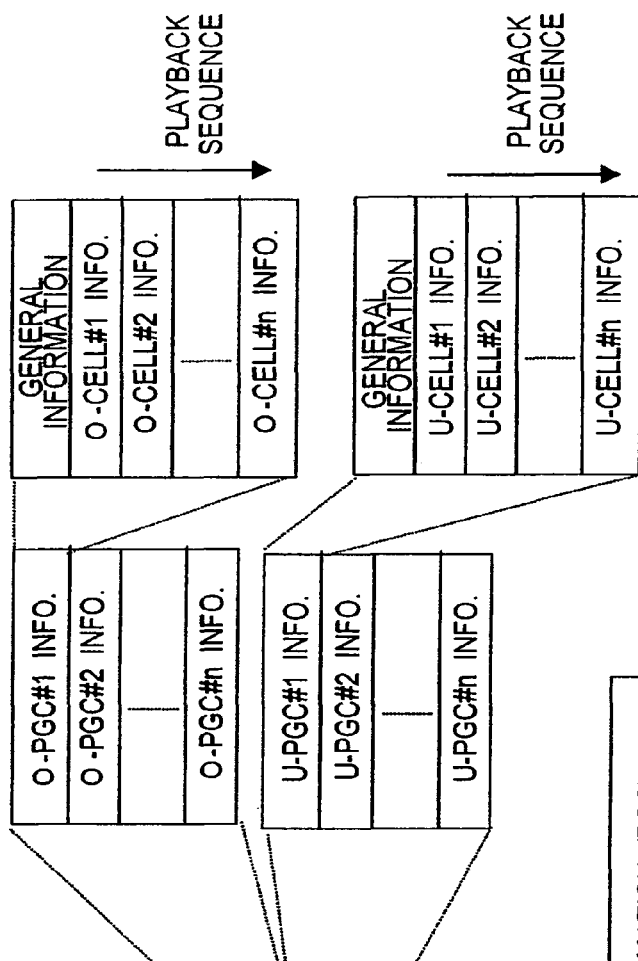
FIGS. 16A and 16B show the data structure of video management information.

As shown in FIG. 16A there are two types of playback paths data: originally defined playback path information generated automatically by the DVD recorder to describe all objects recorded during object recording, and user-defined playback path information enabling a user to freely define a particular playback sequence. The playback path information is uniformly referred to as Program Chain Information (PGC information) on a DVD, the user-defined playback path information is referred to as the U_PGC information, and the original playback path information as the O_PGC information. The U-PGC information and O_PGC information are tables listing the cell information describing the cells in the object playback period. The object playback period indicated by the O_PGC information is called an original cell (O_CELL), and the object playback period indicated by the U_PGC information is called a user cell (U_CELL).

A cell indicates the object playback period using the object playback start time and playback end time; the playback start and end times are converting by the access map described above to the actual location where the object is recorded on disc.

Figure 16B:
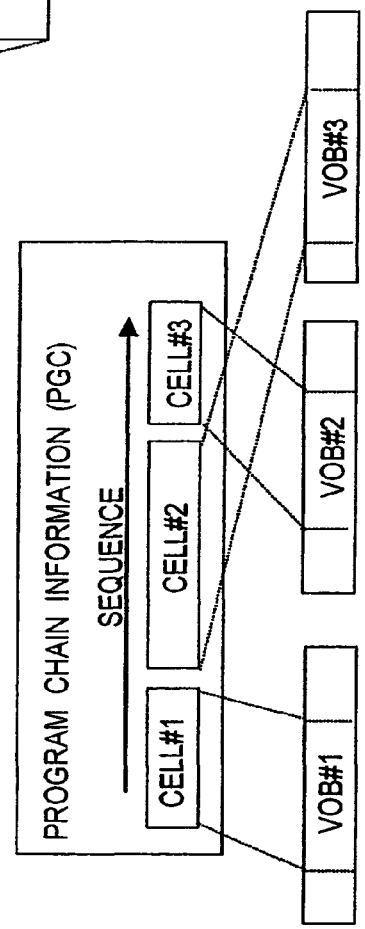

As shown in FIG. 16B, a cell group indicated by the PGC information defines a continuous playback sequence reproduced sequentially according to the order of entries in the table.

FIG. 17 shows a specific relationship between objects, cells, PGC, and access map.

As shown in FIG. 17 the original PGC information 50 contains at least one cell information entry 60, 61, 62, 63.

Each cell information entry defines the object to reproduce as well as the object type, and object playback period. The order of the cell information entries in the PGC information 50 defines the playback sequence of the objects defined by each cell when the objects are reproduced.

Each cell information entry (cell information 60, for example) includes a Type 60*a* indicating the type of specific object, an Object ID 60*b* identifying a particular object, and a start presentation time Start_PTM 60*c* and end presentation time End_PTM 60*d* in the object on the time base.

During data playback the cell information 60 is sequentially read from the PGC information 50, and the objects specified by each cell are reproduced for the playback period defined by the cell.

The access map 80*c* converts the start and end time information contained in the cell information to the object address on disc.

This access map is the map information described above and is generated and recorded when the objects are recorded. The picture structure of the object data must be analyzed in order to generate the map. More specifically, it is necessary to detect the I-picture location shown in FIG. 9, and detect the PTS and other time stamp information, that is, the I-picture playback time shown in FIGS. 10A to 10C and FIGS. 11A to 11C.

Problems occurring when generating the PS_VOB, TS1_VOB, and TS2_VOB map information are described next.

As described with reference to FIG. 1, the PS_VOB and TS1_VOB are primarily generated by the DVD recorder encoding a received analog broadcast to an MPEG stream. The I-picture and time stamp information is therefore auto-generated by the DVD recorder, the internal data structure of the stream is known to the DVD recorder, and the map information can be generated with no problem.

As also described with reference to FIG. 1, the TS2_VOB is a received digital broadcast recorded directly to disc by the DVD recorder with no intermediate encoding. Because the recorder thus does not generate the time stamp information and determine the I-picture locations as it does when recording a PS_VOB, the DVD recorder does not know the internal data structure of the stream and must therefore detect this information from the recorded digital stream.

To do this the DVD recorder detects the I-picture and time stamp information for the map information of a TS2_VOB recording a stream encoded externally to the recorder as follows.

First, I-pictures are detected by detecting the random access presentation information of the TS packet adaptation field shown in FIGS. 12A to 12D. The time stamp information is detected by detecting the PTS in the PES header. Note that the PCR from the adaptation field or the ATS indicating the TS packet arrival time at the DVD recorder can be used instead of the PTS for the time stamp. In any case, the DVD recorder detects I-picture locations based on information in a high level system layer and does not need to analyze the data structure of the MPEG stream video layer. This is because the system overhead required to analyze the video layer in order to generate the map information is great.

There are also cases in which system layer detection is not possible. The map information cannot be generated in such cases and it is therefore necessary to indicate that there is no valid map information. The DVD recorder indicates this using the map management information shown in FIG. 15B.

Figure 15B:
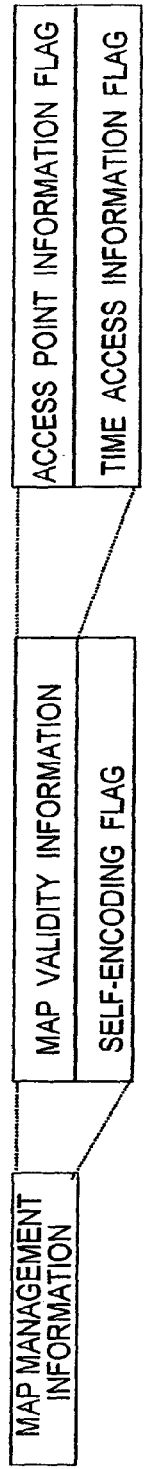

The map management information shown in FIG. 15B contains map validity information and a self-encoding flag. The self-encoding flag indicates that an object was encoded by the DVD recorder, and thus indicates that the internal picture structure is known and that the map information time stamp information and I-picture location information is accurate. The map validity information indicates whether or not there is a valid access map.

Examples of when the system layer cannot be detected include when the adaptation field is not set and when the digital stream is not an MPEG transport stream. Various digital broadcasting standards and formats are used around the world, and there will naturally be cases in which the DVD recorder records objects for which it cannot generate a map. For example, if a DVD recorder designed for the Japanese market and recording digital broadcasts in Japan is used in the United States to record digital broadcasts in the United States, there will likely be cases in which the DVD recorder cannot generate a map for the recorded objects.

The DVD recorder can, however, sequentially reproduce from the beginning objects for which map information is not generated. In this case video from the recorded digital stream can be reproduced by outputting it through a digital interface to a STB appropriate to the stream.

6. Basic Operation of the Playback Function

The playback operation of a DVD recorder/player for reproducing content recorded to an optical disc as described above is described next below with reference to FIG. 18.

Figure 18:
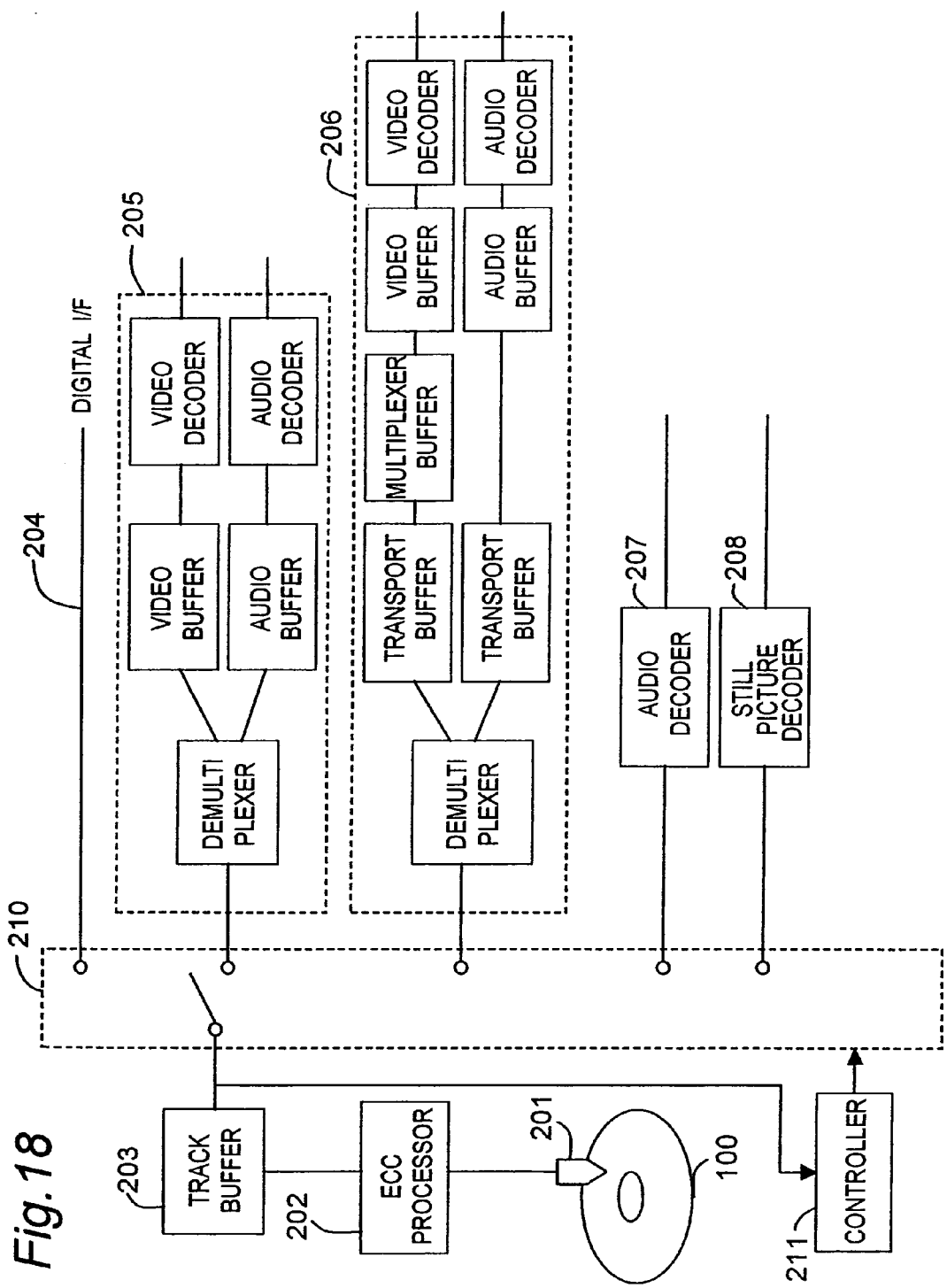
FIG. 18 is a block diagram showing the functional configuration of a playback apparatus.

As shown in FIG. 18 the DVD player has an optical pickup 201 for reading data from the optical disc 100, an ECC processor 202 for error correction processing of the read data, a track buffer 203 for temporarily storing the read data after error correction, a PS decoder 205 for reproducing video objects (PS_VOB) and other program streams, a TS decoder 206 for reproducing digital broadcast objects (TS2_VOB) and other transport streams, an audio decoder 207 for reproducing audio objects (AOB), a still picture decoder 208 for decoding still picture objects (POB), a switching means 210 for changing data input to the decoders 205 to 208, and a controller 211 for controlling the various parts of the player.

Data recorded to the optical disc 100 is read by the optical pickup 201, passed through the ECC processor 202 and stored to track buffer 203. Data stored to the track buffer 203 is then input to and decoded and output by the PS decoder 205, TS decoder 206, audio decoder 207, or still picture decoder 208.

The controller 211 determines what data to be read based on the playback sequence defined by the playback path information (PGC) shown in FIGS. 16A and 16B. Using the example shown in FIGS. 16A and 16B, the controller 211 thus first reproduces part (CELL #1) of VOB #1, then part (CELL #2) of VOB #3, and finally VOB #2 (CELL #3).

Using the cell information of the playback path information (PGC) shown in FIG. 17, the controller 211 an also capture the type of cell reproduced, corresponding objects, and the playback start and end times of the objects. The controller 211 inputs the data for the period of the object specified by the cell information to the appropriate decoder.

The controller 211 also identifies the objects to be reproduced based on the Object ID of the cell information. The controller 211 also identifies a cell, which is the playback period of the identified object, by converting the Start_PTM and End_PTM of the cell information to a disc address value by referencing the access map of the corresponding VOB information.

A player according to this embodiment of the invention also has a digital interface 204 for supplying the AV stream to an external device. It is therefore possible to supply the AV stream to an external device through an IEEE 1394, IEC 958, or other communications means. This is so that, for example, when the player does not have an internal decoder for decoding a TS2_VOB not encoded by the recorder/player the TS2_VOB can be output directly without decoding through the digital interface 204 to an external STB for decoding and presentation via the STB.

When the digital data is directly output to an external device, the controller 211 determines whether random access playback is possible based on the map information shown in FIG. 15B. If the access point data flag (random access presentation flag) is valid, the access map contains I-picture location information. In this case the controller 211 is able to access and output digital data containing an I-picture to an external device through the digital interface in response to fast play and other requests from the external device. Furthermore, time-base access is also possible if the time access information flag is valid. In this case the controller 211 can access and output digital data including the picture data at a specified playback time to an external device through the digital interface in response to a time-base access request from an external device.

7. Basic Operation of the Recording Function

The configuration and operation of a DVD recorder according to the present invention for recording and reproducing an optical disc as described above is described next below with reference to FIG. 19.

Figure 19:
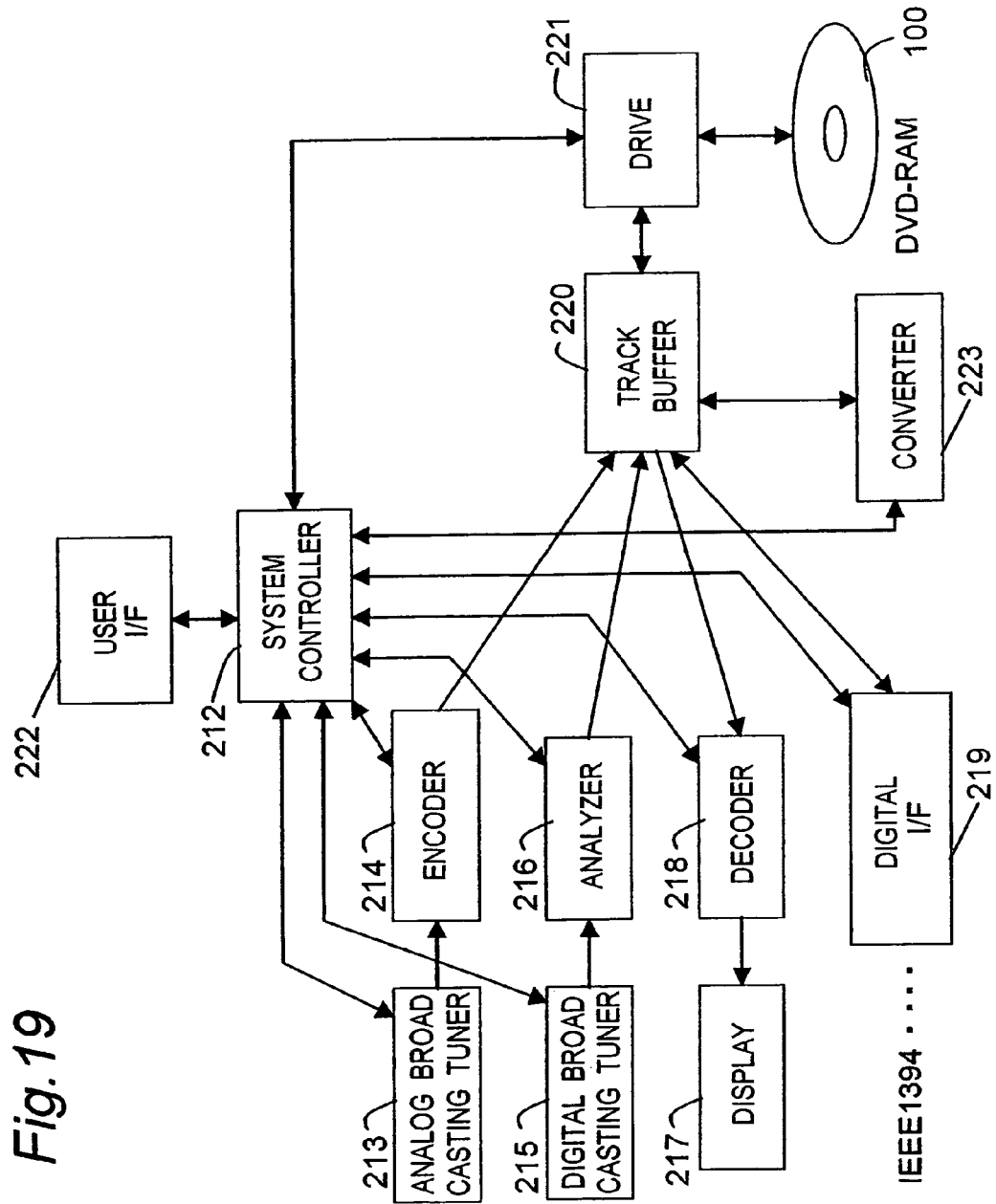
FIG. 19 is a block diagram showing the functional configuration of a recording apparatus.

As shown in FIG. 19 the DVD recorder has a user interface 222 for receiving user requests and displaying information and prompts to the user, a system controller 212 handling the overall management and control of the DVD recorder, an analog broadcast tuner 213 for receiving VHF and UHF broadcasts, an encoder 214 for converting analog signals to digital signals and encoding the digital signals to an MPEG program stream, a digital broadcast tuner 215 for receiving digital satellite broadcasts, an analyzer 216 for interpreting the MPEG transport stream sent from a digital satellite, a display unit 217 such as a television and speakers, and a decoder 218 for decoding the AV stream. The decoder 218 has first and second decoders, for example, such as shown in FIG. 18. The DVD recorder also has a digital interface 219, track buffer 220 for temporarily storing write data, and a drive 221 for writing data to the disc. The digital interface 219 is an IEEE 1394 or other communications interface for outputting data to an external device.

With a DVD recorder thus comprised the user interface 222 first receives a request from the user. The user interface 222 then passes the request to the system controller 212, and the system controller 212 interprets the user request and instructs the various modules to run appropriate processes.

Recording includes self-encoding in which the DVD recorder encodes the input digital data, and outside encoding for recording already encoded digital data to disc without further encoding.

7.1 Recording Operation by Self-encoding

Recording with self-encoding is described specifically first below using by way of example encoding and recording an analog broadcast to a PS_VOB stream.

The system controller 212 sends a receive command to the analog broadcast tuner 213 and an encode command to the encoder 214.

The encoder 214 then video encodes, audio encodes, and system encodes the AV data from the analog broadcast tuner 213, and passes the encoded data to the track buffer 220.

Immediately after encoding starts, the encoder 214 sends the time stamp information at the beginning of the MPEG program stream being encoded to the system controller 212 as the playback start time (PS_VOB_V_S_PTM), and parallel to the encoding process sends the data required to create the access map to the system controller 212. This value is set as the Start_PTM of the cell information shown in FIG. 17 and generated later. The time stamp information is generally the PTS, but the SCR can be used instead.

The system controller 212 then sends a record command to the drive 221, and the drive 221 thus extracts and records data accumulated in the track buffer 220 to the DVD-RAM disc 100. A contiguous data area (CDA) as described above is also found in the recordable area of the disc and the data is recorded to the located contiguous data area.

Recording typically ends when the user inputs a stop recording command. Stop recording commands from the user are input through the user interface 222 to the system controller 212, and the system controller 212 then sends a stop command to the analog broadcast tuner 213 and encoder 214.

The encoder 214 stops encoding when it receives the stop encoding command from the system controller 212, and sends the time stamp information of the last data in the last encoded MPEG program stream to the system controller 212 as the playback end time (PS_VOB_V_E_PTM). This value is set as the End_PTM of the cell information shown in FIG. 17. The PTS is normally used for the time stamp information but the SCR can be used instead.

After ending the encoding process the system controller 212 generates the presentation control information and VOB information (PS_VOBI) for the PS_VOB shown in FIGS. 15A and 15B.

The VOB information generated here includes map management information and an access map appropriate to the object type. The system controller 212 sets the map validity information of the map management information to "valid," and sets the self-encoding flag ON.

Original playback information (O_PGC information) as shown in FIG. 16A for the recorded object as one of the playback objects is generated as the presentation control information. This O_PGC information is added to the original playback path table. The original playback path (O_PGC information) contains cell information. The cell information Type is set to PS_VOB.

The system controller 212 then instructs the drive 221 to stop recording data accumulated in the track buffer 220 and to record the PS_VOB VOB information (PS_VOBI) and presentation control information. The drive 221 thus records the remaining data in the track buffer 220 and this information to the optical disc 100, and the recording process ends.

It will be obvious that an analog broadcast could be encoded to TS1_VOB. In this case the encoder 214 must be an encoder for converting the analog signal to a digital signal and encoding the digital signal to the MPEG transport stream, and the cell information Type is set to TS1_VOB.

The PTS or PCR can be used for the Start_PTM and End_PTM.

7.2 Recording Operation by Outside Encoding

Recording with outside encoding is described specifically next below with reference to recording a digital broadcast. The recorded object type in this case is TS2_VOB.

A digital broadcast recording request from the user is passed from the user interface 222 to the system controller 212. The system controller 212 then instructs the digital broadcast tuner 215 to receive and instructs the analyzer 216 to interpret the received data.

An MPEG transport stream sent from the digital broadcast tuner 215 is passed through the analyzer 216 to the track buffer 220.

To generate the VOB information (TS2_VOBI) of the encoded MPEG transport stream (TS2_VOB) received as a digital broadcast, the analyzer 216 first extracts the time stamp information at the beginning of the transport stream as the start time information (TS2_VOB_V_S_PTM) and sends it to the system controller 212. This start time value is set as the Start_PTM of the cell information shown in FIG. 17 and generated later. The time stamp information is the PCR or PTS. The ATS indicating the timing at which the object is sent to the DVD recorder could alternatively be used.

The analyzer 216 then analyzes the system layer of the MPEG transport stream to detect the information needed for access map generation. The I-picture locations in the object are detected based on the random access indicator (random_access_indicator) in the adaptation field of the TS packet header as described above.

The system controller 212 then outputs a record command to the drive 221, and the drive 221 thus extracts and records data accumulated in the track buffer 220 to the DVD-RAM disc 100. The system controller 212 also instructs the drive 221 where to record on the disc based on the allocation data of the file system. A contiguous data area (CDA) as described above is also found in the recordable area of the disc and the data is recorded to the located contiguous data area.

Recording typically ends when the user inputs a stop recording command. Stop recording commands from the user are input through the user interface 222 to the system controller 212, and the system controller 212 then sends a stop command to the digital broadcast tuner 215 and analyzer 216.

In response to the received stop command from the system controller 212, the analyzer 216 stops interpreting the received data and sends the time stamp information at the end of the last interpreted MPEG transport stream to the system controller 212 as the playback end time (TS2_VOB_V_E_PTM). This value is set as the End_PTM of the cell information shown in FIG. 17. The PCR or PTS is used for the time stamp information but the ATS indicating the time when the object was sent to the DVD recorder can be used instead.

After ending the digital broadcast reception process, the system controller 212 generates the presentation control information and VOB information (TS2_VOBI) for the TS2_VOB as shown in FIGS. 15A and 15B based on the information received from the analyzer 216.

The VOB information generated here includes map management information and an access map appropriate to the object type. The system controller 212 sets the map validity information of the map management information to "valid" if the I-picture locations in the objects were detected and the access map could be generated. The self-encoding flag is set OFF. If a valid access map could not be generated the map validity information is set to an "invalid" state. Examples of when a valid access map cannot be generated include when a corresponding digital broadcast is not received and when there is no random access data set in the adaptation field. If the signal is input directly through the digital interface the signal may also not be an MPEG transport stream, and in this case, too, the map validity flag is set to "invalid."

Original playback information (O_PGC information) as shown in FIGS. 16A and 16B for the recorded object as one of the playback objects is generated as the presentation control information. This O_PGC information is added to the original playback path table. The original playback path (O_PGC information) contains cell information. The cell information Type is set to TS2_VOB.

The system controller 212 then instructs the drive 221 to stop recording data accumulated in the track buffer 220 and to record the TS2_VOB VOB information (TS2_VOBI) and presentation control information. The drive 221 thus records the remaining data in the track buffer 220 and this information to the optical disc 100, and the recording process ends.

While the above recording operations are described with reference to user-input recording start and end commands, it will be obvious that the same essential operation applies to timer recordings controlled by a VCR, for example. In this case the system controller automatically issues the recording start and end commands instead of the user, and there is no essential change in DVD recorder operation.

8. Outline of the Invention

A data recording medium according to the present invention is a medium for recording data of various different formats, including analog broadcast or digital broadcast content and various types of data input through an analog/digital interface. A data recording apparatus according to the present invention is an apparatus for recording AV data to and reproducing AV data from the same data recording medium.

More particularly, externally input AV data is recorded as an MPEG_TS, and a stream adding decoder input time data for each MPEG_TS packet to each MPEG_TS packet is recorded to the data recording medium of the present invention.

Recorder specific or content specific information and the locations of PSI (Program Specific Information) packets containing MPEG_TS control information are also embedded as a user private stream (UP packet), and the decoder input time of each packet is added in a format suitable for accumulation.

Furthermore, so simplify conversion to an MPEG_PS when multiplexing the MPEG_TS, data less than one pack (2048 bytes) is system encoded as one continuous multiplexing unit, and an MPEG_TS is recorded while allocating each continuous multiplexing unit to one or plural MPEG_TS packets.

9. Detailed Embodiments of the Invention
First Embodiment

Figure 20:
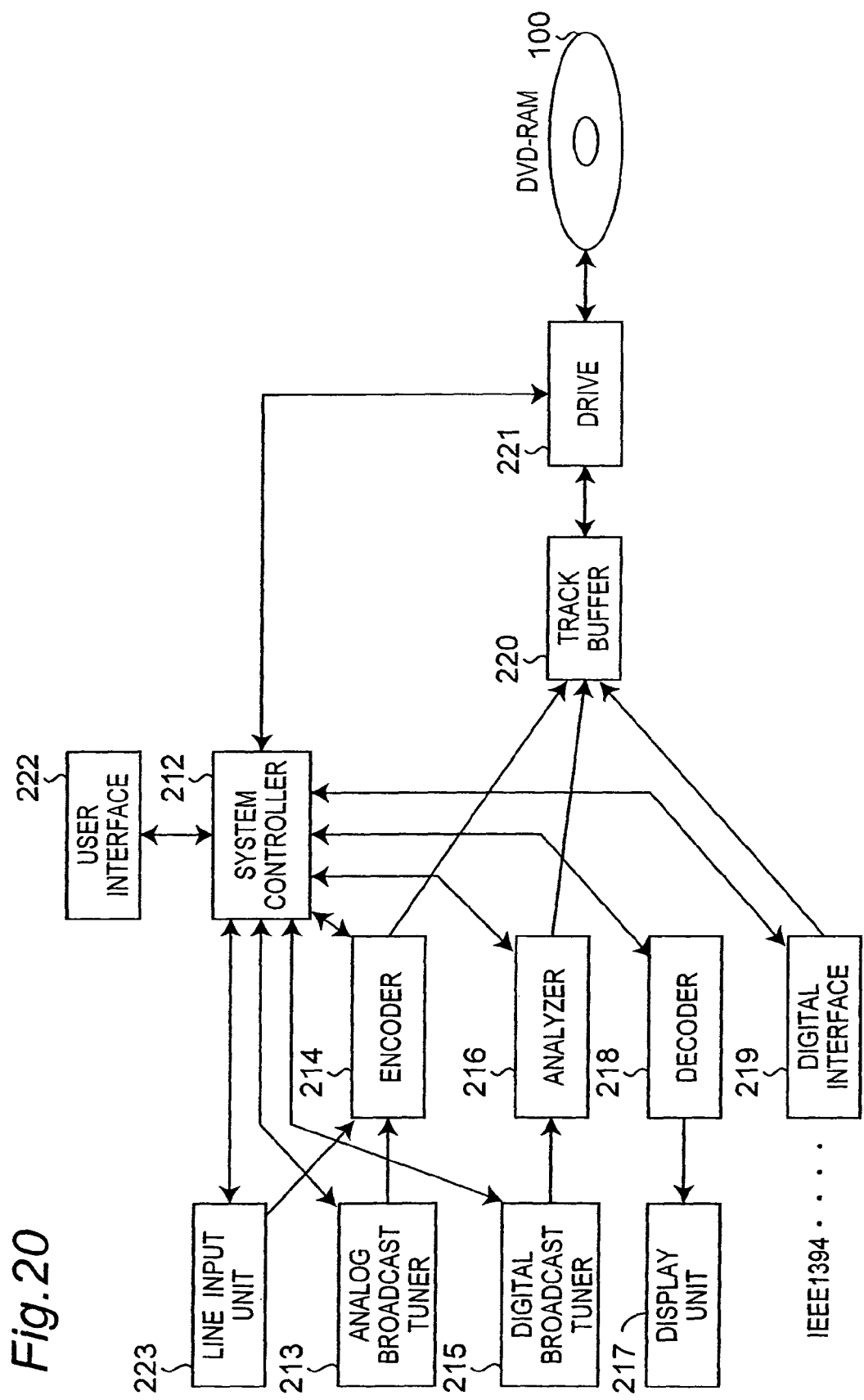
FIG. 20 is a block diagram showing the configuration of a data recording and reproducing apparatus according to the present invention.

The basic recording and playback operations of a data recording and reproducing apparatus according to the present invention are substantially as described above, and only the basic operation for recording analog line input is therefore described specifically below with reference to FIG. 20. The recorded object type in this case is TS1_VOB.

Analog line input recording requests from a user are passed from the user interface 222 to the system controller 212. The system controller 212 then sends a receive command to the line input unit 223 and a data encoding command to the encoder 214.

The MPEG transport stream from the encoder 214 is sent to the track buffer 220.

To generate the VOB information (TS1_VOBI) of the encoded MPEG transport stream (TS1_VOB), the encoder 214 first sets the time stamp information as the presentation start time (TS1_VOB_V_S_PTM) and sends it to the system controller 212. This start time value is set as the Start_PTM of the cell information generated later and shown in FIG. 17. The time stamp information is the PCR or PTS.

The encoder 214 also generates the data needed for access map generation while generating the MPEG transport stream. This is done by, for example, storing the adaptation field in the first MPEG transport packet of the I-picture, setting the random_access_indicator bit, and notifying the system controller 212 of the start of a VOBU.

The system controller 212 then sends a record command to the drive 221, and the drive 221 extracts and records data from the track buffer 220 to the DVD-RAM disc 100. The system controller 212 also instructs the drive 221 where to record on the disc based on the allocation data of the file system. A contiguous data area (CDA) as described above is also found in the recordable area of the disc and the data is recorded to the located contiguous data area.

Recording typically ends when the user inputs a stop recording command. Stop recording commands from the user are input through the user interface 222 to the system controller 212, and the system controller 212 then sends a stop command to the encoder 214.

In response to the received stop command from the system controller 212, the encoder 214 stops the encoding process and sends the time stamp information included in data at the end of the last encoded MPEG transport stream to the system controller 212 as the end presentation time (TS1_VOB_V_E_PTM). This value is set as the End_PTM of the cell information shown in FIG. 17. The time stamp information becomes PCR or PTS.

After ending the recording process, the system controller 212 generates the playback control information and VOB information (TS1_VOBI) for the TS1_VOB as shown in FIGS. 15A and 15B based on the information received from the encoder 214.

The VOB information generated here includes an access map and map management information those adapted to the object type. The system controller 212 sets the map validity information of the map management information to "valid". The self-encoding flag is set ON.

Original playback path information (O_PGC information) as shown in FIGS. 16A and 16B for the recorded object as one of the playback objects is generated as the presentation control information. This O_PGC information is added to the original playback path table. The original playback path information (O_PGC information) contains cell information. Type information of the cell information is set to "TS1_VOB".

The system controller 212 then instructs the drive 221 to stop recording data accumulated in the track buffer 220 and to record the VOB information (TS1_VOBI) and playback control information for TS1_VOB. The drive 221 thus records the remaining data in the track buffer 220 and this information to the optical disc 100, and the recording process ends.

The self-encoding MPEG transport stream generated by the encoder 214 is described in further detail below.

The structure of the self-encoding MPEG transport stream is shown in FIGS. 21A and 21B. As shown in the figure the self-encoding MPEG transport stream is segmented into VOBU units. Each VOBU starts with a PAT packet, PMT packet, and a User Private packet (UP packet) embedded with stream-specific data. A PAT packet and PMT packet at least are also located at the beginning of the VOB.

As shown in FIG. 21B an ATS indicating the decoder input time is also added to each packet, and each packet is input to the decoder at the time intended by the ATS.

The self-encoding program information (such as the PMT packet PID) is stored to the PAT packet of the first packet and input to the decoder at the time indicated by ATS1.

The PID for each elementary stream composing the program is stored to the PMT packet of the second packet. In this example PIDs for the video, audio, data broadcast ("Data" in the figure), and user private ("private" in the figure) packets are stored.

Information added to the stream is stored to the user private packet in the third packet. This added information could, for example, include: stream title information; recording date and time information; stream attributes, that is, stream encoding information such as the bit rate, video resolution, frame rate, aspect ratio, or encoding method; input source identification information for identifying whether the line input is analog or digital; information indicating the AV data encoding method if the data is digital; copyright protection information indicating whether copying is allowed or prohibited; Vertical Blanking Interval (VBI) signals such as closed caption (CC) data, teletext data, or Wide_Screen Signaling (WSS) data used for display control; information indicating system encoding conditions; DVD standard compatibility information; menu information provided for user convenience using specific data provided by the manufacturer that recorded the stream; and data useful for conversion to various DVD standard MPEG program streams (MPEG_PS).

The decoder input time for a packet stored in this added information and located in the MPEG transport stream as above is described next with reference to FIGS. 22A and 22B.

Figure 22A:
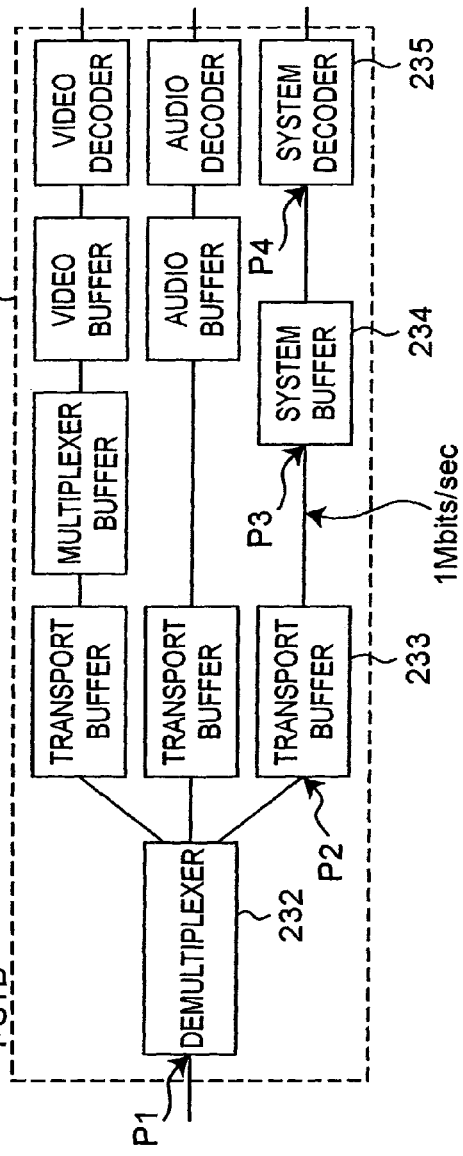
FIGS. 22A and 22B describes the packet transfer time interval.
Figure 22B:
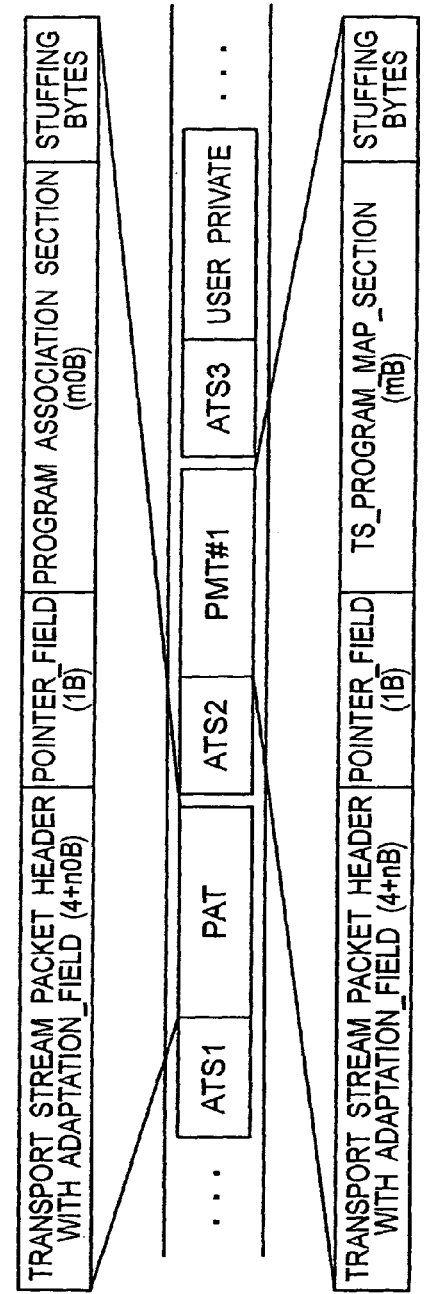

FIG. 22A is a block diagram showing the basic configuration of a decoder referred to as a transport stream system target decoder (T_STD). This figure further shows a system decoder 235 for interpreting a PSI packet and providing decoder control (not described above).

When a PAT (PSI packet), or PMT packet, as PSI packet, is input to the T_STD, the packet is discriminated according to packet type by demultiplexer 232, and the PSI packet which is used for system control is sent immediately to a transport buffer 233.

Data accumulated in the transport buffer 233 is then streamed to the system buffer 234 at a rate of 1,000,000 bits/second (=Rsys).

The PSI data becomes valid the moment the required PSI data is accumulated in the system buffer 234.

This T_STD model in MPEG thus defines an operating model for the decoder and defines standards for the MPEG transport stream transfer rate, for example.

There are several restrictions on PSI packet transfer because the data recording apparatus must self-encode the transport stream according to an MPEG transport stream format that assures the T_STD can correctly decode the transport stream. A method of determining the ATS that determines the packet transfer rate is described next with reference to FIG. 22B.

When reproducing a self-encoding stream the leading PAT, PMT, and UP packets are input to the T_STD at the time indicated by ATS1, ATS2, and ATS3, respectively.

The PMT packet and UP packet are now considered, in order to interpret, by the T_STD, the PID of the UP packet specified by the PMT packet and valid it, the last byte (byte m) of the TS_program map_section must be stored in the system buffer 234.

That is, for the PMT to be valid $(m+n+5) \times 8/Rsys$ seconds must have passed from ATS2 as the PMT packet input time. Note that n is the byte length of the PMT packet adaptation_field.

Because the System Clock Frequency (SCF) as the T_STD reference clock is 27,000,000 Hz (with a defined tolerance range of ±810 Hz for error), the following relationship between ATS3 and ATS2 must be true if the ATS is a time expressed to the precision of the System Clock Frequency.

$$ATS3 \geq ATS2 + ((m+n+5)*8/Rsys)*SCF$$

Because the shortest interval between ATS2 and ATS3 is only when there is no adaptation_field (n=0) in the PMT packet and the smallest TS_program_map_section (21 bytes) is stored in the PMT packet, a time interval of $208/Rsys \times SCF$ is shortest.

The following relationship is likewise required for the input time ATS1 of the PAT packet and input time ATS2 of the PMT packet $$ATS2 \geq ATS1 + ((m0+n0+5)*8/Rsys)*SCF$$

where m0 is the byte length of the Program association section in the PAT packet, and n0 is the byte length of the adaptation_field in the PAT packet.

Furthermore, because the shortest interval between ATS1 and ATS2 is only when there is no adaptation_field (n=0) in the PAT packet and the smallest Program association section (16 bytes) is stored to the PAT packet, a time interval of $168/Rsys \times SCF$ is shortest.

If time is expressed with a precision of 27 MHz using a System Clock Frequency (SCF) of 27 MHz, the shortest time interval between ATS1 and ATS2 and between ATS2 and ATS3 is 4536 and 5616, respectively.

Storing the User Private packet to the self-encoding transport stream is described next with reference to FIGS. 23 to 26.

Figure 23:
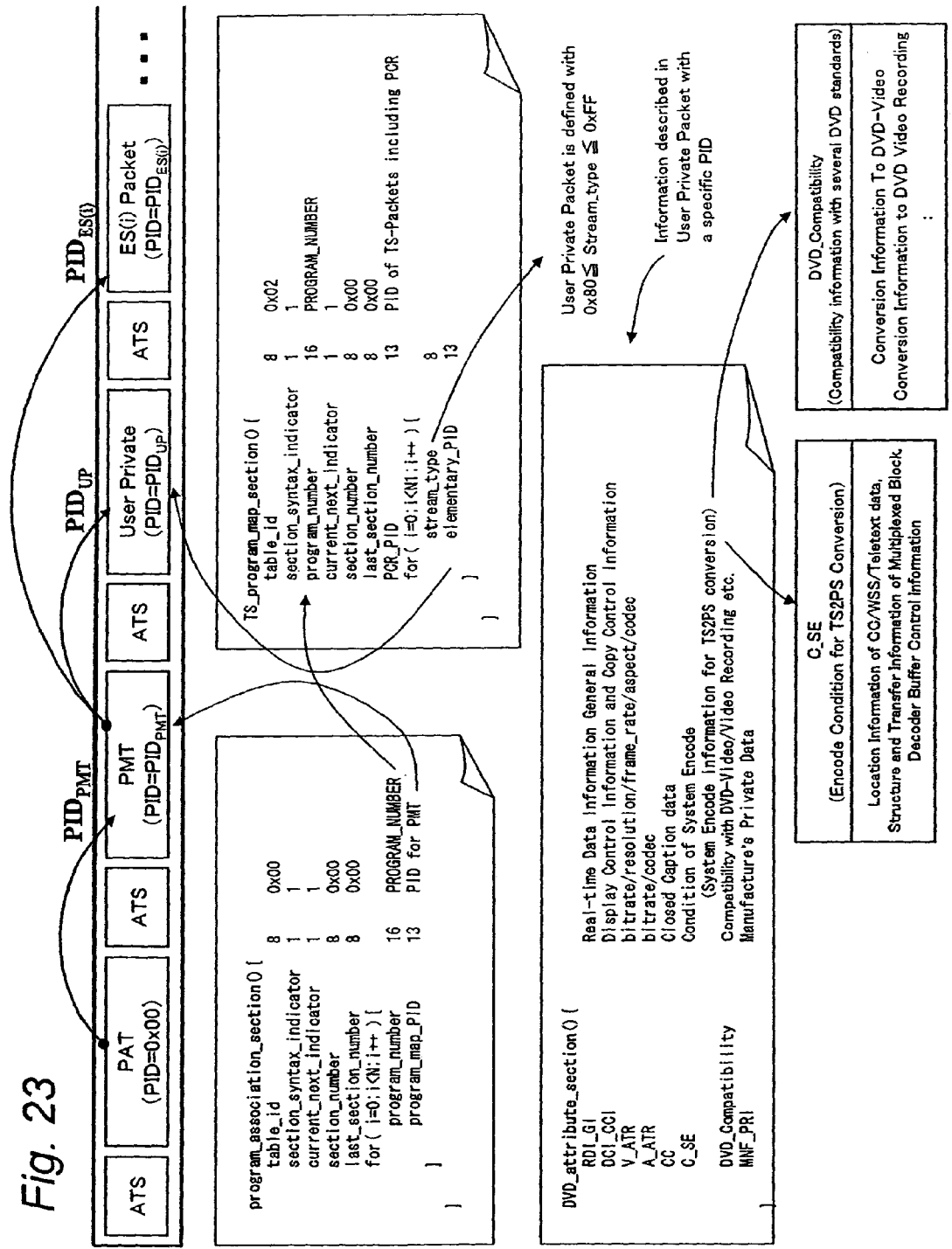
FIG. 23 describes a storage method for a User Private packet.

FIG. 23 shows storing the UP packet when the UP packet is defined as a User Private stream. In this case an identification number greater than or equal to "0x80" and less than or equal to "0xFF" is allocated to stream_type of the PMT corresponding to the UP packet. A unique PID is assigned to the UP packet. The internal data structure of the UP packet does not conform to the MPEG standard. Note that in this example the UP packet includes a section structure called the DVD_attribute_section( ).

Figure 24:
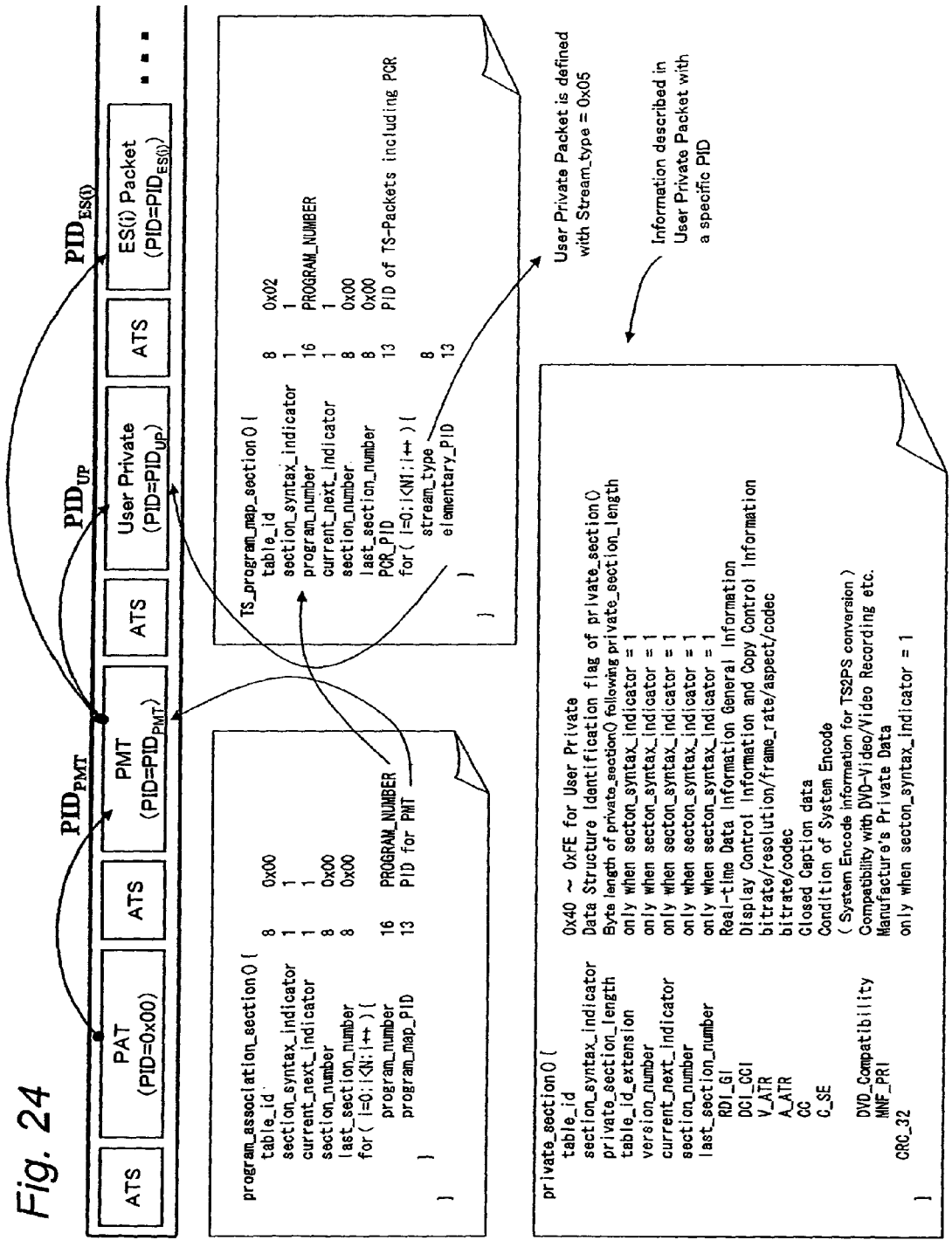
FIG. 24 describes a storage method for a User Private packet.

FIG. 24 shows a further storage method whereby a private_section structure is included in the UP packet and a unique PID is assigned. The data structure of the private_section will vary somewhat according to the value of the section_syntax_indicator in the private_section, but data specific to the UP packet is stored in the private_data_byte of the private_section. In this case, identification number of 0x00 is assigned to stream_type.

Figure 25:
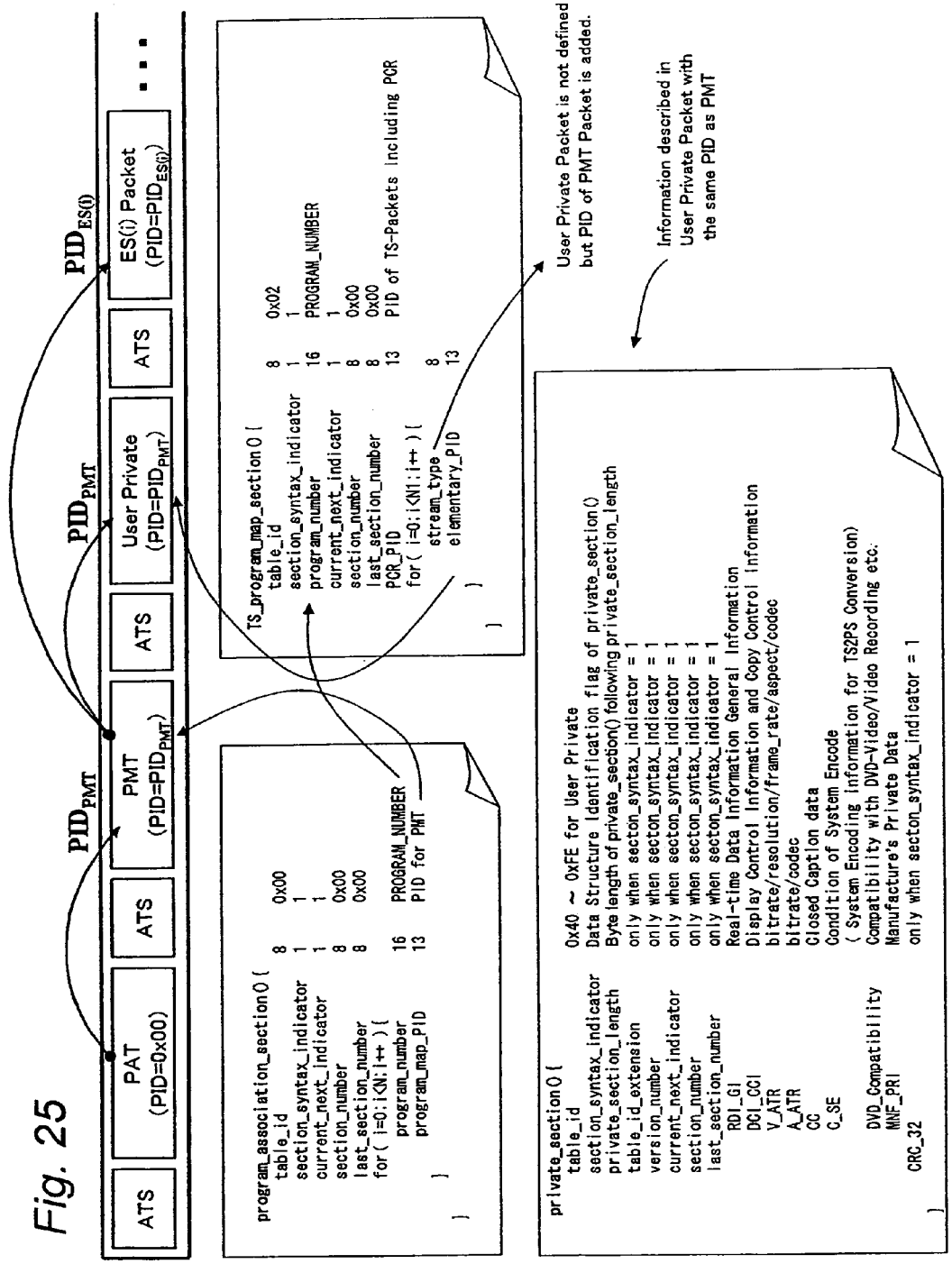
FIG. 25 describes a storage method for a User Private packet.

FIG. 25 shows a method of storing a UP packet as a packet with the same PID as the PMT packet. In this case the UP packet data structure conforms to the private_section structure. The stream type is not defined, and PID of PMT packet is assigned to UP packet.

Figure 26:
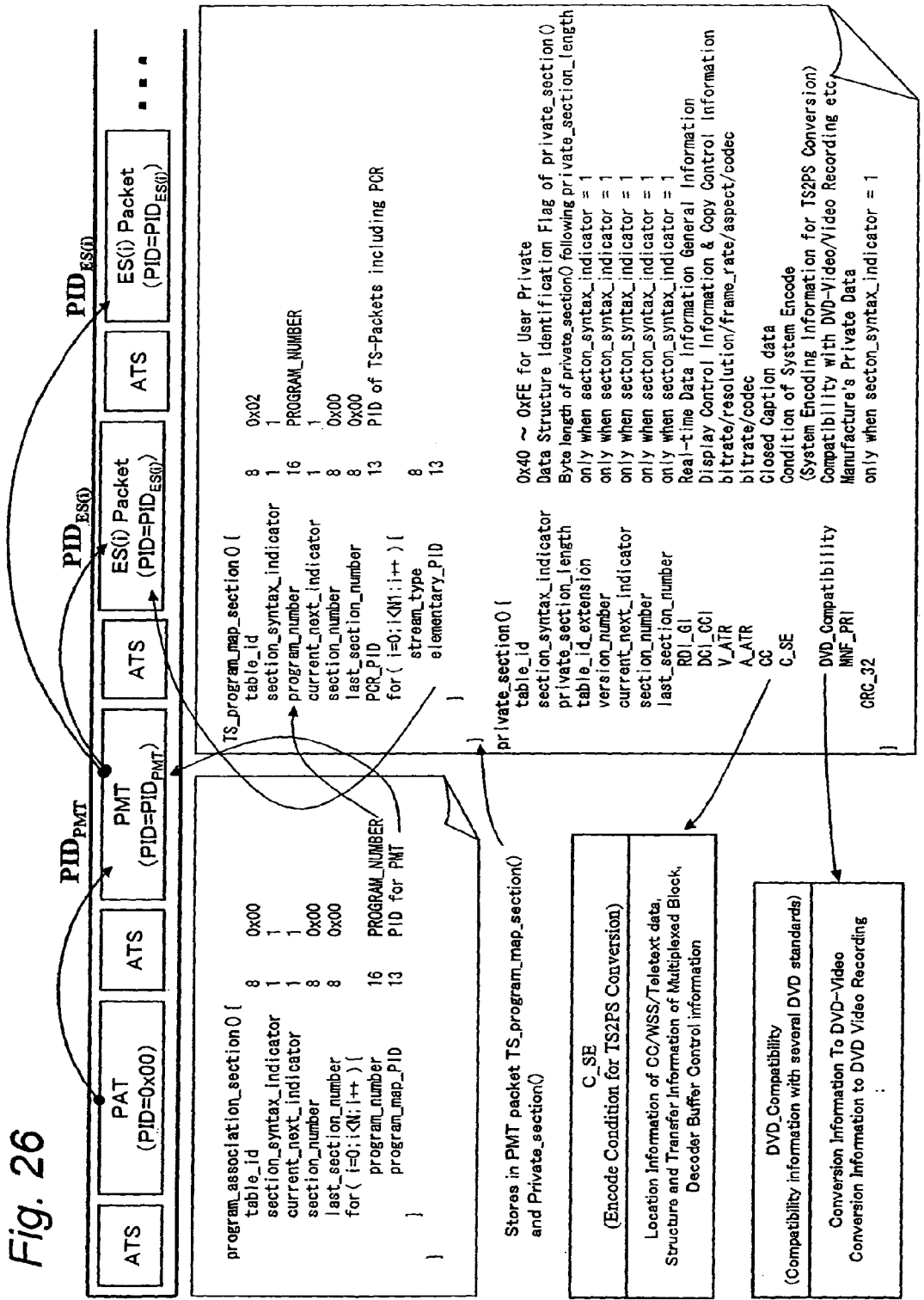
FIG. 26 describes a storage method for a User Private packet.

FIG. 26 shows an example in which the UP packet is not stored separately but is enclosed in the PMT packet. In this case the specific data equivalent to the UP packet has a private_section structure, and the private_section is written after the TS_program map_section. That is, PMT packet includes both TS_program map_section and private_section.

The specific data stored to the MPEG_TS by the above-noted methods is described next.

As shown in FIGS. 23 to 26, this specific data includes the Real-time Data Information General Information (RDI_GI) of the RDI Unit and the Display Control Information and Copy Control Information (DCI_CCI) of the DVD Video Recording standard.

The RDI_GI stores the first presentation start time (VOBU_S_PMT) of the VOBU and the recording date and time information. The DCI_CCI stores, for example, the VOBU aspect ratio information, subtitle mode information, film or camera mode information and other information related to display control, copy generation management information, APS information, and input source information. (For further information about RDI_GI and DCI_CCI, see the DVD Video Recording standard.)

The V_ATR field stores the video bit rate, resolution, frame rate (or video_format such as NTSC or PAL), aspect ratio, and encoding method (an MPEG2_Video or MPEG1_Video identifier).

Likewise, the A_ATR field stores the bit rate for all or part of the audio, encoding method, channel count, quantization bits, and dynamic range control information according to the number of audio streams.

The CC field stores the closed caption data for the VOBU. To improve the transferability of PS conversion, closed caption data can be written in an extension_and_user_data (1) format (a method of storing user data to the GOP layer), or the closed caption data could be written separately.

Storing the closed caption data to the user data of the GOP layer improves MPEG_PS conversion efficiency because the DVD Video and DVD Video Recording standards are defined for this purpose.

The C_SE field stores information relating to some problems associated with TS2PS conversion of the VOBU or VOB.

Regarding the CC, WSS, or teletext data storage location information, that information indicates whether, for example, closed caption data is contained in the UP packet, whether closed caption data is written as user data to the picture headers, or whether there is no closed caption data in the particular VOBU (or VOB).

Regarding the WSS storage location information, that information further indicates whether it is stored as specific data in the UP packet, or whether it is written to the user data in the picture headers.

Regarding the teletext storage location information, it indicates whether a TS packet is provided for storing the teletext data, or whether it is written to the user data in the picture headers.

Regarding the multiplexed block structure and transfer information, that information includes information indicating if the number of TS packets in the multiplex block (a data block in which only one elementary stream is stored without being mixed with another elementary stream) as shown in FIGS. 27A to 27H is fixed or variable, the number of packets if the number is fixed, information indicating whether a PTS/DTS is added to the first TS packet in the multiplex block, or the transfer rate within the same multiplex block. During MPEG_TS encoding imposing no conditions on conventional multiplexing, the multiplex block can be written with a fixed length including only one TS packet.

The decoder buffer control information includes vbv_delay, a parameter of the video verifying buffer, information such as vbv_buffer_size indicating the remaining video buffer capacity (this information is used to determine how far ahead of the ATS input time the video data can be read), and the time difference between the decoding time and the input completion time of the VOBU frame for which the buffer input time is closest to the frame decoding time (this information is used to determine how far back from the ATS input time the video or audio data can be read).

The DVD_Compatibility information indicates the overhead involved with system transcoding a MPEG_TS to a MPEG_PS conforming to a DVD standard.

The DVD_Compatibility information indicates how easy it is to convert a MPEG_TS to other DVD formats. For example, if the multiplex blocks are 2 KB or less, a level 1 indicator is set; if there is closed caption, WSS, or teletext data, the closed caption or WSS data is stored to an UP packet, and the teletext data is stored as a teletext packet in a multiplex block storing video data, a level 2 indicator is set; if it is not necessary to consider buffer management when the closed caption, WSS, or teletext data is stored to the area specified by the DVD standard, a level 3 indicator is set; and if it is not necessary to consider buffer management when the ATS of the first TS packet in the multiplex block is replaced by the SCR, a level 4 indicator is set.

This DVD_Compatibility information is thus a data set indicating the ease of convertibility to various DVD formats, including DVD Video, DVD Audio, DVD Video Recording, and DVD Stream Recording.

FIGS. 27A to 27H show the structure of an MPEG_TS using multiplex blocks, and the data structure when this MPEG_TS is converted to DVD Video and DVD Video Recording formats.

Figure 27:
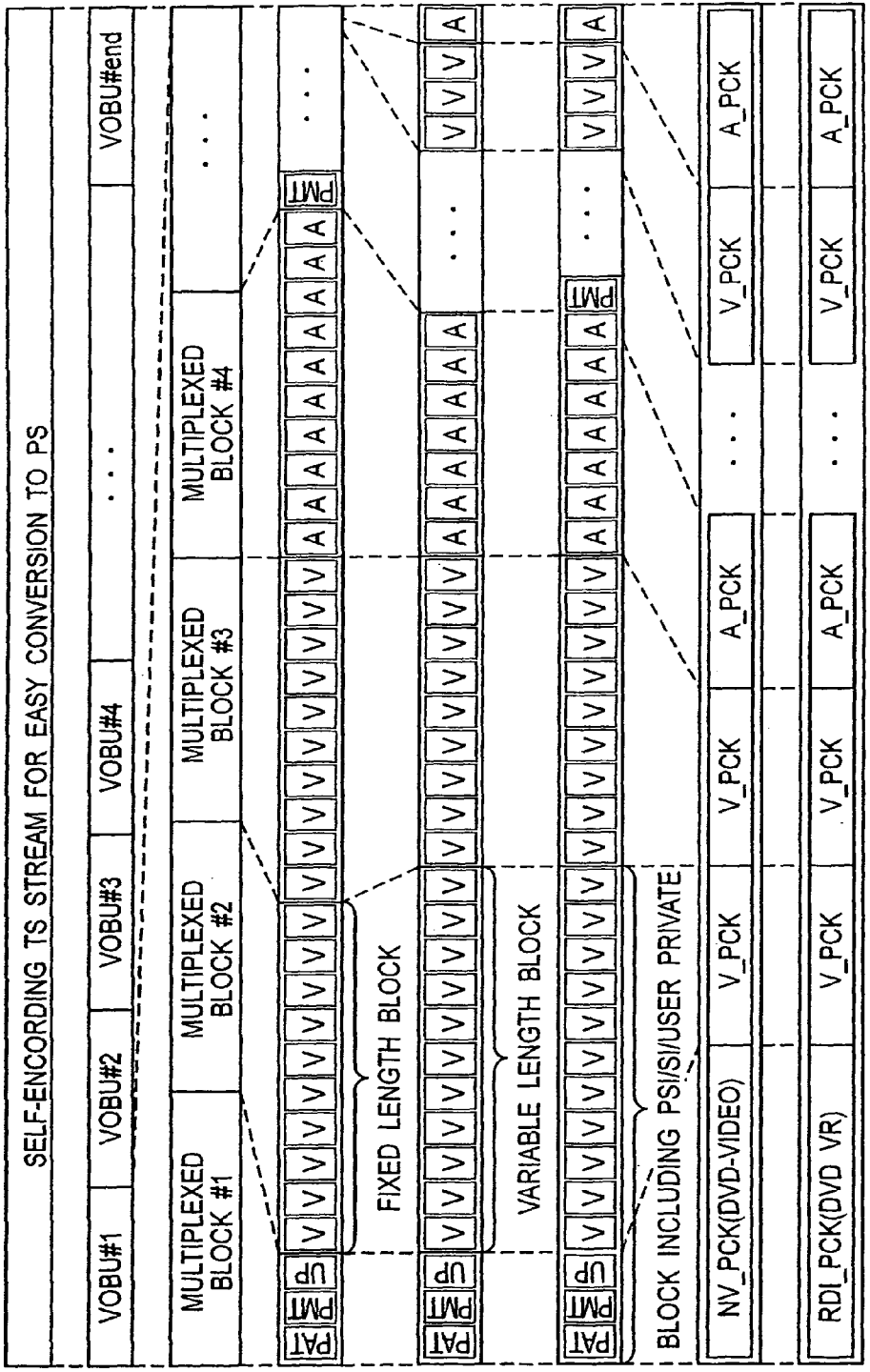
FIGS. 27A to 27H described conversion of an MPEG_TS to an MPEG_PS.

The self-encoded TS stream shown in FIG. 27A comprises the VOBU (playback and decoding units) of the self-encoded TS stream shown in FIG. 27B. As shown in FIG. 27C one VOBU includes multiple multiplex blocks (corresponding to MPEG_PS packs). Each multiplex block can be segmented into fixed length data units as shown in FIG. 27D (enabling easy packaging in the device) or into variable length data units as shown in FIG. 27E (thereby consuming less disc space). In the cases shown in FIGS. 27D and 27E the multiplex blocks are respectively formed by segmenting non-elementary steams such as PSI/SI packets or UP packets and the elementary stream, but as shown in FIG. 27F a multiplex block could store both an elementary stream and non-elementary stream objects such as PSI/SI packets or UP packets. Note that in FIG. 27F multiplex block #1 and multiplex block #2 are one multiplex block.

The above streams can be easily converted to the DVD Video format shown in FIG. 27G or the DVD Video Recording format shown in FIG. 27H.

In this case it is important for simple TS2PS conversion that the MPEG_PS packs are formed in the multiplex block sequence and one multiplex block is the unit storing one pack of data.

It should be noted that the capsule header and ATS are only loosely related to the present invention and are therefore omitted in FIGS. 27A to 27H. In addition, the packs in the converted MPEG_PS shown in FIGS. 27G and 27H are also stuffed or padded as appropriate according to the byte length and VOBU alignment of the stored elementary.

Figure 28:
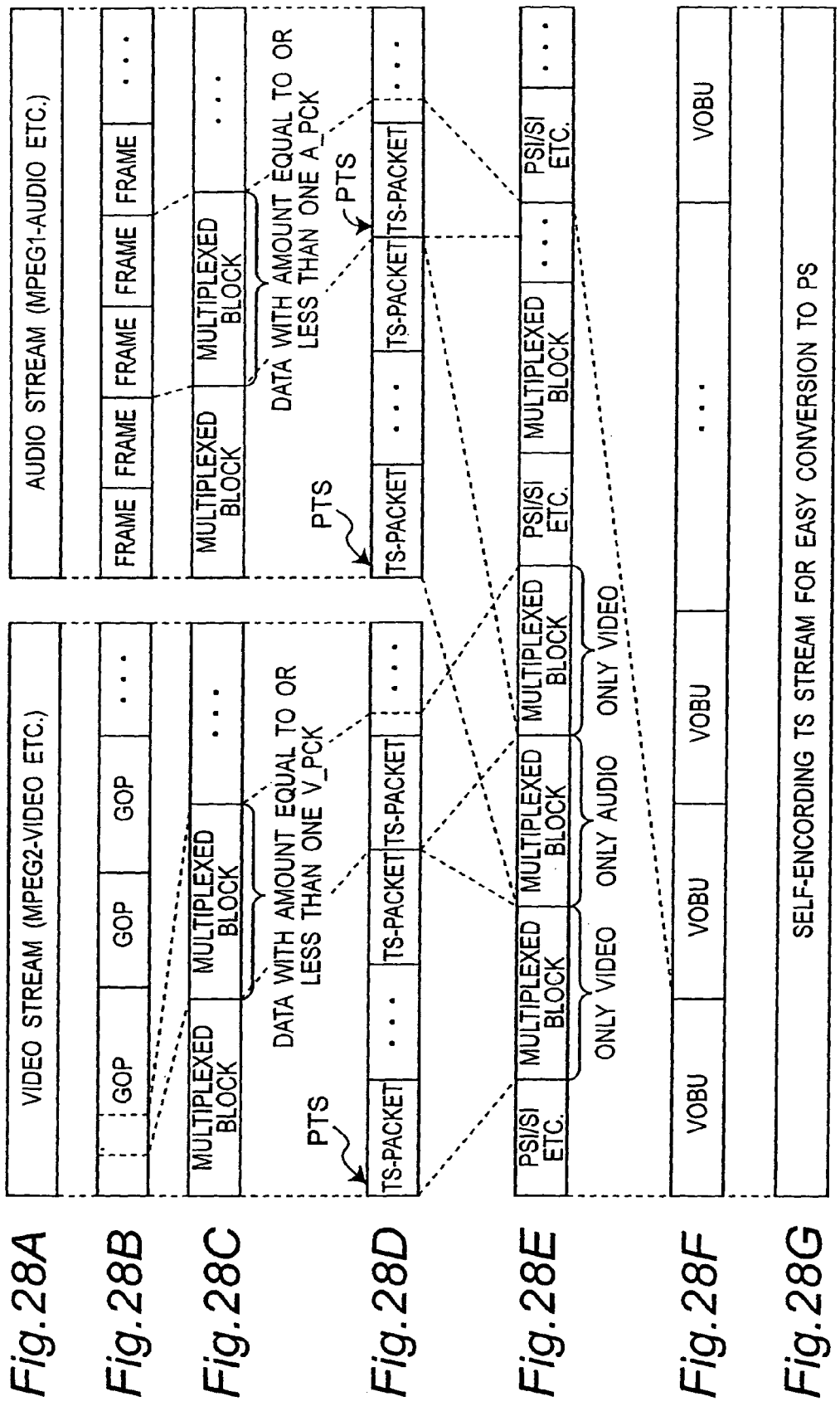
FIGS. 28A to 28G show an encoding method for an MPEG_TS enabling easy conversion to an MPEG_PS.

FIGS. 28A to 28G describes the multiplexing method of the present invention, comparing with the conventional stream multiplexing method shown in FIG. 8. As shown in the figure the final format conforms to the MPEG_TS format shown in FIG. 28G. The video stream (FIG. 28A) comprises plural GOP (FIG. 28B). Each GOP contains specific picture data, and a TS packet group of a data size equivalent to the data size of one pack when converted to an MPEG_PS is one multiplex block (FIG. 28C). That is, one multiplex block is segmented into plural TS packets equivalent to the data size of one pack as shown in FIG. 28D. The audio stream is likewise packed in one multiplex block group having a plurality of TS packets. As sown in FIG. 28E, a VOBU is formed by multiplexing by multiplex block unit. The greatest difference between the present invention and the prior art shown in FIG. 8 is in that data units of a size equivalent to the data size of one MPEG_PS pack are grouped to form the multiplex blocks (see FIG. 28E).

Figure 29:
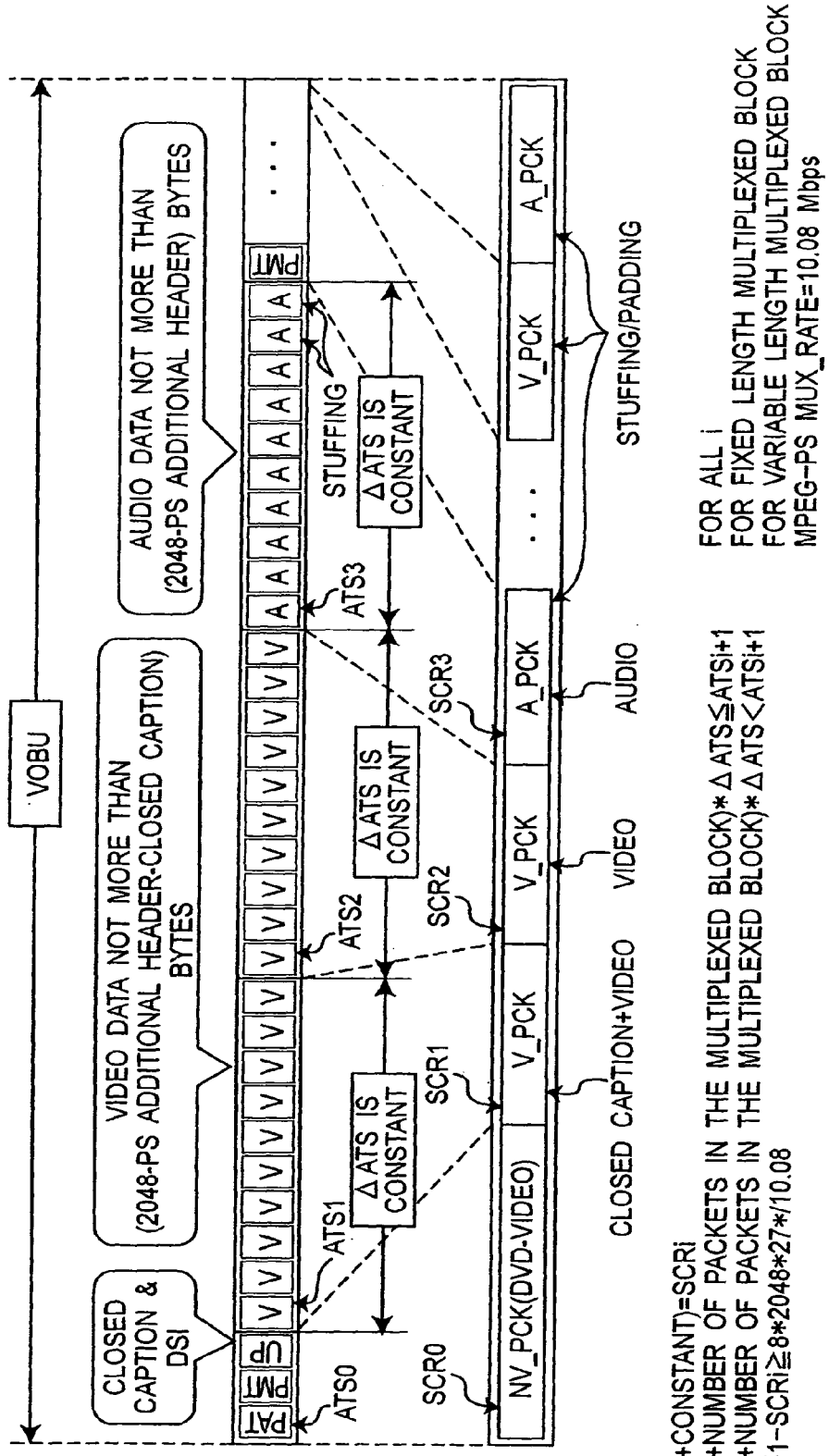
FIG. 29 shows conversion to a DVD Video format (NTSC).

Furthermore, the ATS may be added to each MPEG_TS packet while increased by a specific amount ($\Delta$ATS) in each packet within the same multiplex block as shown in FIG. 29. This is effective to avoid complex buffer management during TS2PS conversion, and convert ATS to SCR using a simple offset or no offset. ATSi (i=0, 1, 2 . . . ) in this case satisfies the following equation.

$$ATSi + (\text{packet count in the multiplex block}) \times \Delta ATS \leq ATSi+1$$

When the multiplex block is a fixed length, the number of TS packets in one multiplex block is fixed and thus the multiplex block boundaries are easily known. However, when the multiplex block is variable length, the number of TS packets in one multiplex block is also variable and thus the multiplex block boundaries are not easily known. Therefore, the increase ($\Delta$ATS) in the ATS at the multiplex block boundary is set to a specific value different from the (constant) increase within the multiplex block. That is, the difference ($\Delta$ATS) between the ATS of the last packet in the previous multiplex block and the ATS of the first packet in the immediately following multiplex block is set to a specific value which is not the constant value. This makes it possible to know the multiplex block boundaries by monitoring $\Delta$ATS. A 1:1 correlation between packs and TS packets when converting to an MPEG_PS can therefore be assured. ATSi in this case satisfies the following equation.

$$ATSi + (\text{packet count in the multiplex block}) \times \Delta ATS < ATSi+1$$

Furthermore, the ATSi added to the first packet in the MPEG_TS multiplex block corresponds to SCRI added to each pack in the MPEG_PS after conversion.

Figure 30:
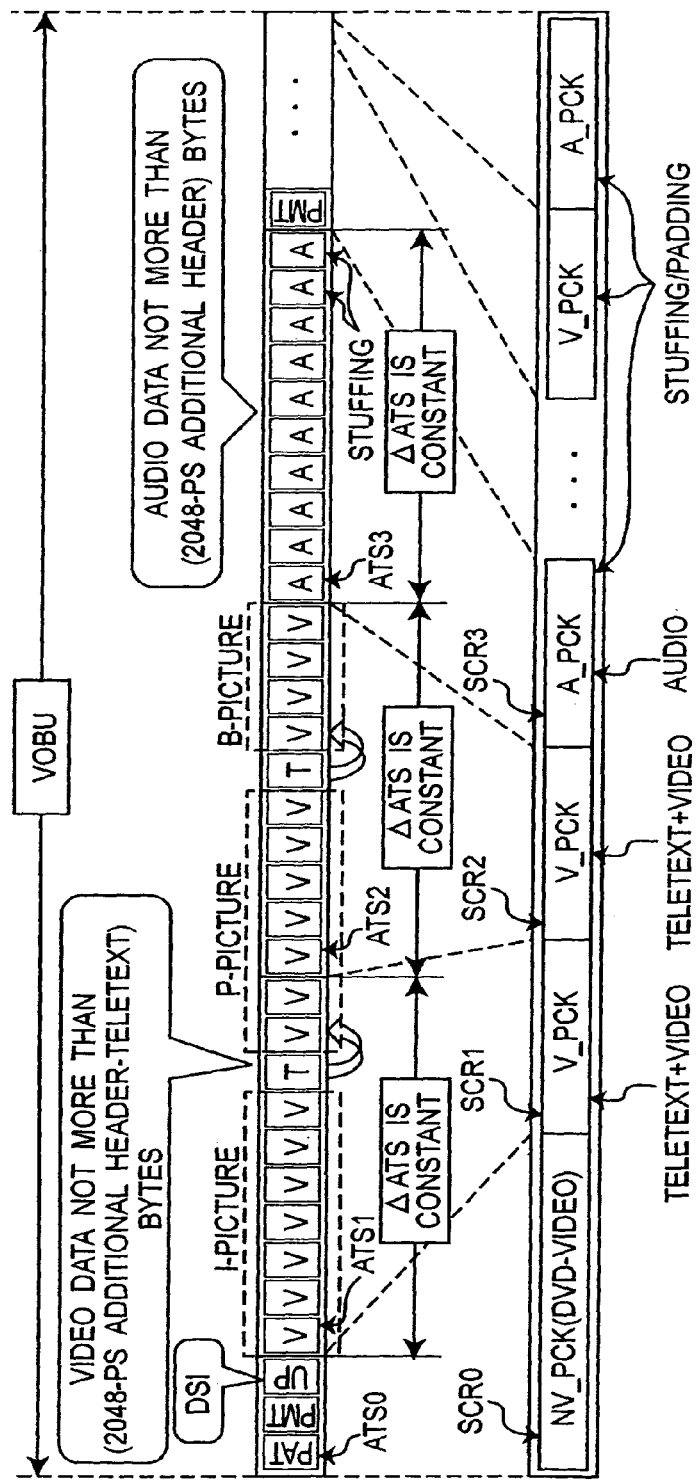
FIG. 30 shows conversion to a DVD Video format (PAL).

Furthermore, as also shown in FIG. 29, closed caption, DSI, or other text information can also be stored in the UP packet. The DSI in the UP packet is used to generate NV_PCK data after conversion, and the closed caption data is stored to the video pack. To enable compatibility with the PAL standard used in Europe, packets storing teletext data in the multiplex block can be inserted between the video data packets as shown in FIG. 30. In this case the teletext data packets are located immediately before the simultaneously presented picture having the same PTS. After conversion the teletext data is stored to the video pack.

FIG. 31 shows the data structure of a UP packet storing the DSI as described above.

Information (such as a relative number from the beginning of the VOBU) identifying the TS packet storing the last byte of the first I-picture in the VOBU can also be described in the added information of the UP packet to enable efficient special playback modes. Special playback modes can also be supported by also describing picture encoding type information of some of I- and P-pictures or all pictures in the VOBU, the data size of each picture (such as information identifying the TS packet containing the last byte), and information indicative of the DTS/PTS for each picture.

It should be noted that if encoding is done so that TS packet containing the PTS/DTS is located at the beginning of the multiplex block in the present embodiment, the beginning of an access unit will be located at the beginning of the packs after TS2PS conversion, and simplified DVD-specific header processing can be expected.

To prevent an overflow of data stored to MPEG_PS packs and ease conversion to an MPEG_PS, the TS packets of the multiplex blocks can be appropriately stuffed or a necessary number of stuffing bytes can be inserted after the last TS packet in the multiplex block.

The present embodiment has been described primarily with reference to recording to DVD, but the invention will obviously not be so limited. More specifically, after recording a self-encoded transport stream to a hard disk, semiconductor memory, or other data recording medium, a stream converted to an MPEG program stream can be recorded to the same medium or to a different medium.

Furthermore, the PAT, PMT, and UP packets are described as recorded to the beginning of each VOBU in the present embodiment, but they can be recorded to the beginning of at least a VOB or to the beginning of a Cell which is the playback management unit.

Yet further, this embodiment is described recording PAT, PMT, and UP packets, but the UP packet can be omitted.

Yet further, the PAT, PMT, and UP packets are described as fixed at the beginning in the present embodiment, but the invention shall not be so limited, and a packet storing a Null packet can be recorded inserted therebetween.

Yet further, a self-encoded stream is described starting from a PAT packet, but the invention shall not be so limited and the stream could start from a Null packet.

Furthermore, the system transfer rate can be set to a fixed rate by appropriately inserting Null packets in the self-encoded stream.

It should also be noted that a data area for storing manufacturer-private information can be provided as shown in FIG. 7, and MPEG_TS system encoding conditions can be written to this data area.

It should also be noted that all or part of the information written to the UP packet in the above embodiment can be written to the TS1_VOB information shown in FIG. 15.

It will also be noted that the DVD Video format does not allow for dual mono audio. It is, however, possible to convert a self-encoding transport stream recorded with dual mono audio channels to the DVD Video format by separating the dual mono audio channels into two separate audio streams recorded as left and right monaural audio channels.

Part or all of the parameters written to the UP packet in the above embodiment could also be written into the management information. By thus avoiding recording a parameter that does not change within a self-encoding transport stream multiple times, recording space is not wasted and the decoder does not need to waste processing time trying to determine whether or not the parameter changed each time a UP packet is detected.

Second Embodiment
<Encoder Configuration>

An alternative embodiment of the present invention is described next below. The description is made to an encoder of a data recording apparatus according to the present invention by focusing first the encoding process to receive and self-encode AV input to an MPEG transport stream.

Figure 33:
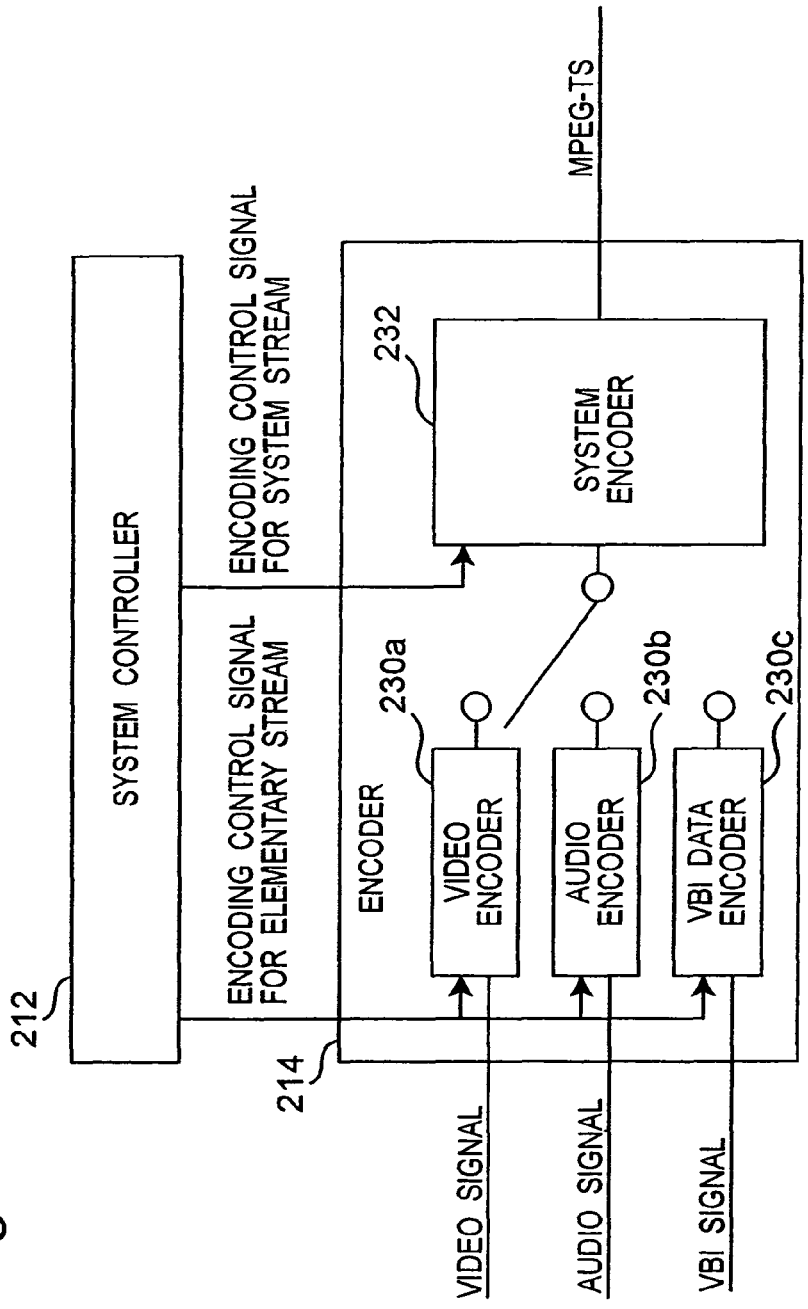
FIG. 33 is a block diagram of the encoder of a data recording apparatus according to the present invention.

FIG. 33 shows the configuration of the encoder in a data recording apparatus according to the present invention. As shown in the figure the encoder 214 includes elementary stream encoders 230a, 230b and 230c, and a system encoder 232. The encoder 214 receives a control signal from the system controller 212 and then runs the encoding process with the elementary stream encoders 230a, 230b and 230c, or the system encoder 232 while switching between elementary encoding and system encoding. Each of the elementary stream encoders 230a, 230b and 230c receives video, audio, and VBI (Vertical Blanking Interval) signals for encoding.

The video encoder 230a receives a control signal from the system controller 212 and based thereon encodes the bit rate, resolution, aspect ratio, and other attributes of the video stream within a predefined range. More specifically, the video encoder 230a receives a control signal from the system controller 212 specifying the operating mode as the "DVD Video compatible mode," DVD Video Recording compatible mode," or "normal mode." If the mode specified by the control signal is the DVD Video compatible mode, the video encoder 230a generates a video stream conforming to the video attributes of the DVD Video standard; if the DVD Video Recording compatibility mode, it generates a video stream conforming to the video attributes of the DVD Video Recording ("DVD VR" below) standard; and if the normal mode, generates a video stream conforming to a specific attribute range.

The audio encoder 230b likewise receives a control signal from the system controller 212 and based thereon encodes the bit rate, quantization rate, channel count, and other attributes of the audio stream within a predefined range. Like the video encoder 230a, the audio encoder 230b specifically receives a control signal from the system controller 212 specifying the operating mode. If the mode specified by the control signal is the DVD Video compatibility mode, the audio encoder 230b generates an audio stream conforming to the audio attributes of the DVD Video standard; if the DVD VR compatibility mode, it generates an audio stream conforming to the audio attributes of the DVD Video Recording ("DVD VR" below) standard; and if the normal mode, generates an audio stream conforming to a specific attribute range.

The VBI data encoder 230c likewise receives a control signal specifying the operating mode from the system controller 212 and encodes the VBI data accordingly. Specifically, if the elementary stream encoding control signal input from the system controller 212 to the VBI data encoder 230c indicates the DVD Video compatible mode or DVD VR compatible mode, it additionally encodes VBI data according to the VBI data storage method specified by the respective standards. There is a case that a VBI data storage method is separately defined even in the original normal mode, and in that case "additionally encode" means that VBI data is redundantly stored to the elementary stream.

The encoded elementary streams are then multiplexed to the MPEG_TS system stream by the system encoder 232.

Like the elementary stream encoders 230a, 230b and 230c, the system encoder 232 also receives an encoding control signal from the system controller 212 to encode according to the received signal.

The control signal from the system controller 212 to the system stream encoder 232 is either a system encoding control signal for encoding a normal MPEG_TS, or a system encoding control signal (DVD-Video mode or DVD-Video Recording mode) applying constraints on the normal MPEG_TS in order to enable easy conversion to an MPEG_PS (particularly a specific DVD format).

If the control signal is for encoding a normal MPEG_TS, the system stream encoder 232 applies the system encoding to the elementary streams input from the elementary stream encoders 230*a*, 230*b* and 230*c* while managing the buffers so that the input streams are not corrupted by the decoder model (T_STD) which is a reference for the MPEG_TS system stream.

If the control signal from the system controller 212 is a control signal specifying system encoding to an MPEG_TS enabling easy conversion to an MPEG_PS, the encoding is conducted while also following additional special system encoding rules.

The encoder 214 then outputs the resulting self-encoding MPEG_TS system stream.

The data recording apparatus according to the present invention is thus characterized by switching the encoding mode at the elementary stream and system stream encoding levels. The processes applied in each encoding mode to convert to a particular DVD format when the encoding mode is changed as described above are shown in the table in FIG. 34.

An MPEG_TS enabling easy conversion to an MPEG_PS is thus generated by driving the elementary stream encoders 230*a*, 230*b* and 230*c* and system encoder 232 to encode the respective streams assuming the conversion to an MPEG_PS.
<A Self-encoded MPEG_TS>

A detailed embodiment of the format of an MPEG_TS self-encoded by a data recording apparatus according to the present invention is described next below. The differences between a normal MPEG_TS ("SESF" below) and an MPEG_TS enabling easy conversion to an MPEG_PS (a "Constrained SESF" below) are also described.

In the following example, information presenting the stream encoding conditions is stored to the VOBI storing attributes and other information in MPEG_TS stream units. By thus storing information about the encoding conditions to the management information and not in the stream, it is possible to quickly determine whether a stream can be easily converted to a DVD Video or DVD VR format without analyzing the stream. Note that this information presenting the stream encoding conditions can be stored to a Tip packet which is described further below.

The information presenting the stream encoding conditions is represented by an "encode_condition" flag which has two bits. The flag value is described below.

00b: normal MPEG_TS (SESF)
01b: MPEG_TS enabling easy conversion to a DVD VR stream format (Constrained SESF)
10b: reserved
11b: MPEG_TS enabling easy conversion to a DVD Video stream format (Constrained SESF)

Two cases are possible if the encode_condition flag is set to 00b in the stream management information: the stream is originally encoded without considering high speed conversion to MPEG_PS, and a sequence of MPEG program streams are linked by user editing for easy conversion to individual MPEG program streams.

If the encode_condition flag is also set in the stream, it is meaningless to set encode_condition=00b indicating a normal MPEG_TS in the stream. It is therefore also possible for the encode_condition flag to be used differently inside and outside the stream, reserving the encode_condition=00b setting so that it is not used in the stream (in the Tip packet described below).

By thus setting this flag, it is possible to determine from the value of the VOBI encode_condition field whether the stream can be easily converted to a DVD Video or DVD VR format. "Easily converted" as used herein means convertible by the conversion method described further below.
<Constrained SESF Stream Structure>

FIG. 80 shows the complete stream structure of a Constrained SESF. A Constrained SESF includes plural SESF capsules. An SESF capsule contains specific multiplexing units, and a Tip packet (detailed below) at the head. The presentation time stamp (PTS) of each SESF capsule and an address of the Tip packet are correlated in the access map 80*c*. As described below, for TS2PS conversion, a conversion process is accomplished in SESF capsule units.

Figure 32:
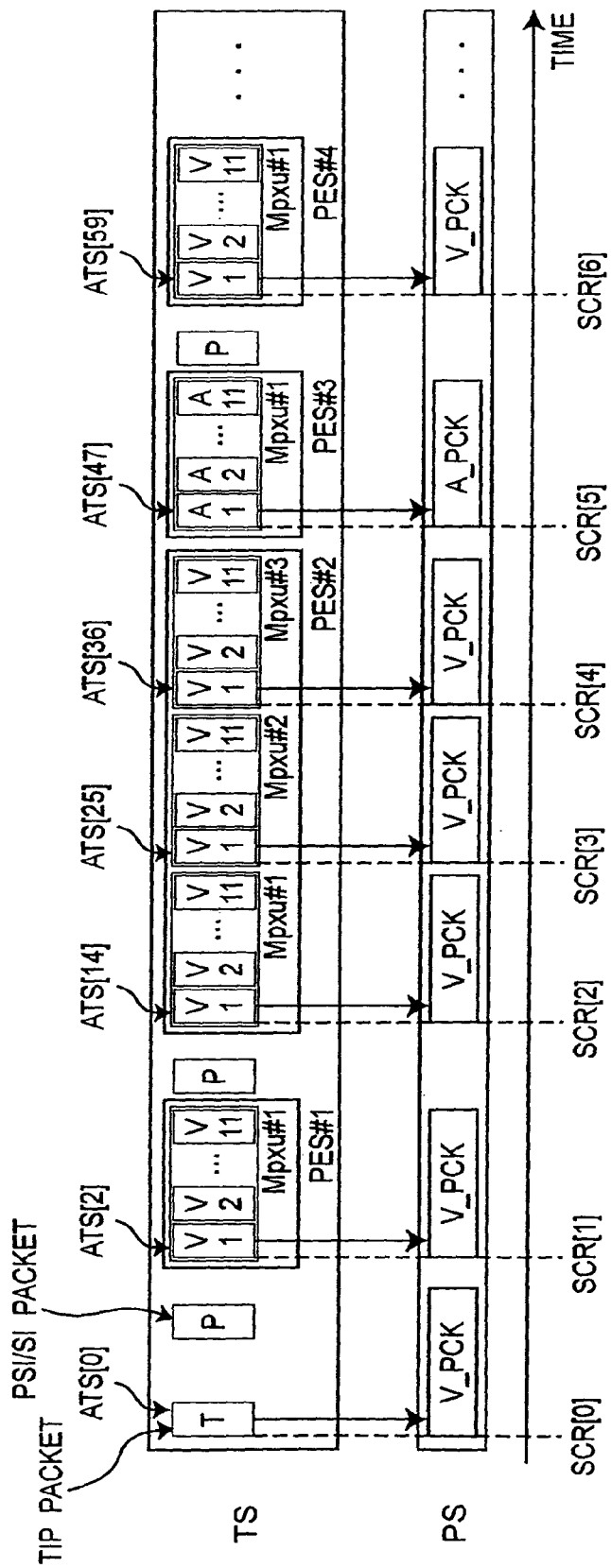
FIG. 32 shows the correlation between an MPEG_TS encoded for easy conversion to an MPEG_PS and the MPEG_PS after conversion.

FIG. 32 shows the correlation between MPEG_PS packs and packets in on SESF capsule. As shown in FIG. 32 a TS packet (Tip packet below) storing stream-specific information is inserted to a Constrained SESF. The Tip packet embedded in a Constrained SESF is described below with reference to FIG. 35 to FIG. 41.
<Tip Packet>

FIG. 35 shows the overall Tip packet structure. As shown in FIG. 35, a Tip packet stores a Data_ID identifying the packet as a Tip packet, display_and_copy_info corresponding to the DVD VR DCI_CCI field and including display control and copy control information, encode_info storing stream encoding information, and MakersPrivateData for storing additional information unique to the manufacturer.

As shown in FIG. 35 and FIG. 36, the PCR value needed for the SCR calculations described below is written to the adaptation field of the Tip packet. This adaptation field is a fixed byte length, and thereby enables accessing information in the Tip packet using a fixed address.

The Data_ID structure is shown in FIG. 37. The Data_ID has a Data_Identifier for identifying whether the corresponding packet is a Tip packet. The Data_Identifier is a 3-byte field holding a value of "0x544950" expressing "TIP" in the ASCII code. The decoder of the playback device reads the value of this field to identify that it is a Tip packet.

The display_and_copy_info structure is shown in FIG. 38. Generating the RDI pack when converting a Constrained SESF to the DVD VR format is simplified by providing the same structure and information as the DCI_CCI field of the RDI Unit in the DVD VR standard in display_and_copy_info. (Note that the DCI_CCI field of the DVD VR standard is fully described in "DVD Specifications for Rewritable/Re-recordable Disc, Part 3, VIDEO RECORDING," and in Japanese patent No. 3162044. While some of the field names are different in these documents, the field definitions are the same so as to enable direct copying when converting to the DVD VR format.)

The encode_info field structure is shown in FIG. 39. Resolution information for the video stream following the Tip packet is written to the video_resolution field. The value of encode_info is shown below.

0000b: 720×480 (NTSC), 720×576 (PAL)
0001b: 704×480 (NTSC), 704×576 (PAL)
0010b: 352×480 (NTSC), 352×576 (PAL)
0011b: 352×240 (NTSC), 352×288 (PAL)
0100b: 544×480 (NTSC), 544×576 (PAL)
0101b: 480×480 (NTSC), 480×576 (PAL)
Others: reserved Resolution can vary during a single continuous recording in the DVD VR format. However, streams of different resolutions are managed as separate VOBs and it assures seamless connection during playback by a certain recorder. This field is therefore used to determine where it is necessary to split the VOB when converting to the DVD VR format, if there is a resolution change during Constrained SESF recording.

In a Constrained SESF recorded with consideration for converting to the DVD Video format (encode_condition=11b), the resolution does not change within a single stream.

The encode_condition field is the same as the value stored to the VOBI (except when 00b). The reason why the encode_condition field is stored and embedded in the stream and not only in the stream management information is to enable the recorder to easily determine if it is possible to convert to the DVD format by referencing the encode_condition field in the Tip packet when, for example, a stream is copied through a digital interface such as IEEE 1394.

VOBU_S_PTM of the DVD VR standard is recorded to the FVFPST field. This is to eliminate the process of analyzing the video stream encoded after the Tip packet and calculating the presentation time of the first appearing video field when converting a Constrained SESF to a DVD Video or VR format.

The FVFPST field includes a 32-bit field denoting the video field presentation time at 90 KHz precision, and a 16-bit field denoted at 27 MHz precision.

The PES_info structure is shown in FIG. 40. PES_info is needed to convert a Constrained SESF to the DVD Video format without analyzing the elementary streams. This information is needed to generate the information inserted to the DVD Video stream and stored in the packs, referred to as NV_PCK, supporting special playback modes.

The PES_info can store information for 136 PES packets each storing video data or audio data units. Four bits are assigned to each PES packet, and the NV_PCK information can be generated without analyzing PES packet content. PES packets not storing video or audio data are ignored.

In a SESF capsule being the data unit from one Tip packet to the packet immediately preceding the next Tip packet, a PES_existence_flag declares if the j-th PES packet is present in the SESF capsule. The value of PES_existence_flag is set as follows.
  0b: j-th PES packet is not in the SESF capsule
  1b: j-th PES packet is in the SESF capsule If the PES_extension_flag=0b (when there is no PES packet), all remaining fields in the PES packet are set to 0b.

The PES_payload_identifier identifies whether the data stored in the PES packet is video or audio data. PES_payload_identifier values are set as follows.
  0b: video stream
  1b: audio stream The PES_existence_flag and PES_payload_identifier fields are set for all relevant PES packets.

When it is determined from the PES_payload_identifier whether video or audio data is stored, the remaining field definitions vary according to the type of stream stored in the PES packet.

If the PES packet stores a video stream (PES_payload_identifier=0b), picture_coding_type indicating the type of picture stored in the PES packet is defined after the PES_payload_identifier field.

The value of the picture_coding_type field is set as follows.
  00b: a picture encoded with encoding other than 01b or 10b
  01b: a frame encoded I-picture; a pair of field encoded I-pictures; or a pair of field encoded I-picture and field encoded P-picture
  10b: a pair of frame encoded P-pictures or a pair of field encoded P-pictures
  11b: reserved In other words, a picture with 01b or 10b is a picture used as the reference picture defined by the DVD Video standard. The above description is for information added to PES packets storing video.

If the PES packet stores an audio stream (PES_payload_identifier=1b), the PES_payload_identifier is followed by a stream_identifier and a sync_presentation_flag. The stream_identifier identifies whether the audio stream in the PES packet is a first audio stream or a second audio stream. The sync_presentation_flag is a flag to identify whether there is an audio frame for which presentation begins simultaneously to or immediately following the FVFPST field (the presentation start time of the video field presented first) written to each Tip packet.

The value of stream_identifier is set as follows.
  0b: first audio stream
  1b: second audio stream The first and second audio stream can be discriminated by the PID setting rules and the order of elementary stream declaration in the PMT.

The value of sync_presentation_flag is set as follows.
  0b: an audio frame for which presentation begins simultaneously to or immediately following the FVFPST is not stored in the audio PES packet
  1b: an audio frame for which presentation begins simultaneously to or immediately following the FVFPST is stored in the audio PES packet Information added to PES packets storing audio is as described above.

The PES_info field thus extracts and stores information for each PES packet following a Tip packet.

FIG. 41 shows the MakersPrivateData. As shown in the figure, the MakersPrivateData has a maker_ID field identifying the manufacturer of the Constrained SESF, and maker_private_data field containing specific additional information described by the manufacturer.

FIGS. 42A and 42B shows an example of a value of PID of the Tip packet and a value of stream_type indicating the stream type. Other PID and stream_type values are reserved by the MPEG standard and other standards, and these values were selected to indicate private data beyond the scope of the MPEG standard without interfering with reserved values.

Various stream attribute information is thus extracted and stored to the Tip packets stored in a Constrained SESF. How the fields described above are used during conversion to a different DVD format is described in further detail below.

<System Encoding Conditions>

The system encoding conditions for a Constrained SESF are described in detail next below. Note that the following system encoding conditions do not apply to a normal SESF.

<Multiplexing Unit>

TS packet storing elementary streams in a Constrained SESF is composed of a Multiplexing Unit which is a unit of data stored in 2 KB packs according to a DVD format. Note that this Multiplexing Unit corresponds to the multiplex block of the first embodiment.

Only TS packets storing one type of elementary stream are stored to each Multiplexing Unit, and these TS packets are not mixed with TS packets storing another type of elementary stream. Mixing TS packets with Null packets is not prohibited because it may be necessary to include one or more Null packets in order to generate a Multiplexing Unit (such as the Multiplexing Unit storing the last part of a stream). This is necessary to clarify the relationship between Multiplexing Units and packs.

One Multiplexing Unit contains eleven continuous TS packets, and the elementary stream (payload data) in each Multiplexing Unit is stored completely within the one corresponding pack. This likewise constrains the relationship to the pack.

When the PES packet storing the video stream is segmented and placed in multiple Multiplexing Units, all Multiplexing Units other than the Multiplexing Unit containing the last byte of the PES packet store a TS packet payload data of 184×11=2024 bytes. This allows stream transfers to be completed most efficiently and successive processing by TS packet unit to be easily accomplished during TS2PS conversion. If the size of Multiplexing Units other than the last Multiplexing Unit is less than 2024 bytes, it will not be possible to easily determine the value of the PES_packet_length field stored to the packet header of each pack in the MPEG_PS when converting the first TS packet of the Multiplexing Unit during TS2PS conversion.

The first complete audio frame data in the Multiplexing Unit should be an audio frame placed at the beginning in the payload of PES packet. This is easy to understand by considering storing PES packets storing the audio stream to multiple Multiplexing Units. If one audio PES packet is segmented and placed in multiple Multiplexing Units, it is necessary to identify the PTS and determine the number of audio frames stored in one pack in order to generate the packet header when converting the second and later Multiplexing Units to MPEG_PS packs. Hence, it should be avoided that it is necessary to analyze the internal structure of the audio stream and then conversion process is complicated.

The Multiplexing Unit is defined above. Encoding to generate a Constrained SESF involves system encoding within the constraints of the above-described Multiplexing Unit.

<Constraints of PES Packet Headers in a Constrained SESF>

A number of constraints on the field values of the PES packet header in a Constrained SESF are described next.

As shown in FIG. 43, some PES packet header fields allow only fixed values. This is to prevent creating unnecessary processes when converting to different DVD formats. "Unnecessary processes" means processing fields additionally created or deleted by values different from values defined by the DVD format. In other words, the purpose of this PES packet header constraint is to minimize fields added to or deleted from the header during TS2PS conversion.

A value of 0 is permitted for the PES_packet_length field when a video stream is stored to the MPEG_TS.

The PTS_DTS_flags field indicates if a PTS or DTS is included.

When the PES packet stores an audio frame, at least one or more audio frames starts in the PES packet, and PTS_DTS_flags is set to 10b (to 11b if the DTS is written).

Constraints for sequentially processing by TS packet unit during TS2PS conversion are applied to PES_extension_flag and PES_header_data_length. These are shown in FIG. 44.

As shown in FIG. 44, specific values are defined according to the elementary stream type, PES packet location, and encode_condition value.

Note that VPD in FIG. 44 is the combined byte length of the PTS field and DTS field in the PES packet. That is, if PTS_DTS_flags=00b, VPD=0;
if PTS_DTS_flags=10b, VPD=5;
if PTS_DTS_flags=11b, VPD=10.

As described above, this constraint is necessary to simplify sequential processing by TS packet unit without forming the packs after determining the payload length of one pack when converting to the DVD Video or VR format.

The PES packet header is defined above. An encoder generating the Constrained SESF encodes the system stream within the above constraints.

<Constraints on the Tip Packet Insertion Interval>

Constraints on the insertion interval of Tip packets inserted to a Constrained SESF are described next.

The following relationship must be true for the decoder input time indicated by ATS (ATS1) of the Tip packet, and the decoder input time indicated by ATS (ATS2) of the TS packet storing the video or audio stream input to the decoder first after the Tip packet.

$$ATS1+T \leq ATS2$$

$$T=(PS\_pack\ size*8*system\_clock\_frequency)/PSrate$$

where T is the shortest PS pack transfer period. This shortest transfer period is the shortest period from the start to the end of PS pack input to the system decoder. That is, the above equation shows that the ATS interval of each TS packet must at least be greater than the interval at which PS packs after conversion can be input to the system decoder.

The value of T is determined as follows.

PS_pack_size is the byte length of one pack in the MPEG_PS generated by TS2PS conversion, the system_clock_frequency is the frequency of the reference clock of the MPEG_PS decoder, and PSrate is the multiplex rate of the MPEG_PS stream generated by TS2PS conversion.

These values are defined as below by the DVD format, and the relationship between ATS1 and ATS2 is therefore as follows.

PS_pack_size=2048 bytes
system_clock_frequency=27,000,000 Hz
PSrate=10,080,000 bits/second
ATS1+43885.714 ... ≦ATS2
Therefore, $$ATS1+43886=ATS2$$

defines the minimum value of ATS2. The TS2PS conversion described below typically converts a Tip packet to a 2-KB NV_PCK (in DVD Video conversion) or RDI_PCK (in DVD VR conversion) pack. However, if the above relationship is not satisfied, the next elementary stream is transferred earlier and may exceed the upper limit of the DVD system transfer rate (10.08 Mbps).

An integer number of GOPs are aligned in one SESF capsule. This is to make the SESF capsule correlate to a VOBU of the DVD format so that the VOBU concept of the DVD format can also be realized in the Constrained SESF. More particularly, a VOBU must include an integer number of GOPs according to the DVD format (DVD VR).

Video data stored in one SESF capsule must be at least 0.4 second and not more than 1.0 second wide on the playback time base. In addition, the time width on the playback time base of video data stored in the last SESF capsule is greater than or equal to 0.4 second and less than or equal to 1.2 second when the encode_condition=11b (DVD Video mode), and when the encode_condition=01b (DVD VR mode) must be less than or equal to 1.0 second. This is because the SESF capsule becomes a VOBU, and must conform to the specific DVD format.

Each Tip packet normally preferably has a 1:1 correlation on the access map used for time-address conversion. This is required so that conversion can start immediately with the VOBU units defined by the DVD format during TS2PS conversion, and so that the DSI (Data Search Information) (which provides address information for the adjacent VOBU stored in the NV_PCK) can be generated from the access map when Tip packets are converted to NV_PCK packs during conversion to the DVD Video format. The DSI can be calculated insofar as the access map stores the playback time (part or all of the AV playback time information immediately after the Tip packet according to FVFPST) for each Tip packet and recording address of each Tip packet, and the number of Multiplexing Units stored between two consecutive Tip packets is known. This is achieved by imposing the following constraints.

It should be noted that all Tip packets need not be pointed to from the access map. For example, AV data following the last Tip packet in a Constrained SESF does not contain playback time length information nor have a next Tip packet, is thus different from other Tip packets and is therefore handled differently. In this case, no particular adverse affect on playback and conversion even if the last Tip packet is not registered in the access map, and thus it can be handled in an exceptions process in consideration with the device implementation.

A total thirty-two packets not associated with a Multiplexing Unit are inserted between two consecutive Tip packets. This is because it is necessary to determine how many packs there will be in a VOBU when converted to a DVD format using the access map during TS2PS conversion. (The number of packets need not be limited to 32, but there must be some specific number of packets. Because the number of TS packets following a Tip packet can be determined from address information of the Tip packet in the access map, the number of packs included in a VOBU when converted to a DVD format can be determined if the number of packets that are not Multiplexing Units is known. This is important. This information may be described in MNF or MakersPrivateData in each Tip packet.)

Furthermore, the reason there are 32 packets is as follows. It could be sufficient that there are at least 31 PAT, PMT, PCR, and SIT packets between two consecutive Tip packets, because: the PAT, PMT packets describing the MPEG_TS program configuration data must be embedded at least once every 100 msec; a SIT packet storing specific information for each program must be embedded at least once every 1 second; the PCR packet storing the PCR (program clock reference) establishing the decoder reference time must be embedded at least once every 100 msec; Null packets not belonging to any Multiplexing Unit can be freely added; and the Tip packet insertion interval is 1.0 second or less on the AV data playback time base. Therefore, count of the VOBU pack can be determined from the access map by inserting PAT, PMT, PCR, and SIT packets between two consecutive Tip packets according to these defined times, and adding Null packets until there are 32 packets.

Consider, for example, the number of packs after conversion when a Tip packet is inserted at 0.5 second intervals and there are 1209 TS packets following a Tip packet identifiable from the access map. In this case there is a total of 15 (=5+5+5) PAT, PMT, and PCR packets, 1 SIT packet inserted after this Tip packet, and 16 Null packets inserted to achieve a total 32 packets. When this is then converted to DVD format, the Tip packet is converted to an NV_PCK (when converted to DVD-Video) or RDI_PCK (when converted to DVD VR) as one pack, and one Multiplexing Unit (11 TS packets) is converted to one pack, respectively. The count of VOBU pack can therefore be denoted as 1+(number of Multiplexing Units).

The number of Multiplexing Units is (number of TS packets following that Tip packet−33)/11.

In this example, therefore, there are

1+((1210−33)/11)=1+107=108.

It thus can be determined that the VOBU has a total 108 packs. If the number of packs in each VOBU and the presentation start time information is known, the DSI packet of the NV_PCK required for conversion to DVD Video can be generated very quickly.

The constraints on the Tip packet insertion interval are as described above. The encoder generating the Constrained SESF encodes the system stream within the above constraints.

<Constraints on Decoder Control>

Constraints on decoder control (buffer management) of Constrained SESF are described next below.

A Constrained SESF must be generated to satisfy the standard of T_STD that is the decoder reference model for an MPEG_TS. This means that the Constrained SESF can be decoded by a set-top box, for example, having a T_STD conforming decoder if the stream types match.

The MPEG_TS standard decoder model T_STD and the MPEG_PS standard decoder model P_STD are substantially the same in operation and processing capabilities, but the audio stream input rate to the decoder differs. More specifically, the transfer rate of the T_STD from the transport buffer before the audio decoder to the audio buffer is 2 Mbps (except for AAC) (see FIG. 18). The P_STD, however, inputs each stream to the decoder at the system rate, which with DVD is 10.08 Mbps.

This means buffer management of a Constrained SESF and DVD format cannot be the same.

The same buffer management thus cannot be used with an MPEG_TS and MPEG_PS. However if the SCR (System Clock Reference) indicating the decoder input time of the pack after conversion can be calculated using the ATS added to each TS packet while avoiding system encoding with reconsideration of buffer management during the conversion from a Constrained SESF to DVD format, very quick and easy conversion can be achieved. Calculating the SCR using the ATS is described in detail further below.

Furthermore, the Constrained SESF of the present invention must be encoded so as to assure that it conforms to the T_STD and also that the MPEG_PS generated by the conversion method described further below conforms to P_STD.

More specifically, the Constrained SESF is a stream encoded to a MPEG_TS so that it also conforms to the P_STD after conversion to an MPEG_PS.

These are the constraints on Constrained SESF buffer management. It should be noted that a normal SESF is simply encoded to conform to the T_STD without considering these constraints.

Examples of MPEG_TS and MPEG_PS that do not conform to the standard T_STD and P_STD models are described below.

Figure 45:
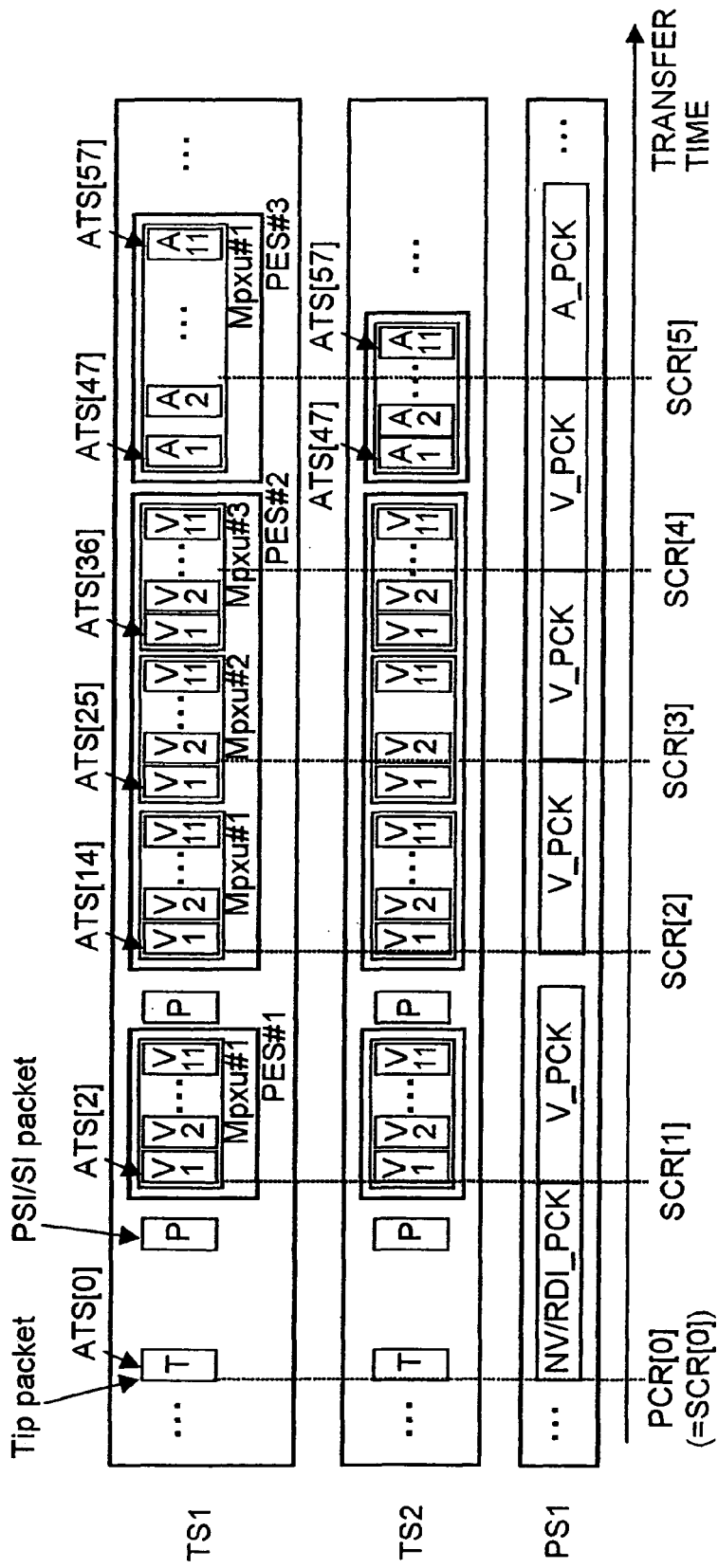
FIG. 45 shows an example of an MPEG_TS self-encoded such that it does not satisfy T_STD model.

First, an example of a MPEG_TS self-encoded such that it can be converted to an MPEG_PS but does not conform to the T_STD model is shown in FIG. 45. Stream TS1 is an MPEG transport stream applied with system-encoding to conform with the T_STD model. Stream TS2 is an MPEG transport stream that does not conform to the T_STD model. More specifically, in the stream TS2, the values of ATS [47] to ATS [57] are set above the transfer rate allowed for MPEG_TS audio data. The audio transport buffer thus overflows (FIG. 18) and the stream does not conform to the T_STD model. In stream TS1, however, the values of ATS [47] to ATS [57] are set within the transfer rate allowed for MPEG_TS audio data. This stream can therefore be correctly converted to a P_STD conforming MPEG program stream PS1 using the SCR conversion equation described below. Furthermore, while stream TS2 does not meet the T_STD standard, PS1 can be generated by conversion using the below SCR conversion equation. For conversion from stream TS2 to MPEG_TS conforming with a T_STD, the audio packet transfer time interval specified by ATS [47] to ATS [57] must be increased so that a transport buffer overflow does not occur.

Figures 46A, 46B:
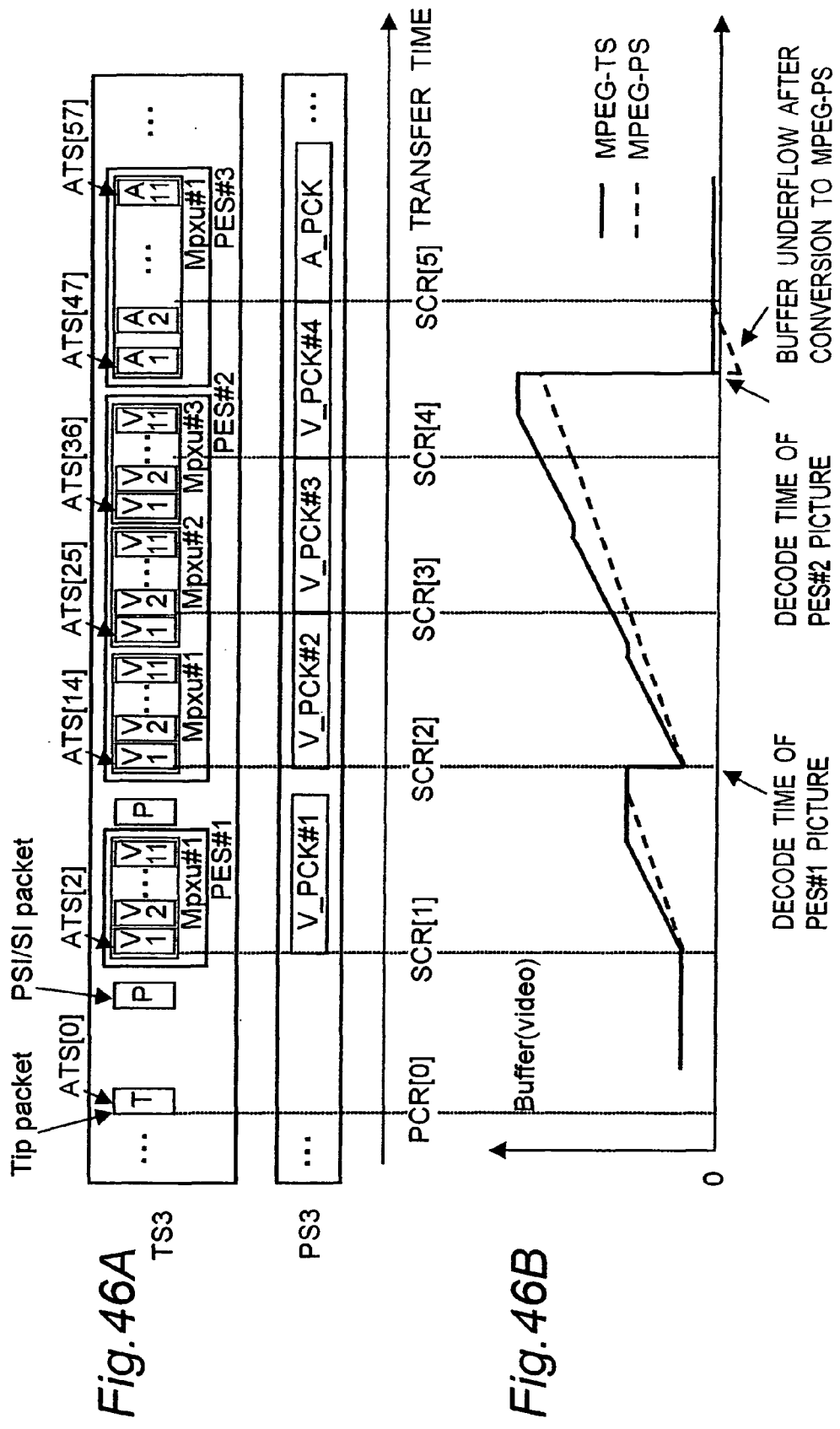
FIGS. 46A and 46B show an example of an MPEG_PS converted from a MPEG_TS such that the MPEG_PS does not satisfy the P_STD model.

FIGS. 46A and 46B shows an example in which the T_STD model is satisfied but the MPEG_PS converted from an MPEG_TS does not satisfy the P_STD model. Stream TS3 is an MPEG transport stream, and stream PS3 is an MPEG program stream converted from MPEG transport stream TS3. FIG. 46B shows the change in the state of a buffer for video data for each stream during decoding. The PES #1 picture is decoded at time SCR [2], and the PES #2 picture is decoded between SCR [4] and SCR [5]. As shown in FIG. 46B, transfer of TS packet data in transport stream TS3 is completed by the time picture data in PES #1 and PES #2 is decoded. With program stream PS3, however, V_PCK #1 data transfer for PES #1 is in time, but transfer of V_PCK #4 for PES #2 data is late for decoding and a buffer underflow occurs because decoding starts while the data transfer is in progress. The requirements of the P_STD model are therefore not met. This can be avoided by shifting the value of the ATS field (ATS [14], ATS [25], ATS [36]) for each TS packet converted to V_PCK #2 to V_PCK #4 so as to be temporally earlier, so that transferring the MPEG_TS PES #2 picture data is completed earlier.

<ATS-SCR Conversion>

Calculation method of the SCR of PS packet when converting a Constrained SESF stream to a program stream is described below. The SCR must be calculated in order to generate a new pack, and is therefore necessary only when converting Tip packets and the first TS packet in a Multiplexing Unit.

The structure of a Constrained SESF stream is as shown in FIG. 14C. A PCR packet storing reference time information (program clock reference PCR) is appropriately inserted to a TS packet, and this can be used to reset the decoder reference time STC (system time clock) at an appropriate time interval. Each TS packet also contains an ATS storing the relative transfer time information between each TS packet. Therefore, TS packets output after the TS packet storing the PCR are input to the decoder at a timing determined from the PCR and ATS indicating the relative transfer time between TS packets. In other words, the decoder input time (the "calculated_PCR" below) of each TS packet can be generated for TS packets from the TS packet storing the PCR. If no TS packet stores the PCR, information equivalent to the PCR can be extracted to the management information.

Figure 47:
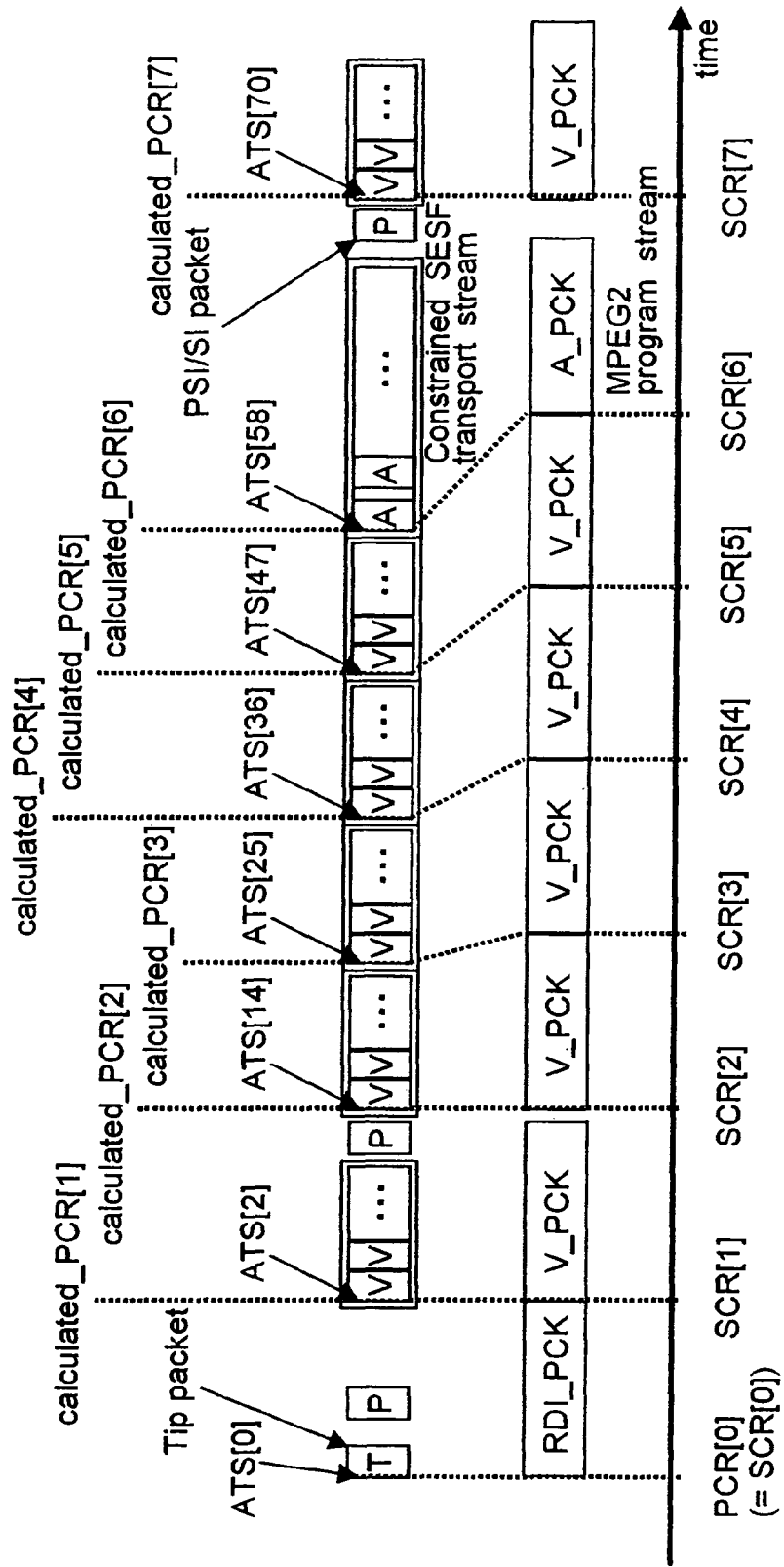
FIG. 47 shows SCR calculation.

FIG. 47 shows the relationship between the calculated_PCR and SCR when converting a Constrained SESF to MPEG_PS, i.e., a head of the SESF capsule shown in FIG. 80. The ATS assigned to each TS packet in ascending order from the stream start is denoted ATS [k]. The PCR calculated in order of appearance for the first TS packet in a Multiplexing Unit is denoted calculated_PCR [i] (i=0, 1, 2 . . . ). The SCR of the pack after conversion is likewise denoted SCR [i].

As noted above, video stream transfers are constrained by the maximum transfer rate of 15 Mbps (in the case of MP@ML, the transfer rate from the multiplexer buffer to the video buffer does not exceed 15 Mbps) and the audio stream input rate is lower than the video transfer rate. (Except for AAC, the transfer rate from the transport buffer to the audio buffer does not exceed 2 Mbps.) Multiplexing units storing audio data are therefore different from Multiplexing Units storing video data and are transferred at a lower rate. Therefore, if the video data transfer rate is raised to near the 9.8 Mbps maximum rate of the DVD format, TS packets of video data must be transferred at a rate above the DVD transfer rate (10.08 Mbps) in order to assure sufficient time for audio data transfers which occur at a lower rate and therefore take more time.

That the transfer time differs in Constrained SESF and the DVD format will be known from FIG. 47.

The following relationship must be true for the decoder arrival time (calculated_PCR) of the first TS packet in a Multiplexing Unit or Tip packet, and the SCR of the pack after that packet is converted.

$$SCR[0] = \text{calculated\_PCR}[0]$$

$$SCR[i] = \max(SCR[i-1]+T, \text{calculated\_PCR}[i]) \; (i=1,2,3,\ldots)$$

$$\text{calculated\_PCR}[i] = PCR\_\text{tip} + (ATS[i] - ATS\_\text{tip} + WA*BS)$$

$$T = PS\_\text{pack\_size} * 8 * \text{system\_clock\_frequency}/PSrate$$

where PCR_tip and ATS_tip are the PCR value and the ATS of the Tip packet immediately before the converted Multiplexing Unit. WA indicates how many times overflow occurred (described further below) in a range between ATS_tip and the ATS (ATS [i]) assigned to the first TS packet in the i-th Multiplexing Unit. BS denotes the amount of one overflow in ATS. max(a,b) is a function for selecting the greater of a or b.

In the SCR [i] (i=0, 1, 2, 3, . . . ) relation, PS_pack_size is the byte length of one pack in the MPEG_PS generated by the TS2PS conversion as noted above, system_clock_frequency is the frequency of the MPEG_PS decoder reference clock, and PSrate is the multiplex rate of the MPEG_PS generated by TS2PS conversion. That is, PS_pack_size=2048 bytes system_clock_frequency=27,000,000 Hz PSrate=10,080,000 bits/second There are, therefore, two patterns for transferring packs after the first pack: transferring the pack after a minimum transfer time determined by the transfer rate passes from the transfer time of the one preceding pack, or transferring the pack at the decoder input time of the first TS packet in the pack. For pack transfers at a time before the time when the video data is converted to the DVD format, packs are transferred at the minimum transfer time interval noted above. For example, when packs are transferred in a time band preceding video data conversion to the DVD format, packs are transferred after waiting the minimum transfer time determined by the transfer rate from the time when the preceding pack was transferred.

It should be noted that because a Constrained SESF can be edited, the calculated_PCR [0] may not go to 0 even when recorded with encode_condition=11b, if the beginning of the stream is deleted by editing, for example.

However, if calculated_PCR [0] is not zero while encode_condition=11b, this problem can be resolved by applying the following conversion equation only when encode_condition=11b.

$$SCR[0]=0$$

$$SCR[i] = \max(SCR[i-1]+T, \text{calculated\_PCR}[i]) - \text{calculated\_PCR}[0] \; (i=1, 2, 3, \ldots)$$

$$\text{calculated\_PCR}[i] = PCR\_\text{tip} + (ATS[n] - ATS\_\text{tip} + WA*BS)$$

$$T = PS\_\text{pack\_size} * 8 * \text{system\_clock\_frequency}/PSrate$$

$PTS(\text{DVD-Video})=PTS(\text{Constrained } SESF)-\text{calculated\_PCR}[0]$ $DTS(\text{DVD-Video})=DTS(\text{Constrained } SESF)-\text{calculated\_PCR}[0]$ As described above, ATS[n] and WA are ATS value of first TS packet in i-th Multiplexing Unit and number of overflows based on ATS_tip, respectively.

In other words, to conform to the DVD Video format, SCR [0] is set to 0, values of subsequent SCRs are offset values, and all PTS and DTS in the DVD Video stream are offset by a uniform time of calculated_PCR [0] using the result of the above conversion equation offset time calculated_PCR [0].

By thus uniformly offsetting the time information of the stream, conversion to the DVD Video format while keeping encode_condition=11b is possible even when the beginning of the Constrained SESF (encode_condition=11b) has been deleted.

PTS and DTS values may be converted during conversion to the DVD Video format, but this can be easily achieved by sequentially processing the TS packet units.

The SCR is calculated from the ATS based on the above equation during TS2PS conversion. The program stream output by TS2PS conversion must conform to the P_STD model as noted above, and this means that SCR values are restricted to a particular range. The ATS values assigned to each packet of a Constrained SESF must therefore be set according to the ATS-SCR relation shown above.

<Elementary Stream Constraints>

Constraints on the elementary streams of a Constrained SESF are described next.

Because re-encoding the elementary streams imposes an extremely heavy burden on the encoder, only MPEG-2 Video is allowed for video data while AC-3, MPEG-1 Audio, and LPCM are allowed for audio data.

The Constrained SESF described here excludes LPCM, however. This is to avoid the danger of needing to re-encode the elementary stream when LPCM uses a quantization rate of 20 bits or more, and to simplify buffer management by reducing the amount of audio data for which the transfer rate cannot be raised. If 16-bit LPCM is used, however, there is no particular need to exclude LPCM audio.

Streams permitted for the Constrained SESF described here are MPEG-2 Video for the video data, and two types of audio data, AC-3 and MPEG-1 Audio.

In normal SESF which is not Constrained SESF, encoding of audio data is not limited to the above. Encoding method such as AAC (Advanced Audio Coding) which is used in BS digital broadcasting can be used.

Elementary stream attributes when encode_condition=11b are shown in FIG. 48.

Because the attributes shown in the figure are set to assure interchangeability at the elementary stream level between DVD Video and DVD VR, a Constrained SESF (encode_condition=11b) conforming to these attributes does not require elementary stream re-encoding when converted to DVD Video or DVD VR formats, and high speed conversion is therefore possible.

Elementary stream attributes when encode_condition=01b are shown in FIG. 49.

Because the attributes shown in the figure are set to assure interchangeability at the elementary stream level with DVD VR, a Constrained SESF (encode_condition=01b) conforming to these attributes does not require elementary stream re-encoding when converted to DVD VR format, and high speed conversion is therefore possible.

Notes 1 to 4 in FIG. 48 and FIG. 49 are described below.

Note 1: This attribute cannot change within the same VOB.

Note 2: This attribute can change in the TS packet storing the first elementary stream following the Tip packet. In other words, it can change only in the first video or audio TS packet in an SESF capsule.

Note 3: sequence_end_code cannot be inserted between sequence_header fields having the same horizontal_size, vertical_size, and aspect_ratio_information.

Note 4: This attribute can change within the same VOB for monaural, stereo, and dual monaural.

Constraints relating to the elementary streams of a Constrained SESF are described above.

Adding the encoding conditions described above makes it possible to generate a Constrained SESF that can be easily and quickly converted to a DVD format.

<DVD Video and DVD VR Format After Conversion>

The field settings of the DVD Video and DVD VR formats to which the Constrained SESF is to be converted are described next.

<DVD Video Format>

A stream conforming to the DVD Video standard is described briefly first below. The DVD Video stream format is described in detail in "DVD Specifications for Read-Only Disc, Part 3, VIDEO SPECIFICATIONS."

Figure 50:
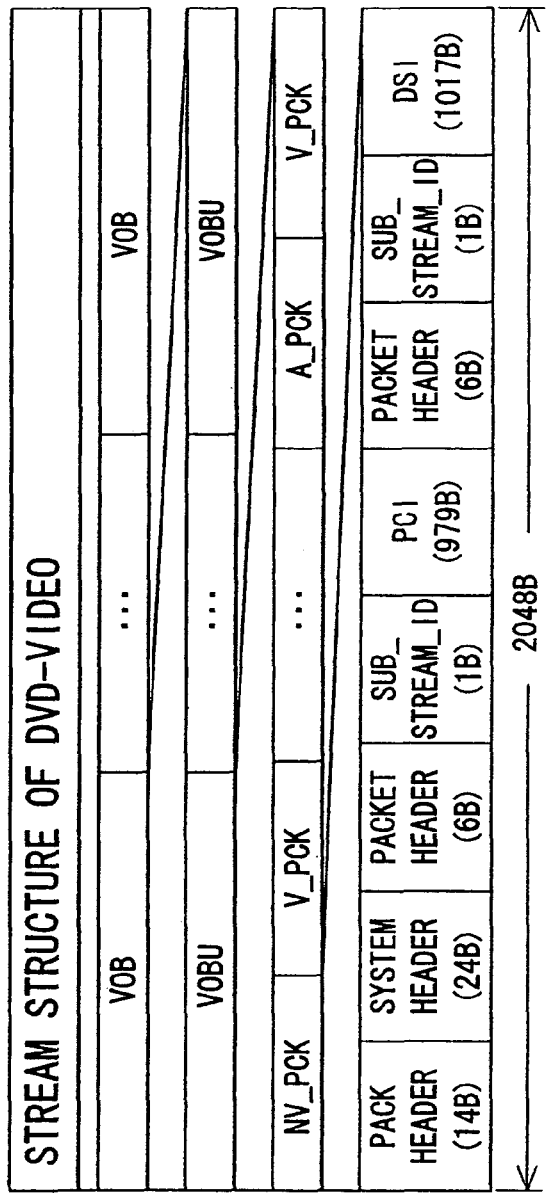
FIG. 50 shows the stream structure of a format conforming to the DVD Video standard.

The stream structure of the DVD Video format is shown in FIG. 50. As shown in the figure each stream contains multiple VOBs and each VOB contains an integer number of VOBU. A VOBU includes an integer number of packs, starting with a NV pack (V_PCK) followed by a video pack (V_PCK) an audio pack (A_PCK). Unlike a normal DVD pack, the NV_PCK contains two packets. These packets are called the PCI (Presentation Control Information) and DSI (Data Search Information) packets, respectively. The playback control information for the corresponding VOBU is stored to the PCI packet. Information useful for special playback modes, such as the relative positions of the VOBU to neighboring VOBU, is stored to the DSI packet. These fields are described next below in conjunction with how the field values are determined.

FIG. 51 shows the structure of NV_PCK PCI data. The PCI data includes PCI_GI (PCI General Information) storing general information for PCI, NSML_AGLI as angle information for non-seamless presentation, HLI as information for adding highlighting to menus and buttons, and RECI storing the International Standard Recording Code (ISRC).

When converted from Constrained SESF, NSML_AGLI and HLI store a value indicating an invalid.

The ISRC field can store a value indicating an invalid or a ISRC code as it is, but this field is irrelevant to conversion from Constrained SESF and further description is therefore omitted. The only field that a problematic with respect to creating PCI data from a Constrained SESF is therefore the PCI_GI field.

FIG. 52 shows the structure of the PCI_GI field in NV_PCK. Note that calculation methods are described below only for those fields that must be calculated during conversion from a Constrained SESF.

NV_PCK_LBN (the relative address of NV_PCK in the VOBS file) can be determined by the data recording apparatus which counts each pack number during conversion.

VOBU_CAT (information of the analog copy protection state) can be obtained from the display_and_copy_info of the Tip packet corresponding to the NV_PCK.

VOBU_S_PTM (presentation time information for the video field presented first in the VOBU) can be calculated from the FVFPST of the Tip packet corresponding to the NV_PCK.

VOBU_E_PTM (time information when presentation of video data in the VOBU ends) can be obtained from the presentation time information written to the next entry in the access map, or it can be generated by analyzing the video stream of the VOBU and calculating the time at which video presentation ends.

VOBU_SE_E_PTM (time information when presentation of video data in the VOBU ends according to the sequence_end_code field) is filled with "0x00000000" in all VOBUs before the last VOBU, because the sequence_end_code is only permitted in the last VOBU and the middle VOBU therefore do not contain the sequence_end_code. VOBU_SE_E_PTM is set to the same value as in VOBU_E_PTM in only last NV_PCK having sequence_end_code in the last VOBU.

C_ELTM is the time difference between the presentation time of the first video frame presented in a cell storing NV_PCK and the video frame first presented in the VOBU, and must be expressed with frame precision. C_ELTM can be calculated as needed by the data recording apparatus during the conversion process using the FVFPST of the corresponding Tip packet and the presentation time information of the video frame presented at the beginning of a CELL.

NV_PCK PCI data can thus be generated as needed by VOBU unit during conversion as described above.

FIG. 53 shows the DSI structure of the NV_PCK. As shown in FIG. 53 the DSI data field includes: DSI_GI (Data Search Information General Information) storing general DSI information; SML_PBI (Seamless Playback Information) storing recording address and playback information needed for seamless presentation between VOBs; SML_AGLI (Angle Information for seamless) storing location information needed for seamless presentation between different angles and so on; VOBU_SRI (VOB Unit Search Information) storing the recording address of VOBU adjacent to a particular VOBU; and SYNCI (Synchronous Information) enabling synchronous presentation of video with audio/subpictures.

When converted from a Constrained SESF, SML_AGLI stores information indicating invalid.

FIG. 54 shows the DSI_GI structure of an NV_PCK. Note that calculation methods are described below only for those fields that must be calculated during conversion from a Constrained SESF.

NV_PCK_SCR (the SCR of the NV_PCK) is deduced from the SCR deduced from the ATS of the Constrained SESF by the method described further below.

NV_PCK_LBN (relative address of the NV_PCK in the VOBS file) is obtained in the same manner as the PCI data.

VOBU_EA (relative address from the NV_PCK to the last pack in the VOBU) can be calculated from the access map. As described above, the number of packets not belonging to a Multiplexing Unit between two consecutive Tip packets is known (fixed). Therefore, the number of TS packets to the next entry (the next Tip packet) can be calculated from the access map. The number of TS packets in that TS packet not belonging to a Multiplexing Unit then subtracted, and the difference is then divided by 11 to determine the number of packs formed after the NV_PCK. The number of packs generated after conversion can be counted and written to the NV_PCK derived from the last Tip packet or to all NV_PCK.

VOBU_1STREF_EA (relative address in the VOBU from NV_PCK to the last pack in the first referenced picture), VOBU_2NDREF_EA (relative address in the VOBU from NV_PCK to the last pack in the second referenced picture), and VOBU_3RDREF_EA (relative address in the VOBU from NV_PCK to the last pack in the third referenced picture) can be determined without analyzing to the video stream layer if the Tip packet PES_info field is referenced during TS2PS conversion.

PES_info stores the picture_coding_type indicating the type of encoding applied to the picture stored in each video PES packet. A PES packet with a picture_coding_type of 01b or 10b stores a reference picture as defined in the DVD Video standard.

It is therefore possible to reference the PES_info field during TS2PS conversion to determine if the PES packet being converted stores a reference picture, and the pack in which said converted PES packet ends becomes the last pack of the reference picture.

Because the last pack of a reference picture can be identified during conversion, it is also possible while generating the VOBU to determine in which pack the first, second, and third reference pictures end, and write a relative address to the end of each said picture in the VOBU_1STREF_EA, VOBU_2NDREF_EA, and VOBU_3RDREF_EA fields of the first NV_PCK in the VOBU.

Alternatively, during conversion of SESF Capsule, with reference to PTS_DTS_flags of PES packet storing video data, storage of the reference picture may be determined serially to calculate these values. For example, if PTS_DTS_flags is 11b, the reference picture is determined to be stored, while if PTS_DTS_flags is 10b, the non-reference picture is determined to be stored.

VOBU_VOB_IDN (the ID number of the VOB to which the VOBU belongs) should be obtainable by the data recording apparatus during conversion. When one Constrained SESF is being converted, VOB segmentation due to the stream conditions, such as an attribute change, is prevented and the same ID number can be assigned by setting the Constrained SESF encode_condition to 11b.

Like VOBU_VOB_IDN, VOBU_C_IDN (the ID number of the CELL to which the VOBU belongs) is set by the data recording apparatus during conversion, and is not related to the stream. If the CELL is intentionally segmented based on the PGC information or other management information for the Constrained SESF, a number determined by the segmentation is simply assigned.

C_ELTM is the time difference between the presentation time of the first video frame presented in a cell storing NV_PCK and the video frame first presented in the VOBU, and must be expressed with frame precision. C_ELTM is the same as the C_ELTM written to the PCI data.

Each field of the DSI_GI field in the NV_PCK can thus be continuously generated by VOBU unit during conversion as described above.

FIG. 55 shows the structure of the SML_PBI field in NV_PCK. Note that calculation methods are described below only for those fields that must be calculated during conversion from a Constrained SESF.

VOB_V_S_PTM (presentation time of the first video frame presented in the VOB to which NV_PCK belongs) can be determined from the FVFPST of the first Tip packet.

VOB_V_E_PTM (video presentation end time in the VOB to which NV_PCK belongs) can be set anytime by analyzing the stream after the last Tip packet in the part of the Constrained SESF selected for conversion before the actual TS2PS conversion and obtaining the end presentation time of video data.

It is thus possible to calculate the fields of SML_PBI of NV_PCK before conversion. It is enough to use that value during the conversion.

As noted above VOBU_SRI can be calculated using the access map, and further description thereof is thus omitted here.

Furthermore, VOBU_SRI is written completely within each cell and thus cannot be determined if the cell is not defined. Therefore, a recorder that records in the DVD Video format in real-time cannot create cells at any desired interval and thus suffers from degraded editing and playback performance. When converting from a Constrained SESF, however, cells can be defined as periods specified by the user and converted using the method described above, chapters can be created as intended by the user, and a play list that starts playback from a user-defined point can be created conforming to the DVD Video format.

FIG. 56 shows the structure of the SYNCI field of NV_PCK. Note that calculation methods are described below only for those fields that must be calculated during conversion from a Constrained SESF.

A_SYNCA0 is the relative address of a pack storing a primary audio pack and storing the audio frame presented simultaneously to or immediately after VOBU_S_PTM. It can be determined using the PES_info in the Tip packet without analyzing the stream during TS2PS conversion.

Whether a PES packet stores primary audio can be determined by reading the stream_identifier of the PES_info, and at the next sync_presentation_flag it is possible to determine whether there is an audio frame presented simultaneously to or immediately after VOBU_S_PM in the audio frame contained in the PES packet. Therefore, if the PES packet contains primary audio and the sync_presentation_flag=1b, the address from the NV_PCK to the pack storing the PES packet can be written during TS2PS conversion.

It should be noted that there is no guarantee that the sync_presentation_flag=1b will be set in one audio pack of the VOBU. If the encoder multiplexes the audio first, the audio pack presented simultaneously to or immediately after VOBU_S_PTM of the VOBU could be stored in the preceding or the following VOBU.

The value set to the A_SYNCA0 field must therefore be determined during conversion with a correct understanding of the sequential relationship between the PES packet of the primary audio (the sync_presentation_flag=1b) and the subsequently generated NV_PCK.

To eliminate this process the Constrained SESF can be system encoded so that the audio data presented simultaneously to or just after the FVFPST written to the first Tip packet in the SESF capsule is also stored in the same SESF capsule.

By using these definitions a process for detecting audio data synchronized to VOBU_S_PTM (FVFPST) outside the VOBU (SESF capsule) can be eliminated.

A_SYNCA1 is the relative address of a pack storing a secondary audio and storing the audio frame presented simultaneously to or immediately after VOBU_S_PTM, and can be determined using the same method as A_SYNCA0.

Except for A_SYNCA, it is thus possible to sequentially generate DSI data of NV_PCK by VOBU unit during conversion.

An example of NV_PCK generation is as shown in FIG. 82.

<DVD Video Recording Format>

Field settings during conversion to the DVD Video Recording (VR) stream format are described next below.

The DVD VR stream is described briefly below. Note that the DVD VR stream format is described in detail in "DVD Specifications for Rewritable/Re-recordable Discs, Part 3, VIDEO RECORDING."

Figure 57:
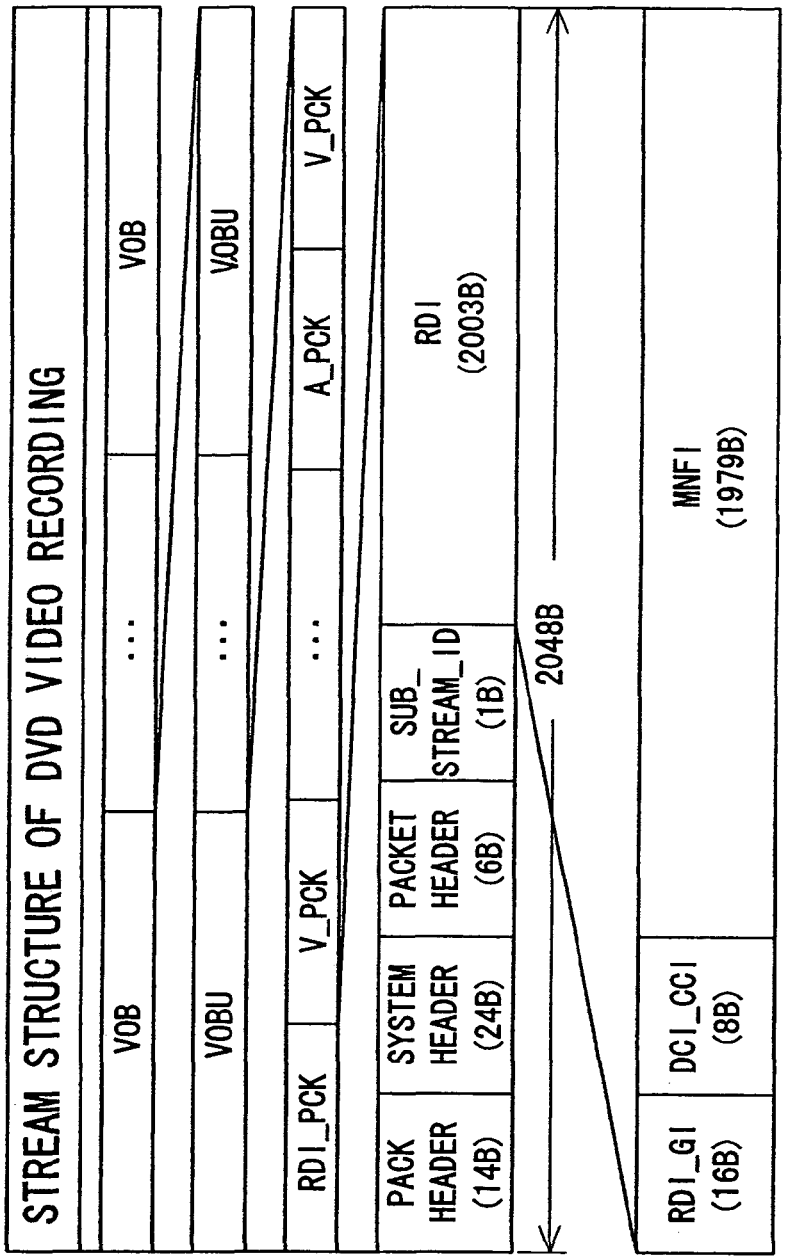
FIG. 57 shows the stream structure of a format conforming to the DVD Video Recording standard.

FIG. 57 shows the stream structure of the DVD VR format. As shown here each stream includes multiple VOBs, and each VOB contains an integer number of VOBUs. A VOBU includes an integer number of packs, starting with an RDI_PCK followed by a video pack (V_PCK) and an audio pack (A_PCK). Unlike a normal pack, the RDI_PCK contains presentation and copy control information, and manufacturer-specific information. The fields contained in the RDI_PCK are described below together with how the field values are determined.

As shown in the figure, the RDI_PCK payload data (RDI Unit) includes: RDI_GI (Real-time Data Information General Information) storing general information of RDI, DCI_CCI (Display Control Information and Copy Control Information) storing information used for display and copy control, and MNFI (Manufacturer's Information) storing manufacturer-specific information.

The RDI_GI field contains a VOBU_S_PTM field. Only this field is variable and the other field values are fixed.

VOBU_S_PTM has the same format as the FVFPST written to the corresponding Tip packet in the transport stream before conversion, and the FVFPST value can therefore be simply copied to the VOBU_S_PTM field.

DCI_CCI has the same format as the display_and_copy_info field of the Tip packet, and the display_and_copy_info value can therefore be simply copied to the DCI_CCI field.

A specific manufacturer ID is allocated only when the maker_ID written to the Tip packet is identical to the manufacturer ID of the data recording apparatus, and the manufacturer-specific information is copied to the MNFI field. However, if the maker_ID in the Tip packet is the ID for a different manufacturer, or the maker_ID is invalid, the RDI pack can be generated by writing invalid data to the MNFI field.

It is possible that part of the data written to the Tip packet is invalid. In this case a flag (an invalidation flag) indicating that there is invalid data in the Tip packet should be set. If this invalidation flag is set to ON, the flag must be updated after updating the invalid data in the Tip packet to the most recent data.

As an example of this, considered can be a case where the most recent CCI data and a TS packet CCI data invalidation flag are present in the ATS (4B) of each TS packet.

In this case it is necessary to determine if the invalidation flag is set during TS2PS conversion. If it is, it is necessary to convert to an RDI_PCK using data updating the CCI data in the display_and_copy_info field with the CCI flag of the ATS.

RDI_PCK can thus be sequentially generated using only the corresponding Tip packet (and ATS thereof).

Figure 58:
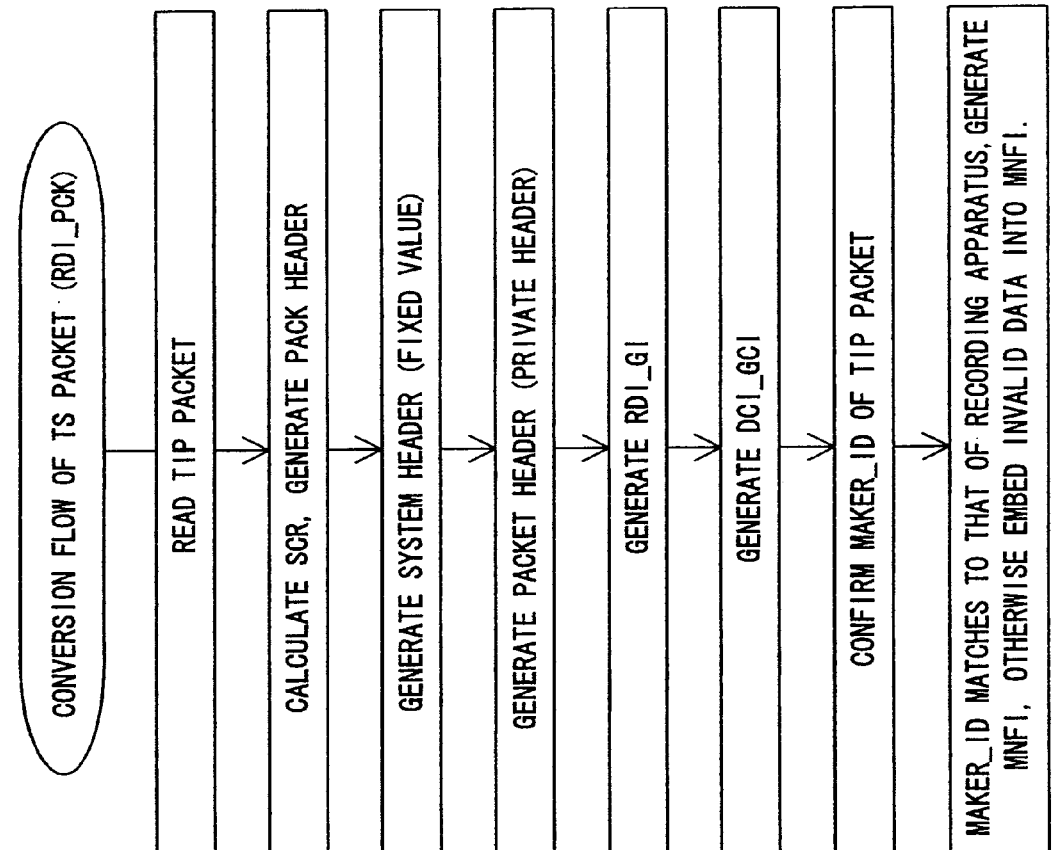
FIG. 58 is a flow chart of the TS packet (RD_PCK) conversion process.

FIG. 58 is a flow chart of the above RDI_PCK generation process.

In a RDI_PCK (or NV_PCK), the system header includes fixed-value fields. Details of the system header are shown in FIG. 61. The packet header and private header stored to the RDI_PCK are shown in FIGS. 62A and 62B, respectively. Because these headers include fixed-value fields as shown in the figures, they can be easily generated.

Figure 59:
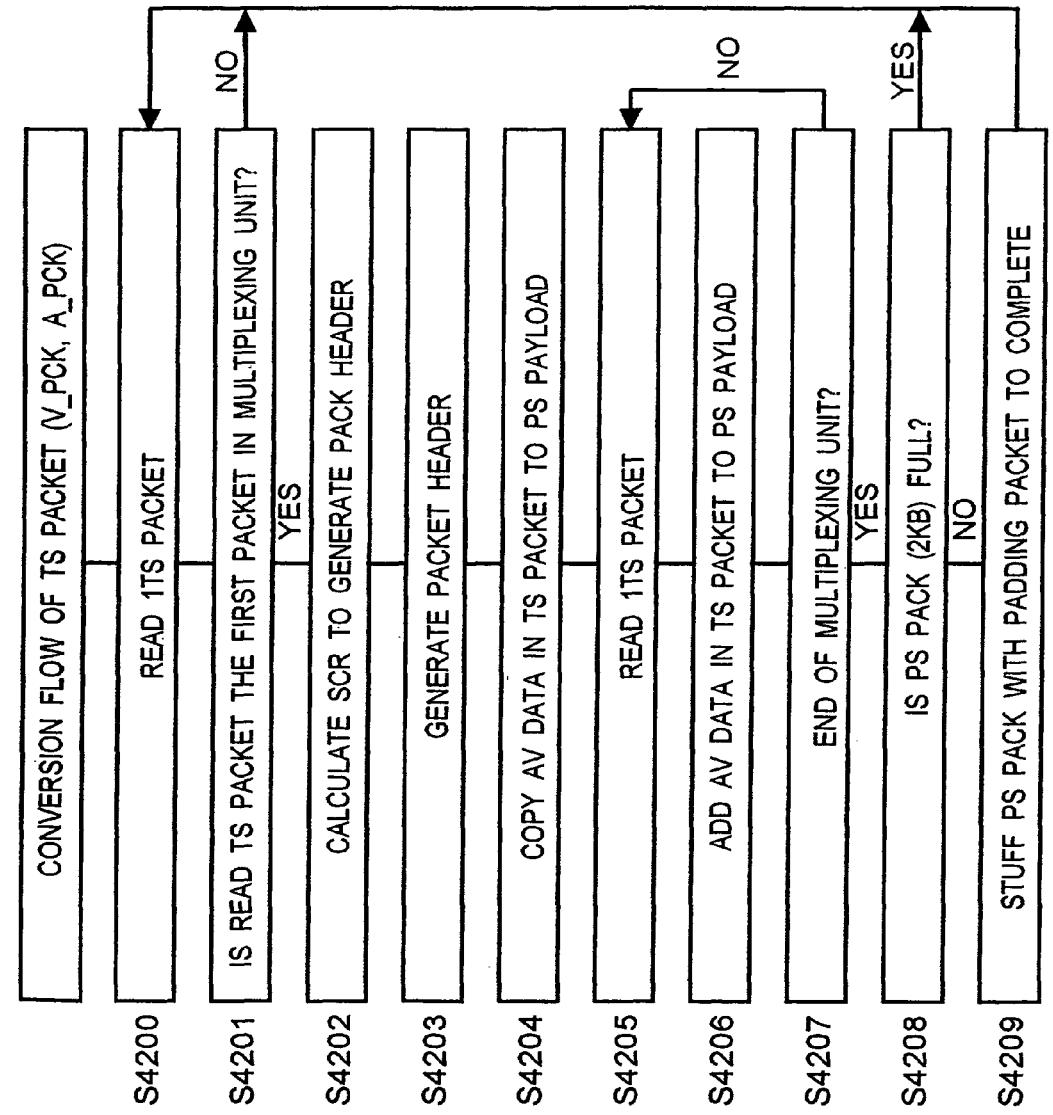
FIG. 59 is a flow chart of the TS packet (V_PCK, A_PCK) conversion process.

FIG. 59 is a flow chart of a process for generating PS packs from TS packets (Multiplexing Unit) storing AV data.

As shown in the figure, TS packets of a Constrained SESF storing AV data are converted using one Multiplexing Unit as the unit of processing to 2 KB packs of an MPEG_PS storing AV data. This is further described below following the steps of this process.

(Step S4200): One TS packet is read from the conversion starting point of the Constrained SESF stream.

(Step S4201): Whether the read TS packet stores AV data and is the first TS packet in a Multiplexing Unit is determined.

Whether AV data is stored is determined by reading the PID value of the TS packet declared in the PMT to store AV data. The TS packet is determined to be at the beginning of a Multiplexing Unit when the preceding TS packet is a Tip packet, PSI/SI packet, or PCR packet and the TS packet following immediately thereafter stores AV data. Because a Tip packet is expected at a conversion starting point, whether it is at the beginning of a Multiplexing Unit can be determined by sequentially reading the TS packet (that is, the first TS packet storing AV data immediately after a Tip packet is always at the beginning of a Multiplexing Unit). If the TS packet is determined to not be at the beginning of a Multiplexing Unit, or if conversion does not start from a Tip packet and the determination cannot be made, control loops back to step S4200 to read the next TS packet. Control moves to the next step after the beginning of a Multiplexing Unit is found.

(Step S4202): Using the ATS assigned to the TS packet at the beginning of the Multiplexing Unit, the time (calculated_PCR) at which the MPEG_PS pack to which the TS packet is converted will be input to the decoder is calculated. The PCR is calculated as described above. Once the PCR is calculated the SCR can be determined by the method described above, and the pack header shown in FIG. 60 is completed. This is because except for the SCR only fixed values are permitted in the pack header.

(Step S4203): The packet header and private header are determined.

The packet header is created based on the PES packet header of the Constrained SESF. The form of the packet header must satisfy the field values shown in FIG. 63. This is because conversion from the Constrained SESF will not be determined uniformly if field values that will change the header length are not set, and buffer management may be affected. Field not shown here are fixed values and are therefore not listed.

Individual field values of the PES packet header are determined specifically with the Constrained SESF in order to minimize the processing required for PES packet header (MPEG_TS) to packet header (MPEG_PS) conversion.

If the PES packet is large relative compared to the size of one pack, one PES packet will be converted to plural packs. In this case revisions to the packet headers of the second and subsequent packs include setting PTS_UTS_flags in the first packet header generated from the PES packet to 00b, the PES_extension_flag to 0b, adjusting the stuffing_byte length, and correcting PES_header_data_length.

The private header is required when a non-MPEG stream is stored, and is therefore required in packs storing NV_PCK, RDI_PCK, AC-3, or LPCM.

FIG. 64 shows the private header of an AC-3. Of the fields shown in the figure, only the number_of_frame_headers field requires calculating during TS2PS conversion according to the Constrained SESF Multiplexing Unit definition. Because this field specifies the number of AC-3 audio frames stored in the pack, the field value can be easily calculated from the PES_packet_length for fixed-rate AC-3, for example, because the byte length of one audio frame is calculable from the bit rate and the value is a fixed length.

It should be noted that the PES_header_data_length of the PES packet header of a Constrained SESF is stuffed with an extra 4 bytes by the AC-3 private header (4 bytes). (See FIG. 44.) By thus estimating before conversion the header length after conversion and shifting the payload position, sequential process in units of TS packet can be easily done.

As described above, the first packet header is generated by correcting a part of the PES packet header, the second and later packet headers is generated by correcting a part of the first packet header, and the private header is inserted only for streams not complying with MPEG standard. The packet header and private header can thus be generated.

(Step S4204): Once the private header is generated, the PS pack payload is filled from the beginning thereof by simply copying data from the TS packet payload.

(Steps S4205 to S4207): These steps simply repeat until the Multiplexing Unit (11 TS packets) is completed. However, because it is possible that a Null packet has been inserted, TS packet payload data is copied while the Null packet PID (0x1FFF) is detected.

Preferably it is defined that only the TS packet storing the last data of the PES packet has an adaptation field. This makes reading the payload data easier because TS packets other than TS packet storing the last data of PES packet in Constrained SESF always store 184 bytes of payload data.

(Step S4208): When all Multiplexing Unit payload data has been copied, the byte length of the resulting pack is calculated to confirm if a byte length is 2048 bytes. Pack generation ends if there are 2048 bytes. If the pack contains less than 2048 bytes, control steps to S4209.

(Step S4209): If the pack does not contain 2048 bytes, a padding packet is added to the end of the payload to a total of 2048 bytes.

The conversion process thus proceeds from a Multiplexing Unit storing AV data. This process repeats only if a Multiplexing Unit is detected until processing the part of the Constrained SESF selected for conversion ends.

The result of the above conversion process applied to packs of different types is described next below.

<Conversion to a Video Pack (V_PCK)>

Figure 65A:
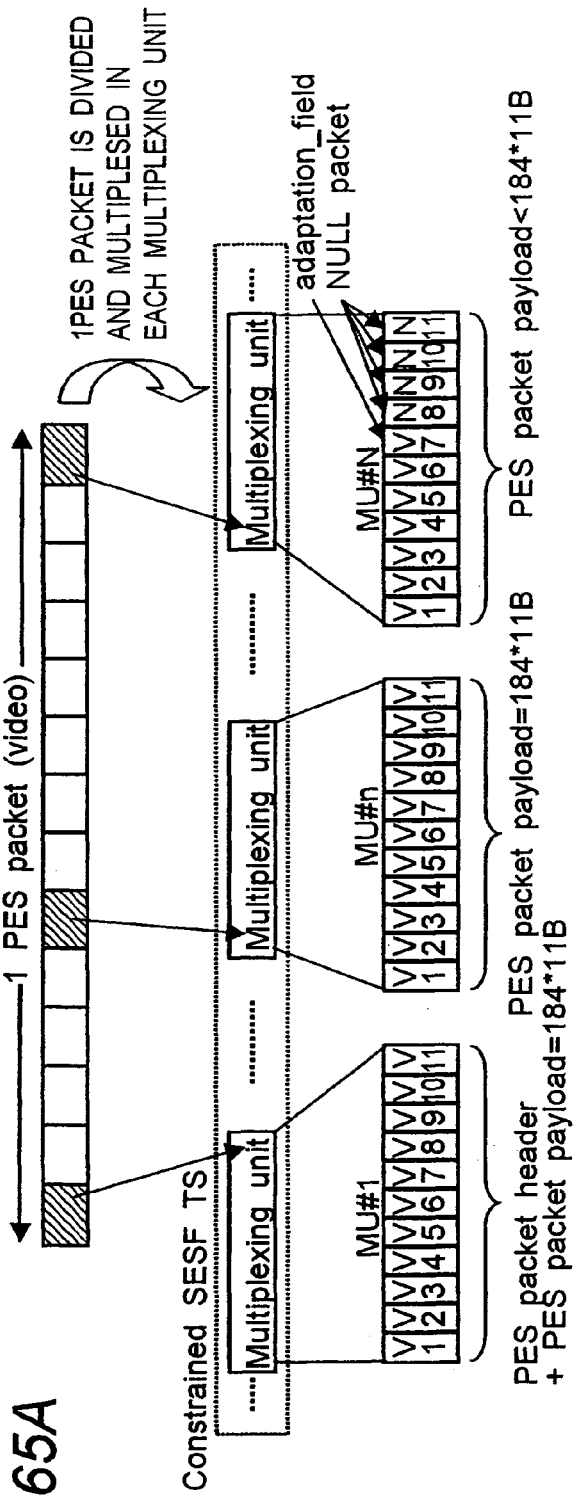
FIGS. 65A and 65B show converting a Constrained SESF to an MPEG_PS for a video pack.
Figure 65B:
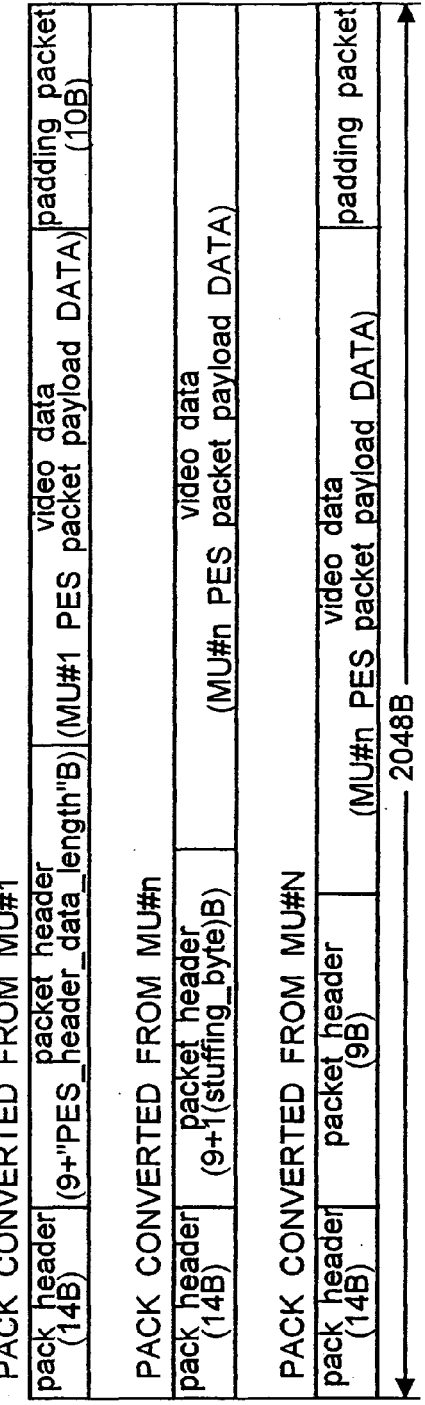

FIGS. 65A and 65B show the conversion from a Constrained SESF to MPEG_PS. As shown in FIG. 65A, one video PES packet is normally larger than 2 KB, and is therefore segmented to plural Multiplexing Units and multiplexed to a Constrained SESF.

Based on the Constrained SESF definition each Multiplexing Unit other than the last Multiplexing Unit in a video PES packet is filled with the greatest possible amount of video PES packet data. Every Multiplexing Unit other than the last Multiplexing Unit therefore stores 2024 bytes (=184×11 bytes) of data.

Using this definition makes it possible to predefine such fields as the PES_packet_length and stuffing_byte of each pack at TS2PS conversion.

The last Multiplexing Unit storing data for one video PES packet may fill the remaining data capacity with the adaptation field and Null packets to form one complete Multiplexing Unit, or store data of the next PES packet for efficient data transfer (for increasing amount of data stored to the converted MPEG-PS pack).

However, in consideration of facility of conversion to DVD, only I-picture in SESF capsule is located from the beginning TS packet in the Multiplexing Unit storing the first video data in the SESF capsule. P-picture and B-picture may not be located from the beginning of the Multiplexing Unit as describe above.

As shown in FIGS. 65A and 65B, the following three types of Multiplexing Units are used to form one video PES packet: the first Multiplexing Unit storing the first data in the PES packet (MU #1 in the figures); Multiplexing Units (MU #n where n=2, 3, . . . N−1) storing data in the middle of the PES packet; and the Multiplexing Unit (MU #N) storing the last PES packet data.

The structure of the packs corresponding to these Multiplexing Unit types in the MPEG_PS stream resulting from TS2PS conversion is shown in FIG. 65B.

The pack converted from MU #1 always contains at least 10 bytes of empty space, and padding packets are therefore inserted at the end when the pack is generated.

This is because the DVD format specifies that stuffing bytes (last field of the packet header) are added to a total 2048 bytes when there is a space of 7 bytes or less in the pack, and padding packets are added if the space is 8 bytes or larger.

One stuffing byte is added to the packs converted from MU #n to complete each pack.

The pack converted from MU #N normally has a space of 8 bytes or larger, and a padding packet is therefore inserted.

<Conversion to an Audio Pack (A_PCK)>

Figure 66A:
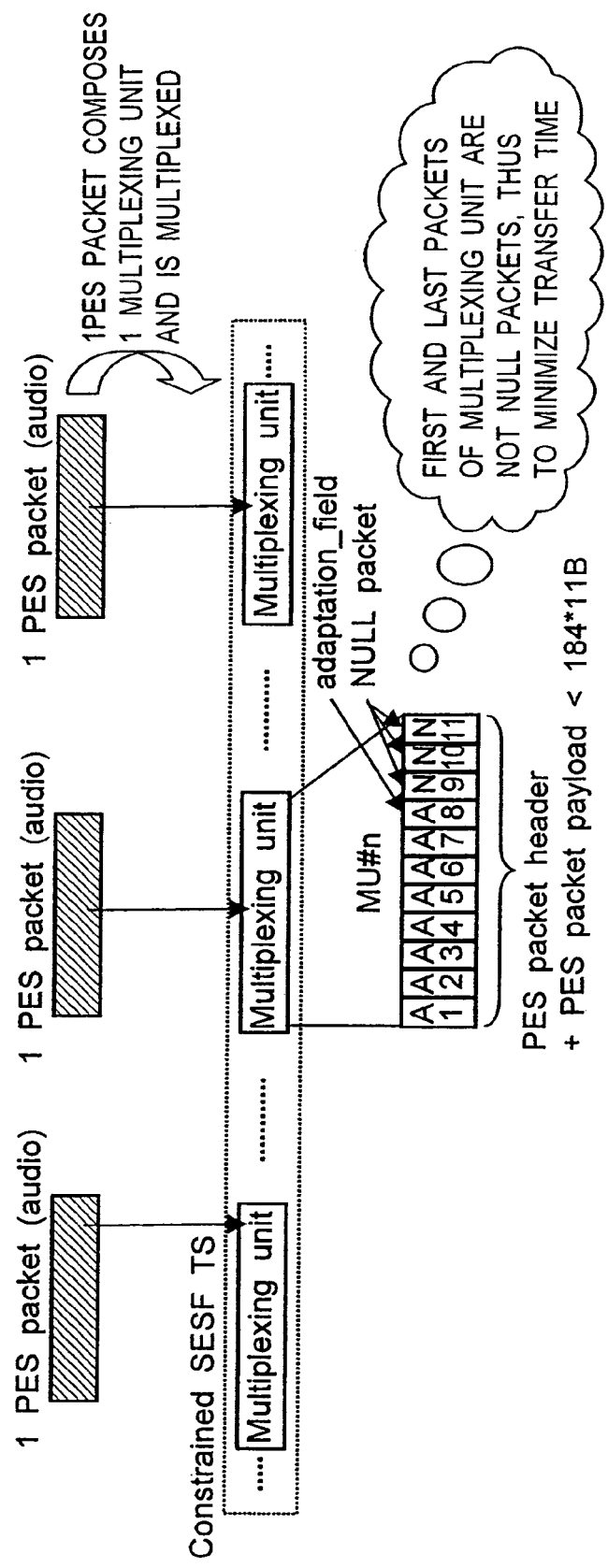
FIGS. 66A and 66B show converting a Constrained SESF to an MPEG_PS for an audio pack.
Figure 66B:
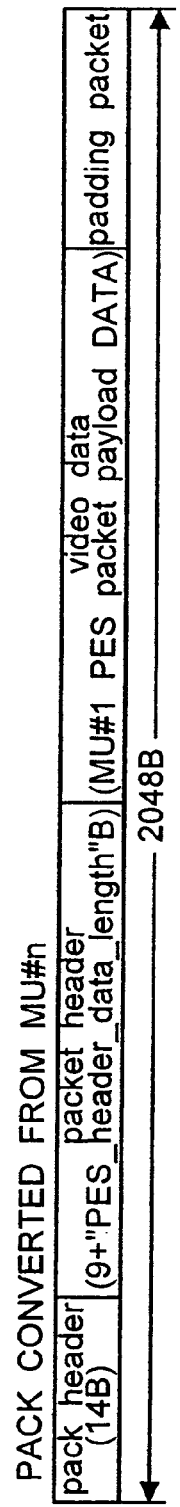

FIGS. 66A and 66B shows conversion from Constrained SESF to MPEG_PS. As shown in FIG. 66A, one audio PES packet (storing one or more audio frames) is smaller than one Multiplexing Unit.

Because one audio PES packet will fit in one Multiplexing Unit, complex conversion is not required as it is for a video PES packet. More specifically, packs to which padding packets are added should always be generated as shown in FIG. 66B.

Furthermore, because PES_packet_length does not change with TS2PS conversion, only simple calculations are required for conversion. These include appropriately setting the stream_id when converting MPEG-1 Audio, and generating the AC-3 private header.

As also shown in the figure, buffer management can be simplified by minimizing the audio data transfer time, which is the greatest factor complicating system encoding a Constrained SESF.

Because video data and other PSI/SI packets cannot be transferred when audio Multiplexing Units are being transferred, the overall transfer rate drops (i.e., image quality drops), and as the transfer time increases the video data must be transferred that much earlier on the transport stream (thus complicating system encoding). The audio Multiplexing Unit transfer time is therefore preferably as short as possible.

In other words, transferring the audio Multiplexing Unit in a shorter time means increasing the audio transfer rate. This is connected to reducing the difference between the allowed audio input rates, which is a major difference between the T_STD and P_STD. A major benefit of this is to also simplify generating a Constrained SESF, which must conform to both decoder models.

FIG. 67 shows the audio bit rates allowed in a Constrained SESF and the maximum payload length stored to one audio PES packet when AC-3 and MPEG-1 Audio is stored at each bit rate. Because data longer than the shown byte lengths will not fit in one audio PES packet, padding packets are inserted. (Constraints in PES Packet)

Integer number of PES packets including integer number of audio frames may be stored to integer number of Multiplexing Units so as to increase amount of data which can be stored in converted MPEG-PS pack, thus achieving efficiency multiplexing. However in this case, a problem may occur on PTS calculation during the conversion.

DVD standard specifies that PTS of the first one of audio frames which start in PES packet for audio should be described as PTS in a packet header of a PES packet for audio.

In TS2PS conversion, there may be a case in that an audio frame at a head of PES packet after conversion to MPEG-PS (DVD) does not conform with an audio frame at a head of PES packet multiplexed with the constrained SESF before conversion. Accordingly, in the present invention. the multiplexing process is performed according to the constrained SESF so that the first one of audio frames in PES packet of a pack of MPEG-PS after conversion always includes PTS. Thus it is not necessary to calculate and obtain PTS newly in TS2PS conversion.

Accordingly, it is effective to arrange that the first one of complete audio frames in the Multiplexing Unit is the first one (that is, the audio frame with PTS inevitably recorded) of audio frames in a payload of PES packet in Multiplexing Unit. Therefore, the constrained SESF according to the present invention defines that the first one of complete audio frames in the Multiplexing Unit is the first one of audio frames in a payload of PES packet in the Multiplexing Unit. This definition may also be defined so that an audio frame of which beginning byte starts first in the Multiplexing Unit is the first audio frame in a payload of PES packet in the Multiplexing Unit. The constraint by this definition is one of constraints of the constrained SESF, and thus it is possible to judge if the definition is satisfied by referring to encode_condition flag.

FIG. 83A is a figure showing MPEG-TS which is formatted in the constrained SESF satisfying the above definition and MPEG-PS which is converted therefrom.

PES packet header of PES packet 411, 412 or 413 includes PTS value (PTS#1, PTS#5 or PTS#8) for the first audio frame (AF#1, AF#5 or AF#8) in audio frames included in each PES packet 411, 412 or 413.

The first Multiplexing Unit (401) includes all data for PES packet 411 and a part of data for PES packet 412.

The first complete audio frame in the first Multiplexing Unit (401) is audio frame #1 which is the first audio frame in the payload of PES packet 411 and thus satisfies the above definition. Regarding the second Multiplexing Unit (402), the first complete audio frame in the second Multiplexing Unit (402) is audio frame #8 which is the first audio frame in the payload of PES packet 413 and thus satisfies the above definition. It is noted that although the second Multiplexing Unit (402) includes a latter half of audio frame #7 immediately after PES packet header, the latter half of audio frame #7 is a part of audio frame but is not a complete audio frame. Therefore this is not a condition used for considering the above definition.

PES packet header of PES packet 411 included in the first Multiplexing Unit (401) includes PTS value (PTS#1) of the first audio frame #1 of audio frames (AF) following the PES packet header. The second Multiplexing Unit (402) includes PTS value (PTS#8) of the first complete audio frame #8 in audio frames (AF) following the second Multiplexing Unit.

When converting the second Multiplexing Unit (402) to MPEG-PS, PTS value stored in PES packet header included in Multiplexing Unit (402), a value of PTS value (PTS#8) stored in PES packet header included in the Multiplexing Unit (402) is copied as it is to PES packet header in the destination MPEG-PS. Thus it is enough to copy PTS value in PS2TS conversion, thereby simplifying the process.

Next description is made to a case in that PES packet includes video data. As one of constraints of constrained SESF regarding PES packet including video data, it may be defined that PES packet including I-picture starts from a head of the Multiplexing Unit.

Figure 83B:
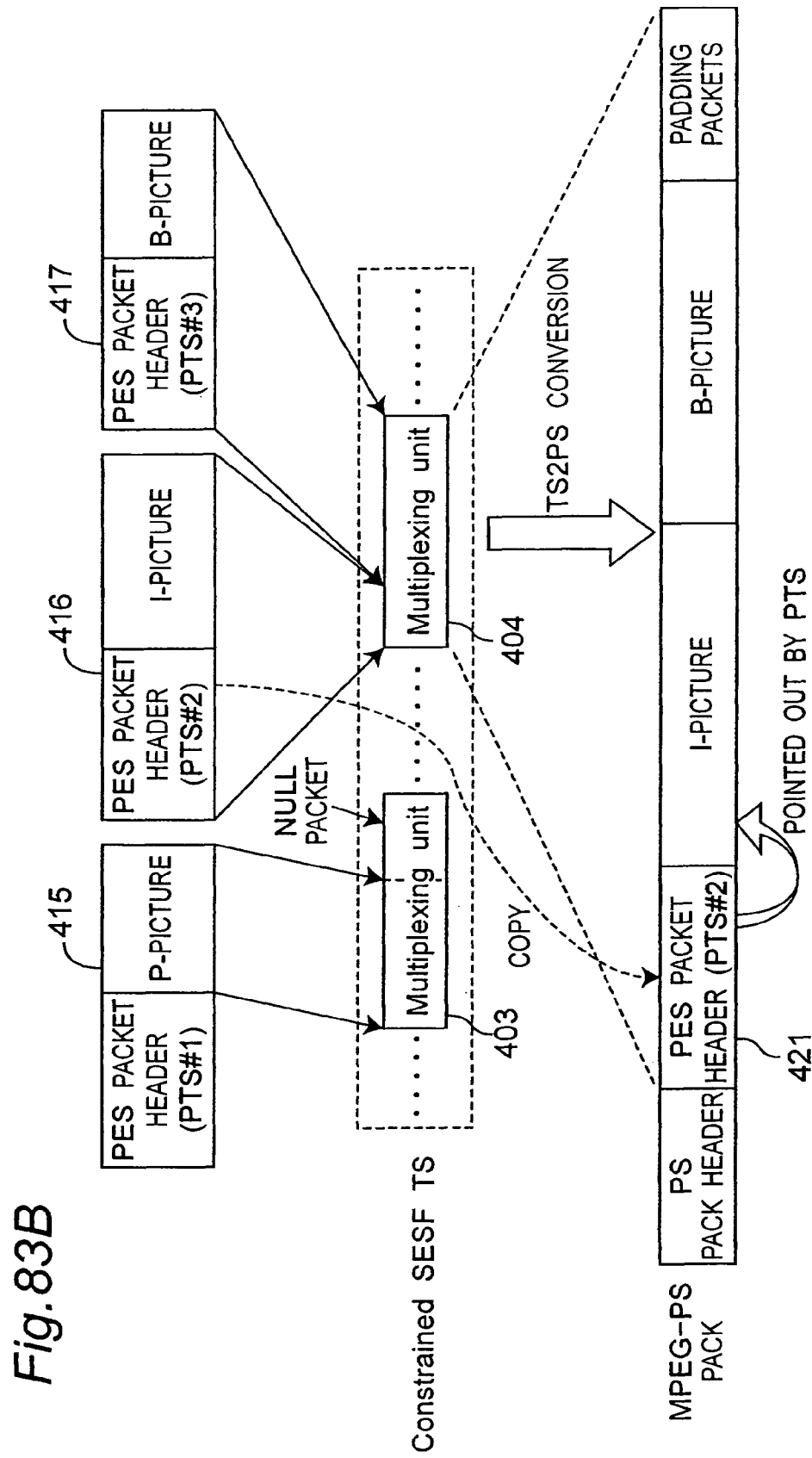
FIG. 83B shows efficiency multiplexing method using Multiplexing Unit with I-picture aligned in the lead.

FIG. 83B shows an example satisfying the above definition. In FIG. 83B, PES packet 416 includes I-picture, and PES packet header of the PES packet stores PTS value (PTS#2) of I-picture. PES packet 416 is located at a head of the Multiplexing Unit (404).

In packs of the converted MPEG-PS, PTS value (PTS#2) stored in PES packet header 421 points out I-picture immediately after the PES packet header 421. The Multiplexing Unit (403) stores P-picture included in the payload of PES packet 415. The remaining portion of the Multiplexing Unit is filled with NULL packets to align I-picture to the next Multiplexing Unit (404).

When the Multiplexing Unit (404) is converted to MPEG-PS, a value (PTS#2) of PES packet header in the Multiplexing Unit (404) is copied to PES packet header 421 of MPEG-PS pack. Hence, it is enough to just copy PTS but it is not necessary to calculate PTS, thus simplifying the process.

<TS2PS Conversion Process>

The TS2PS conversion process is detailed next below with reference to flow charts of FIG. 68 to FIG. 79.

Figure 68:
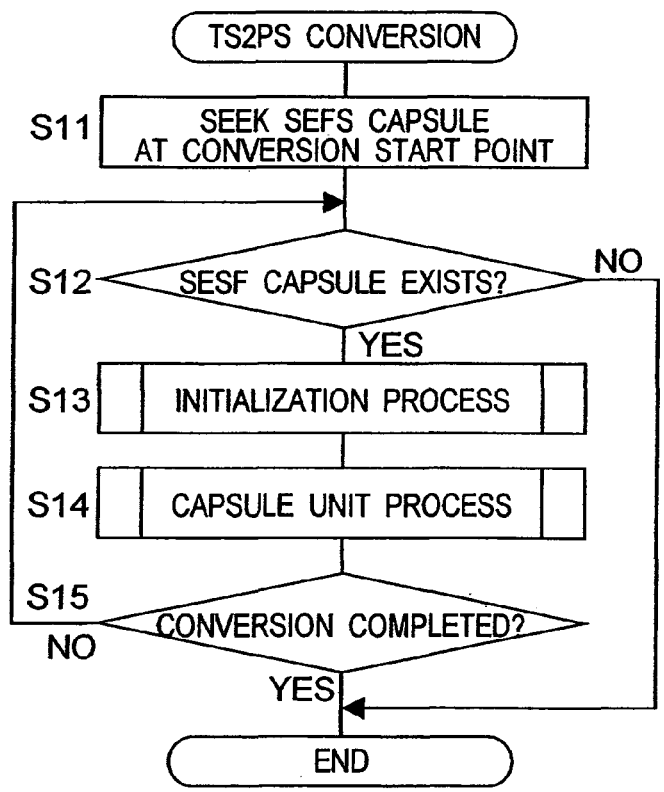
FIG. 68 is a flow chart of overall TS2PS conversion process.

FIG. 68 is a flow chart of the main TS2PS conversion process. This process starts when a user inputs a TS2PS conversion request. The data recording apparatus then seeks the SESF capsule from which conversion starts (S11) and determines if the SESF capsule to be processed is present (S12). If it is not, the process ends. If the SESF capsule is present, an initialization process (S13) and capsule unit process (S14) are run.

Figure 69:
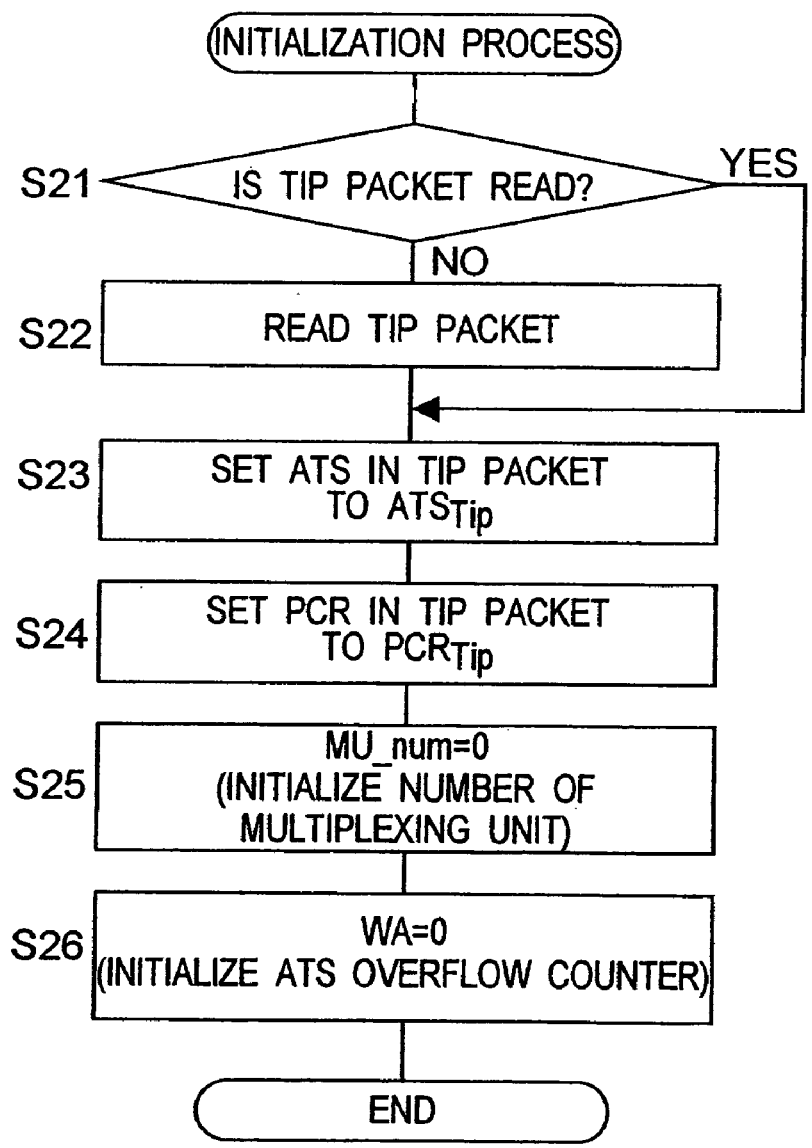
FIG. 69 is a flow chart of initialization process in the TS2PS conversion process.

The initialization process (S13) is described with reference to the flow chart in FIG. 69. This process sets and initializes the variables and other parameters used in the following process.

Whether a Tip packet has been read is first determined (S21). If a Tip packet has not yet been read, a Tip packet is read (S22). The ATS value of the read Tip packet is then set to variable ATSTip (S23), the PCR value of Tip packet is set to variable PCRTip (S24). Variable MU_num specifying the number of the Multiplexing Unit being processed is set to 0 (S25), and variable WA indicating how many times an ATS overflow occurred is set to 0 (S26).

Figure 70:
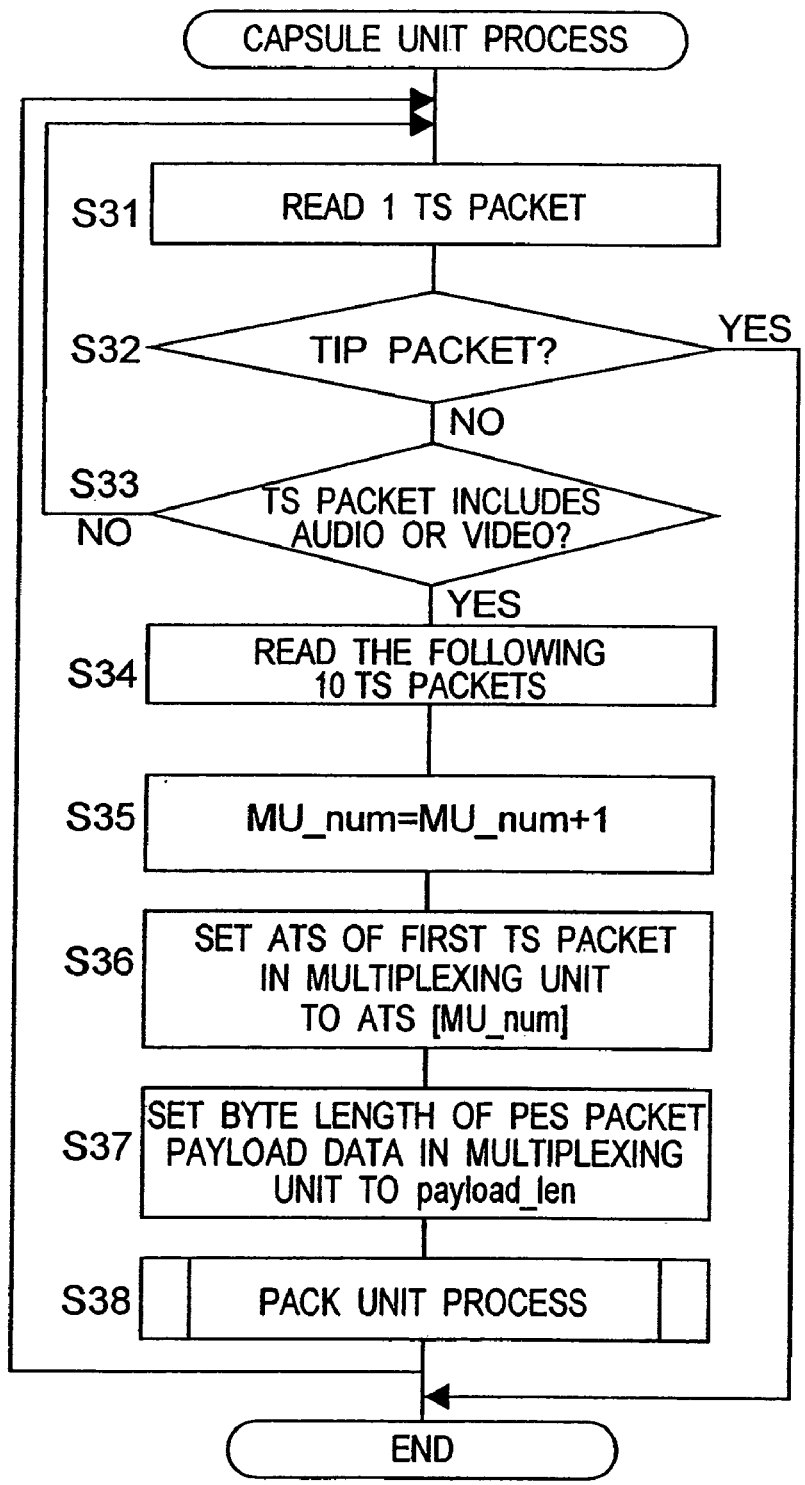
FIG. 70 is a flow chart of the capsule unit process in the TS2PS conversion process.

The capsule unit process (S14) is described with reference to the flow chart in FIG. 70. This process starts by reading a TS packet (S31) and then detecting if the read TS packet is a Tip packet (S32). Processing ends if it is a Tip packet. If not a Tip packet, it is determined whether the read TS packet contains an audio packet or video packet (S33). If the read TS packet does not contain an audio packet or video packet, control loops back to step S31, and TS packets are sequentially read until the read TS packet is an audio packet or video packet (S31 to S33 repeat).

When the read packet is an audio or video TS packet, the next 10 TS packets are also read (S34). MU_num is then incremented (S35). The ATS value of the first TS packet in the Multiplexing Unit is stored to variable ATS[MU_num] (S36). The byte length of the payload data in the PES packet stored to the Multiplexing Unit is set to payload_len (S37). The pack unit process is then run (S38).

Figure 71:
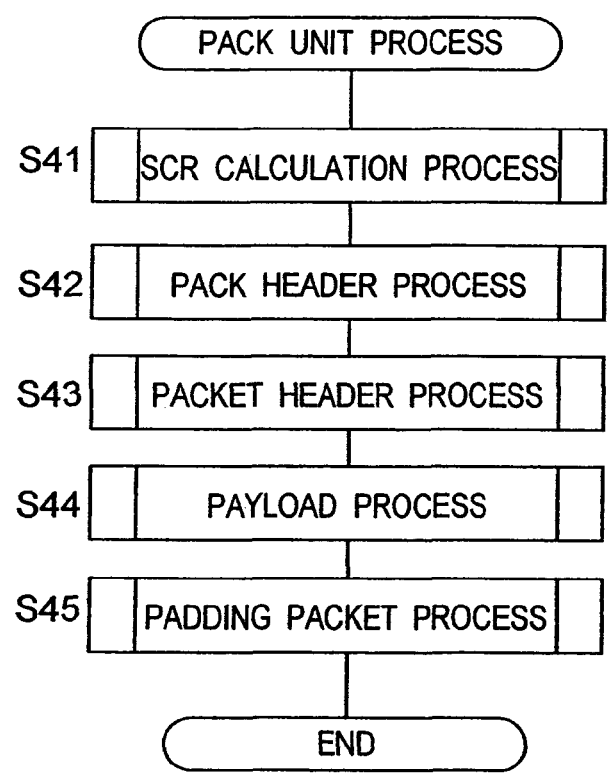
FIG. 71 is a flow chart of the pack unit process.

As shown in the flow chart in FIG. 71, the pack unit process includes an SCR calculation process (S41), pack header process (S42), packet header process (S43), payload process (S44), and padding packet process (S45). These processes are described below.

Figure 72:
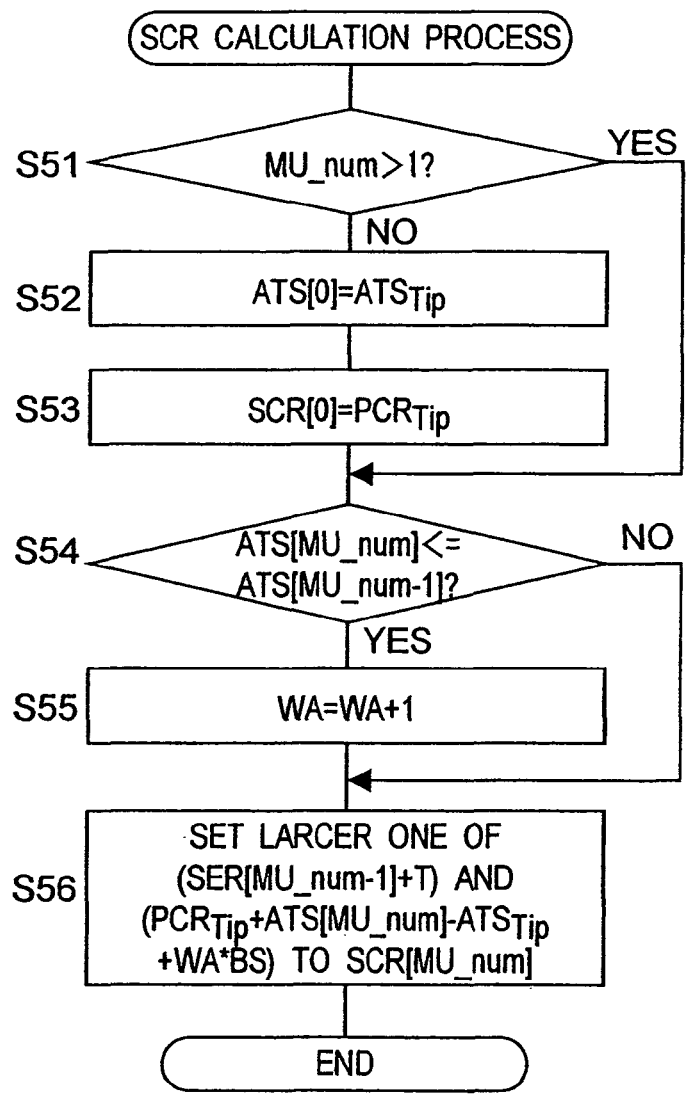
FIG. 72 is a flow chart of the SCR calculation process.

The SCR calculation process is described with reference to the flow chart in FIG. 72.

This process determines the SCR value of the pack. The first step is to determine whether the Multiplexing Unit is the first Multiplexing Unit in the SESF capsule by referencing variable MU_num (S51). If it is, the value of ATSTip is set to variable ATS[0] and the value of variable PCRTip is set to variable SCR[0] (S52-S53).

ATS[MU_num] and ATS[MU_num−1] are then compared (S55). The ATS value of the first packet in the Multiplexing Unit is stored to ATS[i], and this ATS value indicates the relative transfer timing referenced to a particular packet. Therefore, the ATS value of each subsequent packet is normally greater than the ATS value of the previous packet. However, because the ATS is generally limited to a finite value expressible with 30 bits, ATS overflow can occur. In this case the ATS value of a certain packet may be smaller than that of the preceding packet. Step S54 monitors this reversal of ATS values to determine when an ATS overflow occurs. If ATS[MU_num] is not greater than ATS[MU_num−1], that is, if an ATS overflow occurred, variable WA is incremented (S55).

The greater one of SCR[MU_num−1]+T and (PCRTIP+ATS[MU_num]−ATSTip+WA×BS) is then set to SCR[MU_num] (S56).

Figure 73:
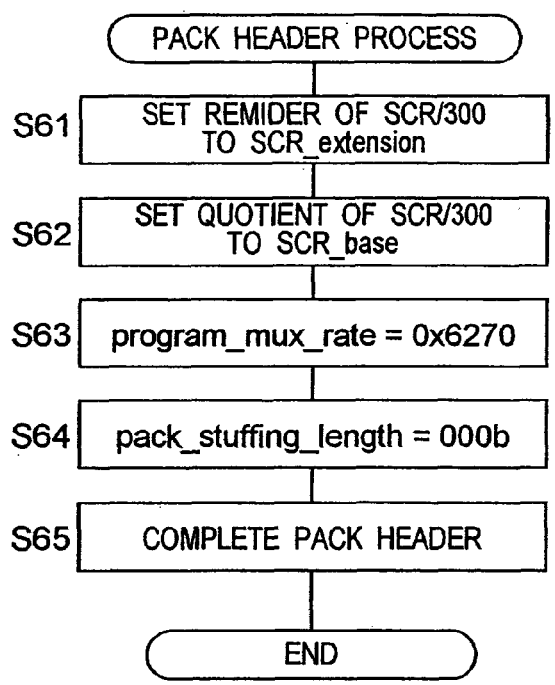
FIG. 73 is a flow chart of the pack header process.

The pack header process is described with reference to the flow chart in FIG. 73.

This process edits the pack header data in the data structure shown in FIG. 60. The remainder of the SCR divided by 300 is first inserted to SCR_extension (S61), and the quotient is set to SCR_base (S62). The program mux_rate is set to "0x6270" (S63), and pack_stuffing_length to "000b" (S64). Other fields are edited appropriately to complete the pack header data (S65).

Figure 74:
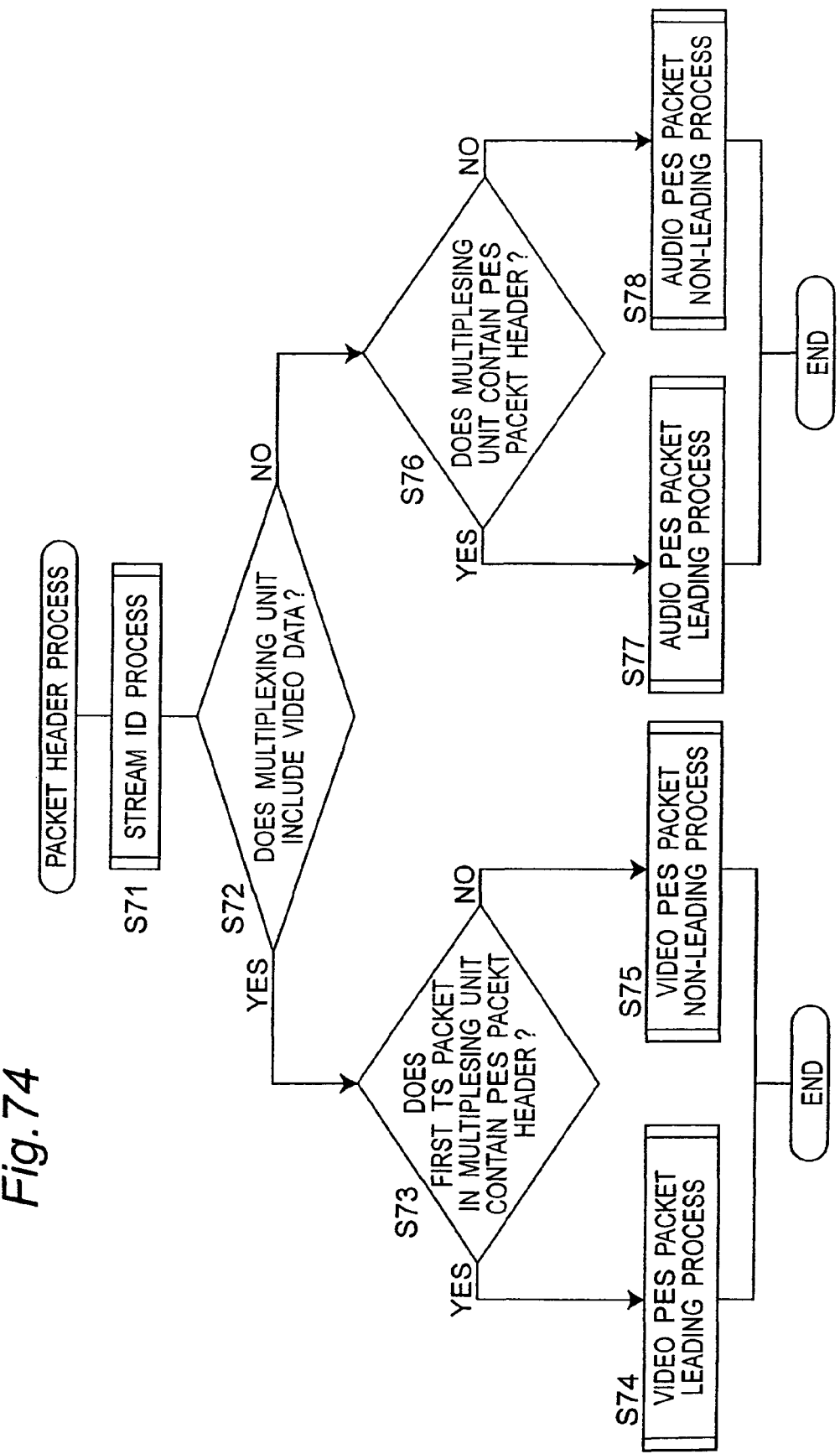
FIG. 74 is a flow chart of the packet header process.

The packet header process is described with reference to the flow chart in FIG. 74.

This process starts by running a stream ID process for setting the stream ID (S71). Whether Multiplexing Unit contains video data is then determined (S72). When Multiplexing Unit includes video data, it is determined whether the beginning TS packet in Multiplexing Unit includes PES packet header (S73). If the first TS packet of the Multiplexing Unit contains a PES packet header, a video PES packet leading process is run (S74), and a PES packet non-leading process is otherwise run (S75). Whether the first TS packet of the Multiplexing Unit contains a PES packet header can be determined by reading the payload_unit_start_indicator field of the TS packet header, or by directly detecting if a PES packet header start code is stored.

On the contrary, when Multiplexing Unit does not include video data, it is judged if Multiplexing Unit includes PES packet header (S76). When Multiplexing Unit includes PES packet header, audio PES packet leading process is performed (S77), otherwise audio PES packet non-leading process is performed (S78).

Figure 75:
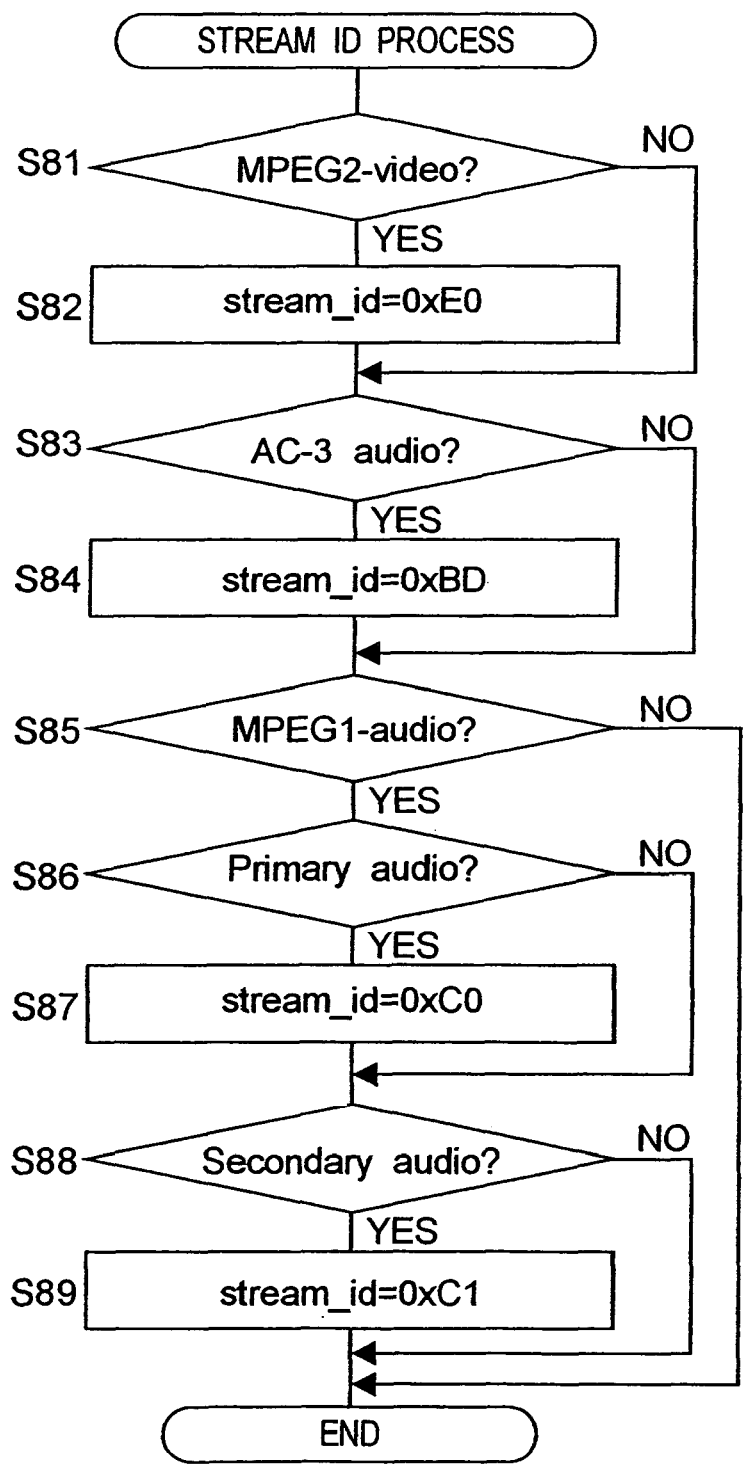
FIG. 75 is a flow chart of the stream ID process.

The stream ID process is described with reference to the flow chart in FIG. 75.

This process sets the value of the stream_id field. If the type of the stream being processed is "MPEG-2 Video", the stream_id is set to "0xE0" (S81, S82). If the stream type is "AC-3 audio", the stream_id is set to "0xBD" (S83, S84). If the stream type is "MPEG-1 Audio" and "primary audio", the stream_id is set to "0xC0" (S85, S86, S87). If the stream type is "MPEG-1 Audio" and "secondary audio", the stream_id is set to "0xC1" (S85, S88, S89).

Figure 76A:
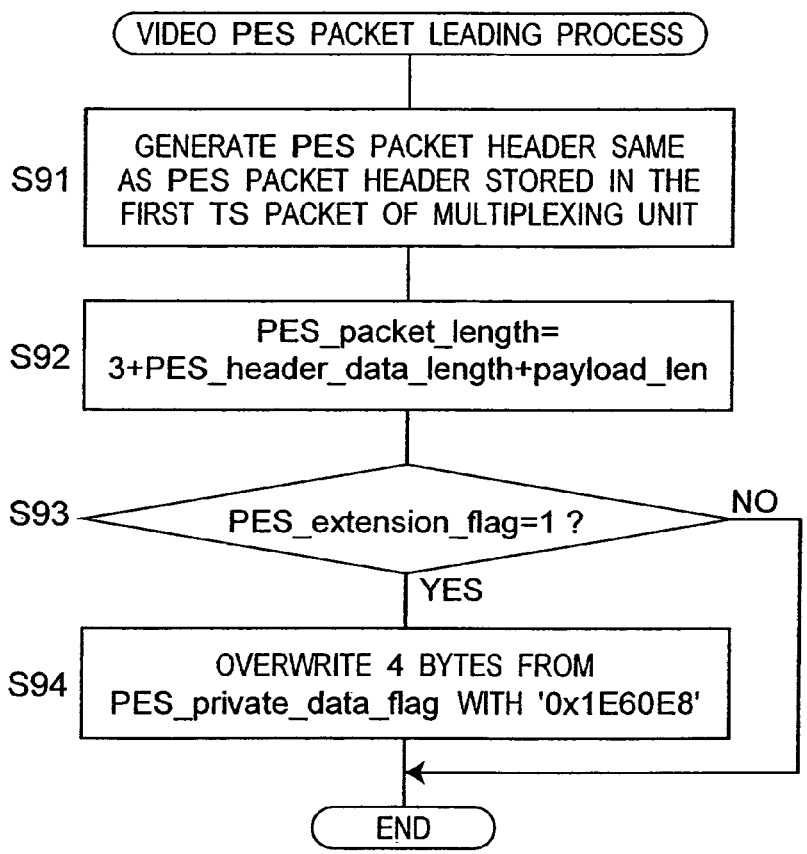
FIG. 76A is a flow chart of the video PES packet leading process.

The PES packet leading process is described with reference to the flow chart in FIG. 76A.

The structure of a PES packet according to the MPEG standard is shown in detail in FIG. 81. This process edits the PES packet fields according to the structure shown in FIG. 81.

First, PES packet header which is the same as the first PES packet header stored in TS packet at a head of Multiplexing Unit is generated as PES packet header of the converted MPEG-PS (S91). Next, PES_packet_length is set to the value determined by the following equation (S92).

$$PES\_packet\_length = (3 + PES\_header\_data\_length) + payload\_len$$

Then, it is determined whether PES_extension_flag is "1" (S93). When PES_extension_flag is "1", the 3 bytes from PES_private_data_flag to P_STD_buffer_size are overwritten with a predetermined value (0x1E60E8) (S94).

Figure 76B:
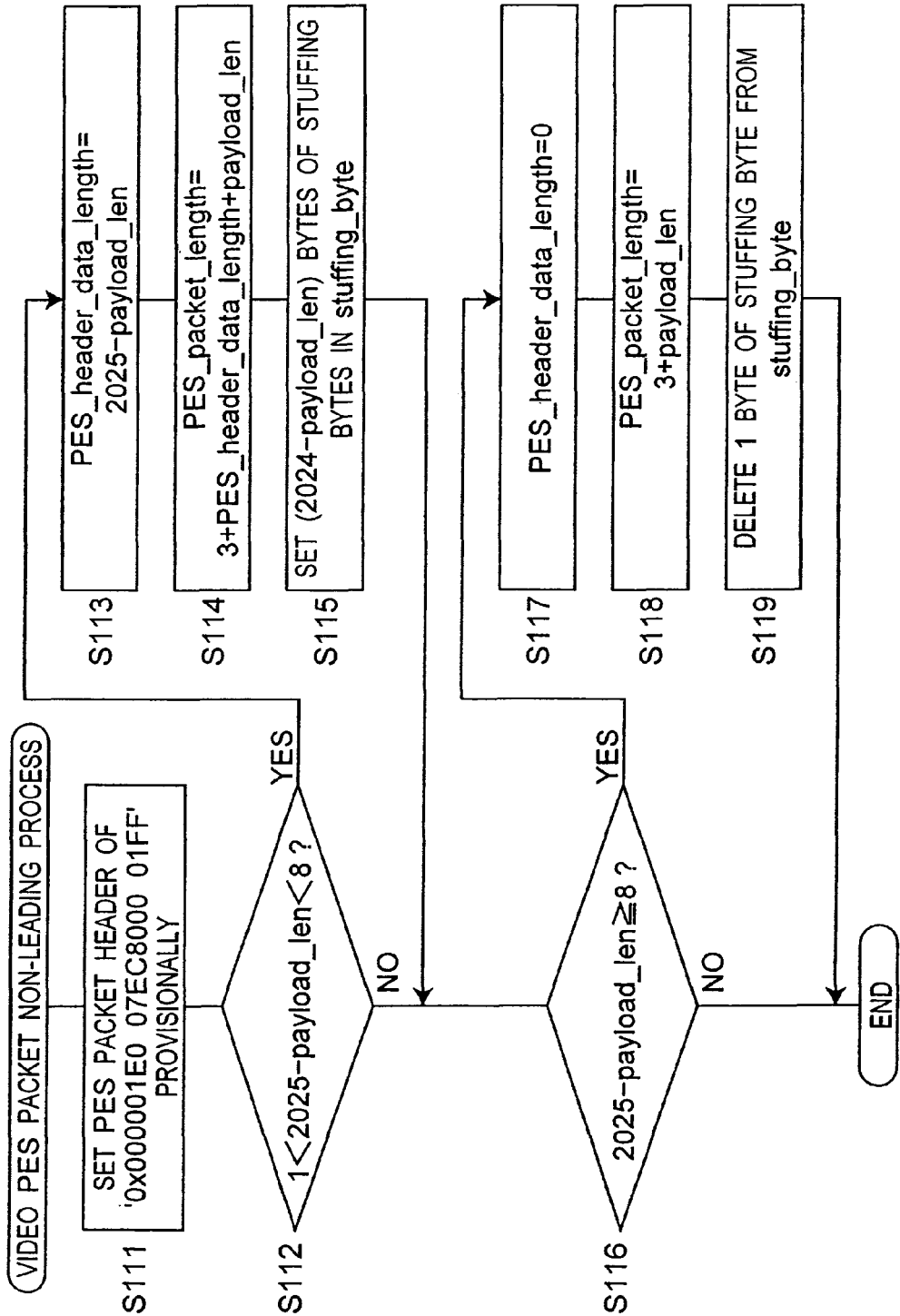
FIG. 76B is a flow chart of the video PES packet non-leading process.

The video PES packet non-leading process is described with reference to the flow chart in FIG. 76B.

The PES packet header is set to a provisional value (0x000001E0007EC800001FF) (S111). It is determined whether a value of (2025−payload_len) is between 1 and 8 (S112).

If the value of (2025−payload_len) is not less than 8, the control goes to Step S116.

If the value of (2025−payload_len) is between 1 and 8, PES_header_data_length is set to (2025−payload_len) (S113), and PES_packet_length is set to a value determined by the following equation (S114).

$$PES\_packet\_length = (3 + PES\_header\_data\_length) + payload\_len$$

Then, stuffing_byte is filled with stuffing bytes with a length of (2024−payload_len) bytes (S115), and the control goes to Step S116.

In Step S116, it is determined whether the value of (2025−payload_len) is not less than 8. If it is not less than 8, PES_header_data_length is set to 0 (S117), and PES_packet_length is set to a value determined by the following equation (S118).

$$PES\_packet\_length = 3 + payload\_len$$

Then, one byte of stuffing byte is removed from stuffing_byte (S119).

Figure 77A:
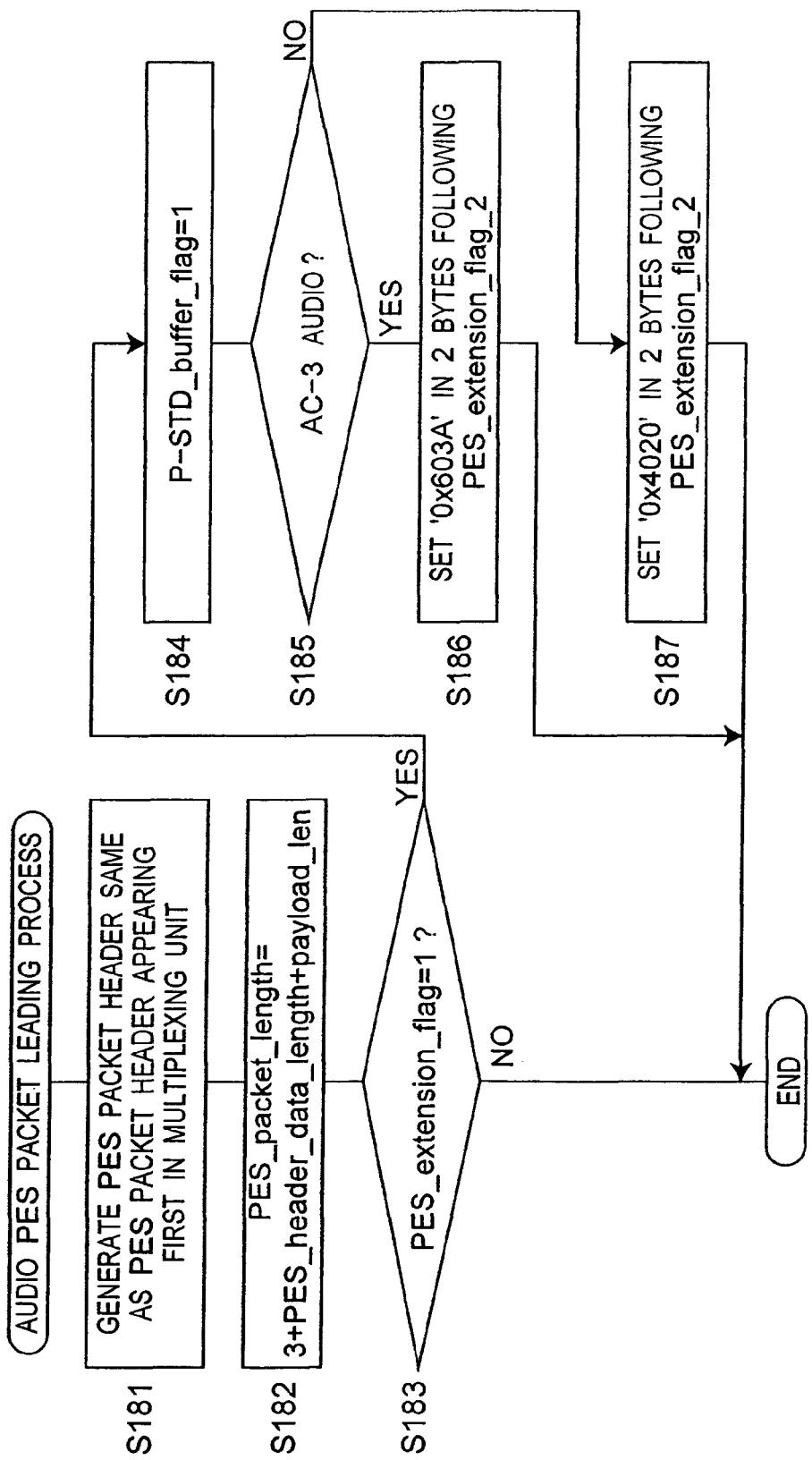
FIG. 77A is a flow chart of the audio PES packet leading process.

The audio PES packet leading process is described with reference to FIG. 77A.

First, PES packet header which is the same as PES packet header appearing first in Multiplexing Unit is generated as PES packet header of the converted MPEG-PS (S181). Next, PES_packet_length is set to the value determined by the following equation (S182).

$$PES\_packet\_length = (3 + PES\_header\_data\_length) + payload\_len$$

Then, it is determined whether PES_extension_flag is "1" (S183). If PES_extension_flag is "1", P_STD_buffer_flag is set to 1 (S184). Then it is determined whether the audio data is AC-3 audio (S185). If the audio data is AC-3 audio, the two bytes following PES_extension_flag_2 is set to a predetermined value (0x603A) (S186). If the audio data is not AC-3 audio, the two bytes following PES_extension_flag_2 is set to a predetermined value (0x4020) (S187).

The audio PES packet non-leading process is described with reference to FIG. 77B.

It is determined whether stream_id is "0xBD", that is, whether the audio data is AC-3 audio (S191). If stream_id is "0xBD", PES packet header is set to a provisional value (0x000001BD0000800004FFFFFFFF) (S192). Then PES_packet_length is set to a value determined by the following equation (S193).

$$PES\_packet\_length = 7 + payload\_len$$

If stream_id is not "0xBD", It is determined whether stream_id is "0xC0", that is, whether the audio data is MPEG-1 primary audio (S194). If the audio data is MPEG-1 primary audio, PES packet header is set to a provisional value (0x000001C00000800000) (S195). If not MPEG-1 primary audio, PES packet header is set to a provisional value (0x000001C10000800000) (S196). Then PES_packet_length is set to a value determined by the following equation (S197).

$$PES\_packet\_length = 3 + payload\_len$$

Figure 78:
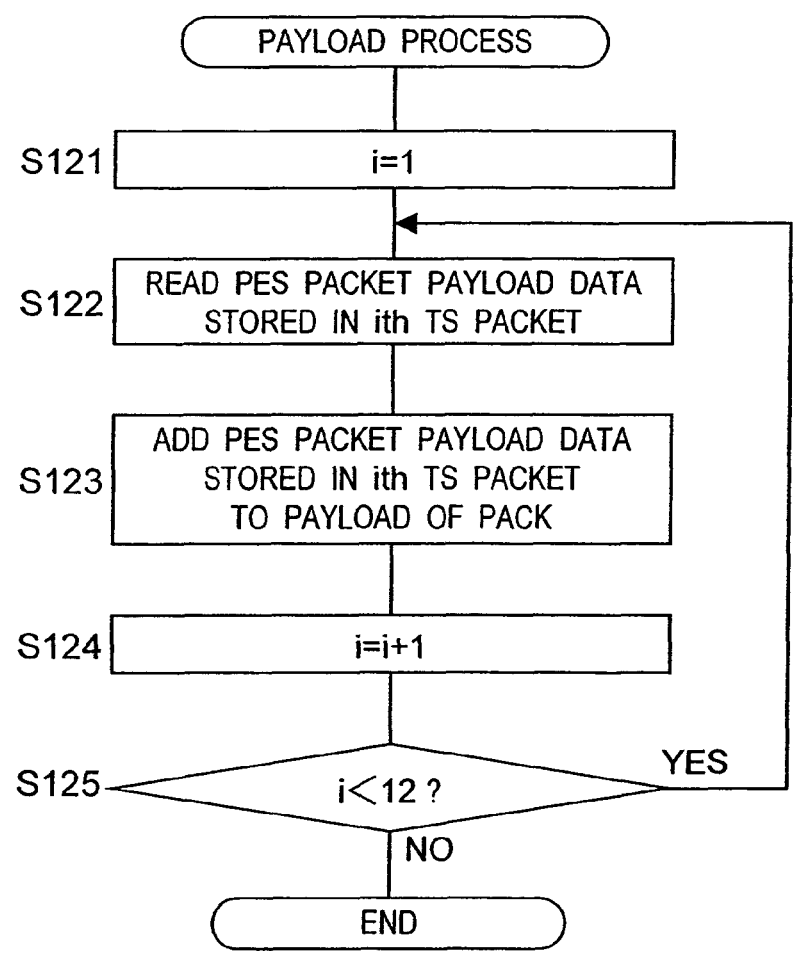
FIG. 78 is a flow chart of the payload process.

The payload process is described with reference to the flow chart in FIG. 78.

Variable i is set first (S121), and the payload data of the PES packet stored to the i-th TS packet is read (S122). The payload data of the PES packet stored to the i-th TS packet is then added to the payload of the pack (S123) and variable i is incremented (S124). These steps repeat until variable i is greater than 12 (S125). That is, this process repeats until all TS packets contained in one Multiplexing Unit are processed (S122 to S125).

Figure 79:
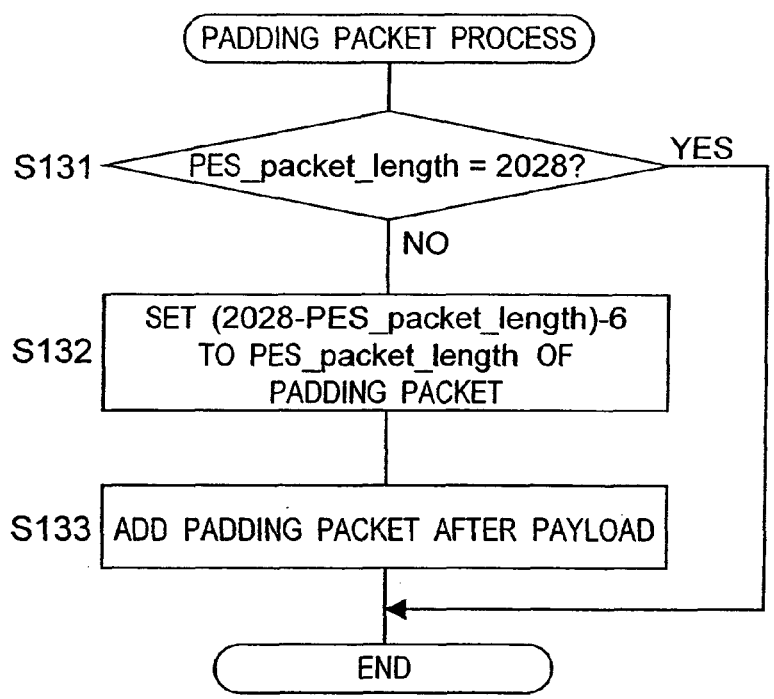
FIG. 79 is a flow chart of the padding packet process.

The padding packet process is described with reference to the flow chart in FIG. 79.

Whether the PES_packet_length is set to 2028 is determined (S131). If PES_packet_length is not 2028, PES_packet_length of the padding packet is set to {(2028−PES_packet_length)−6} (S132), and padding packets are added after the payload (S133).

PTS described in PES packet of MPEG-2 converted in the manner as explained above can be set with reference to PES packet header appearing first in Multiplexing Unit (see FIGS. 83A and 83B).

Furthermore, because the PES_packet_length indicating the length of the video PES packet is set to 0 above, there is a problem that the PES_packet_length of the packet header after conversion to a pack cannot be determined until data writing to the pack completes. The PES_packet_length for each video PES packet in the SESF capsule can be written to the Tip packet. The PES_packet_length can therefore be determined by sequential processing of TS packet units, and conversion can proceed even more quickly.

Furthermore, the pack header (SCR) is described above as calculated during TS2PS conversion, but the pack header can be previously stored to the PES packet header stored in the MPEG_TS. For example, the pack header after TS2PS conversion could be stored to the PES packet header with a pack_header_field_flag in the PES packet header set to 1b. The data stored to the pack storing the pack header includes the data stored in packets from the TS packet to a TS packet determined by a specific rule (for example, a specific number to TS packets).

(Constraint of Video Picture in Continuous STC Section)

As shown in FIG. 84A, in a continuous STC (system target decoder reference time clock) section, a video picture (Pf) which is presented first in the first complete SESF capsule may be a top field, and a video picture (Pl) which is presented last in the last complete SESF capsule may be a bottom field. FIG. 84B shows a case not satisfying this rule, in which a video picture (Pf) which is presented first in the first complete SESF capsule is a bottom field, while a video picture (Pl) which is presented last in the last complete SESF capsule is a top field. The reason why a manner of presenting video picture is constrained as described above in a continuous section of a complete SESF capsule is because re-encoding of video stream on conversion of DVD-Video into VOB (if no edition of recorded stream occurs) can be prevented. This is because DVD standard requires that video data in one VOB is reproduced starting at the top field and ending at the bottom field.

The above constraint is one of constraints of the constrained SESF, and thus it is possible to judge if the above constraint is satisfied by referring to encode_condition flag. That is, reference of this flag makes it possible to judge that, in a continuous STC section, a video picture which is presented first in the first complete SESF capsule is a top field and a video picture which is presented last in the last complete SESF capsule is a bottom field.

Figure 85:
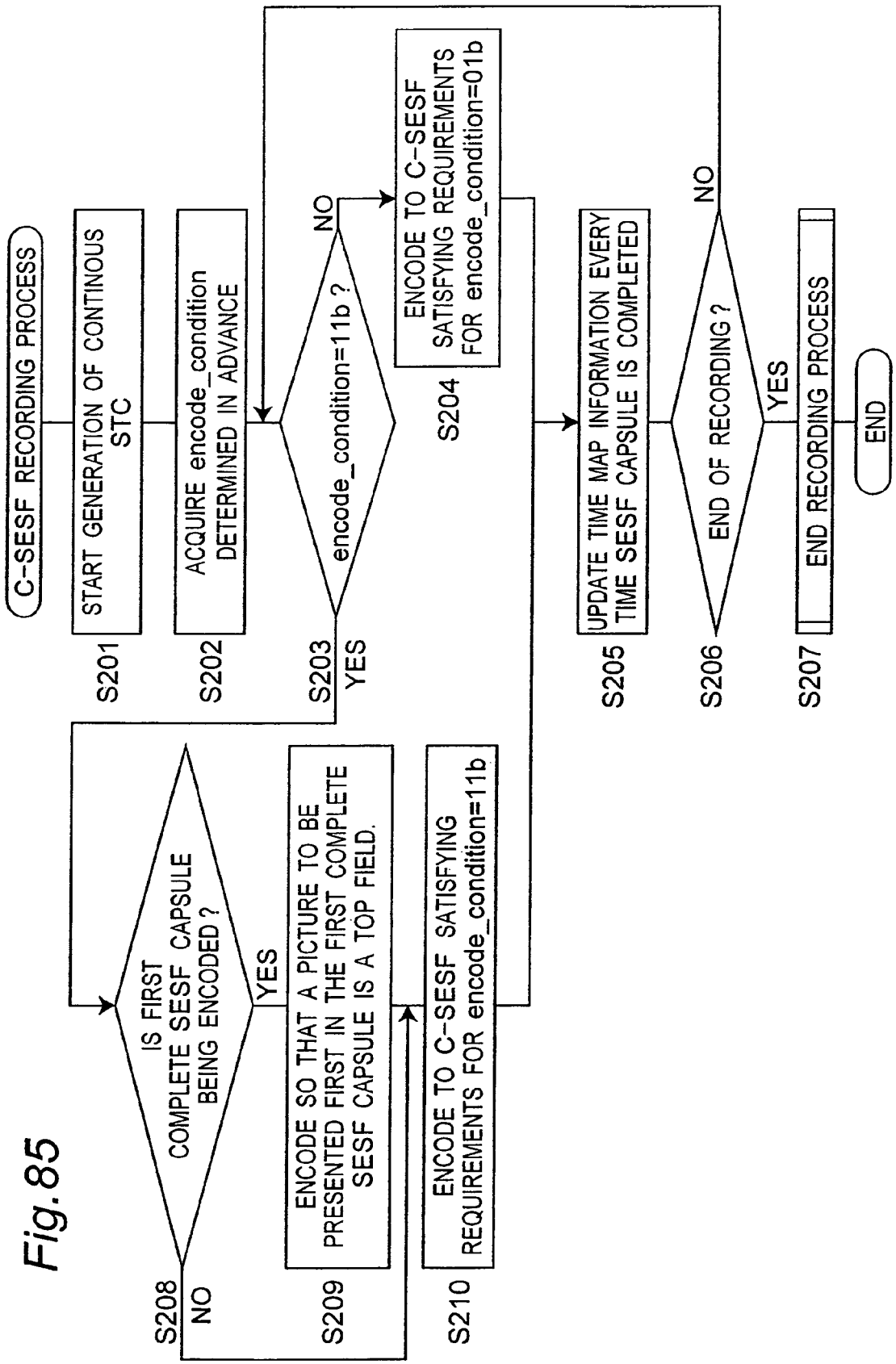
FIG. 85 is a flow chart of the recording process according to Constrained SESF provided with constraints for a top field and a bottom field.

FIG. 85 is a flowchart of recording process according to the constrained SESF provided with the above constraint.

First, generation of a continuous STC is started (S201). Next, a value of preset encode_condition is acquired (S202). The value of encode_condition is set in advance at an initial setting for user and recorder, and so on. It is determined whether encode_condition is "11b" (S203). When encode_condition is "11b" (recording in DVD-Video mode), it is determined whether the first complete SESF Capsule is being encoded (S208). When the first complete SESF Capsule is being encoded, encoding process is done so that a picture to be presented first in the first complete SESF Capsule is a top field (S209). Subsequently, the data is encoded as the constrained SESF to satisfy requirements for encode_condition which is "11b" (S210).

When encode_condition is "01b" (recording in DVD-Video Recording mode), the data is encoded as the constrained SESF to satisfy requirements for encode_condition which is "01b" (S204).

Subsequently, time map information is updated every time the SESF Capsule is completed (S205). It is determined whether the recording ends (S206). When the recording ends, an end recording process is performed (S207). Until the recording ends, the above steps S203 to S205 are repeated.

Figure 86:
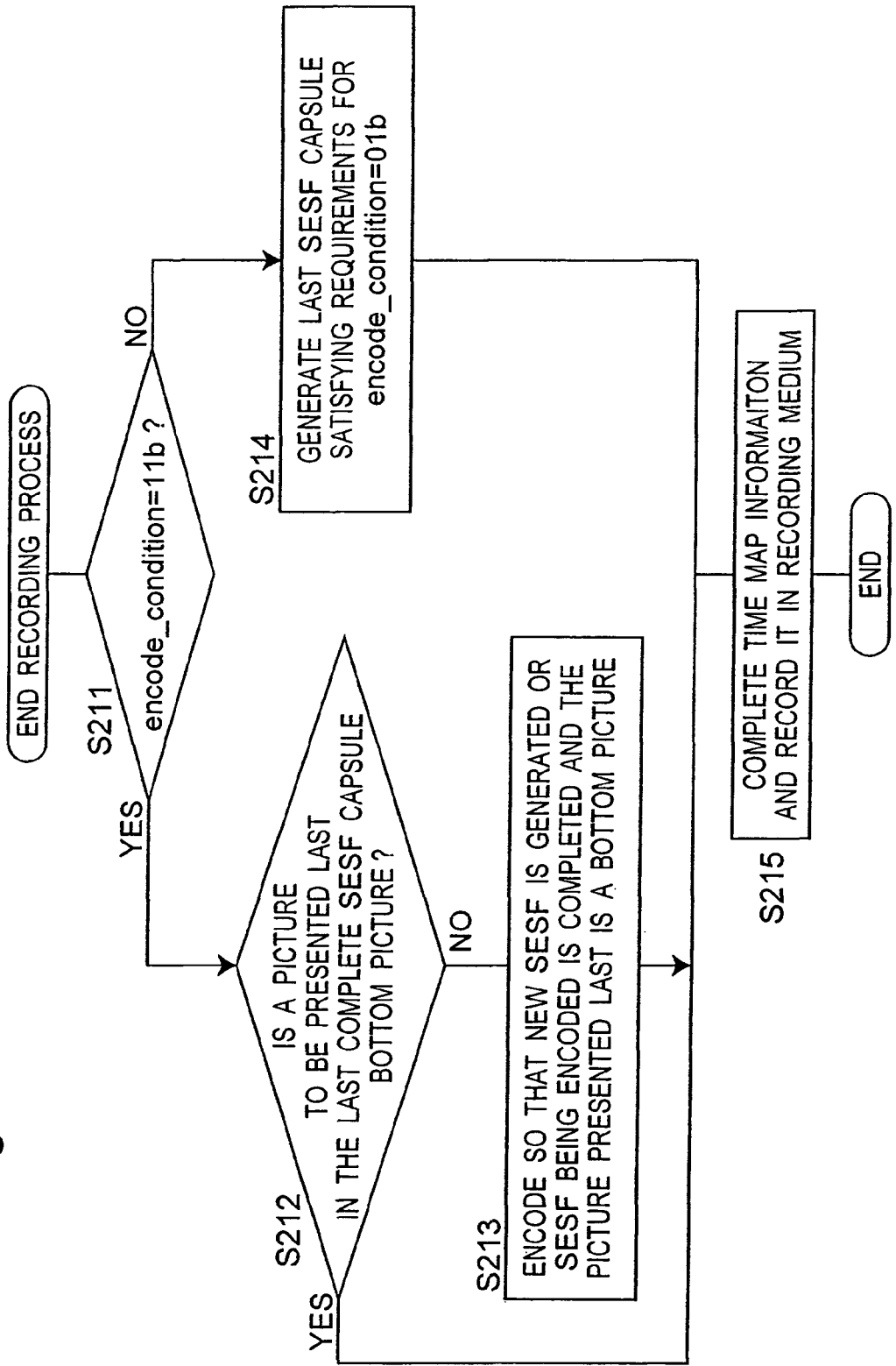
FIG. 86 is a flow chart of the end recording process.

The end recording process is described with reference to FIG. 86.

It is determined whether encode_condition is "11b" (S211). When encode_condition is "11b", it is determined whether a picture to be presented last in the last complete SESF Capsule is a bottom picture (S212). When the picture is not a bottom picture, encoding process is performed so that new SESF is generated or SESF which is being encoded is completed and that the picture presented last is a bottom picture (S213).

When encode_condition is not "11b", the last SESF capsule to satisfy requirements for encode_condition which is "01b" is generated (encoding is terminated) (S214).

Subsequently, time map information is completed and recorded in the recording medium (S215).

Although in the above description, inverse conversion from MPEG-PS to MPEG-TS is not described, it can be similarly considered as inversion of TS2PS conversion.

For example, it can be considered that one PS pack is converted to a plurality of continuous TS packets, increment of ATS between the plurality of continuous TS packets is fixed value, and such information is stored in a disk or stream.

When titles of clips of MPEG-PS (program information indicating contents, etc.) are stored in SIT packet and are converted to MPEG-TS, it becomes possible to display original program titles by a decoder such as STB.

When self-encoding externally input AV data to an MPEG transport stream format, the data recording apparatus and method of the invention described above can thus efficiently encode and decode the streams while maintaining decoder compatibility.

Furthermore, because user private data can be stored to the streams recorded to the data recording medium, the added value of recorded content in the MPEG transport stream format can be increased.

Moreover, because the stream is multiplexed in block units of 2 KB or less so that an MPEG_TS recorded to a data recording medium can be efficiently and easily converted to an MPEG_PS, the MPEG_TS can be very easily converted to an MPEG_PS without considering buffer management.

It is understood that the data processing according to the present invention described above can be achieved by a computer executing specific programs. The programs can be stored in an information recording medium readable from the computer such as floppy disk, hard disk, and CD-ROM.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom. The present disclosure relates to subject matter contained in Japanese Patent Application No. 2003-106399, filed on Apr. 10, 2003, which is expressly incorporated herein by reference in its entirety.

The invention claimed is:

1. An information recording apparatus for encoding a video elementary stream generating by encoding video information and an audio elementary stream generated by encoding audio information into a stream and recording the stream to a recording medium,
the stream being convertible from a constrained format of a first format (TS), by which the video elementary stream and the audio elementary stream are encoded, to a second format (PS),
the information recording apparatus comprising:
an encoding section operable to perform system-encoding by multiplexing the video elementary stream and the audio elementary stream to generate the stream according to the constrained format of the first format (TS); and
a control section operable to control the encoding section, wherein the first format (TS) has a packet structure for storing data segmented into packets, the second format (PS) has a pack structure for storing data segmented into packs, the constrained format includes a plurality of SESF capsules each including a plurality of packets,
according to the constrained format, in a continuous system time clock (STC) section, a video picture that is presented first in a first complete SESF capsule is always a top field and a video picture that is presented last in the first complete SESF capsule is always a bottom field, and
the first format (TS) is a transport stream format and the second format (PS) is a program stream format.

2. The information recording apparatus of claim 1 for further recording management information to the recording medium, wherein
the management information includes first encode information,
the first encode information indicates that, in a continuous STC section, a video picture that is presented first in a first complete SESF capsule is a top field and a video picture that is presented last in the first complete SESF capsule is a bottom field,
each SESF capsule includes a tip packet and the tip packet includes second encode information, and
the second encode information indicates that, in a continuous STC section, a video picture that is presented first in a first complete SESF capsule is a top field and a video picture that is presented last in the first complete SESF capsule is a bottom field.

3. The information recording apparatus of claim 2, wherein the first and second encode information are used for converting from the first format (TS) to the second format (PS).

4. The information recording apparatus of claim 1, wherein each SESF capsule includes a plurality of multiplexing units and each multiplexing unit has a predetermined size or less.

5. An information recording method for encoding a video elementary stream generating by encoding video information and an audio elementary stream generated by encoding audio information into a stream and recording the stream to a recording medium, the stream being convertible from a constrained format of a first format (TS), by which the video elementary stream and the audio elementary stream are encoded, to a second format (PS), the information recording method comprising:

performing system-encoding by multiplexing the video elementary stream and the audio elementary stream to generate the stream according to the constrained format of the first format (TS), wherein the first format (TS) has a packet structure for storing data segmented into packets, the second format (PS) has a pack structure for storing data segmented into packs, the constrained format includes a plurality of SESF capsules each including a plurality of packets, according to the constrained format, in a continuous system time clock (STC) section, a video picture that is presented first in a first complete SESF capsule is always a top field and a video picture that is presented last in the first complete SESF capsule is always a bottom field, and the first format (TS) is a transport stream format and the second format (PS) is a program stream format.

6. The information recording method of claim 5 for further recording management information to the recording medium, wherein the management information includes first encode information, the first encode information indicates that, in a continuous STC section, a video picture that is presented first in a first complete SESF capsule is a top field and a video picture that is presented last in the first complete SESF capsule is a bottom field, each SESF capsule includes a tip packet and the tip packet includes second encode information, and the second encode information indicates that, in a continuous STC section, a video picture that is presented first in a first complete SESF capsule is a top field and a video picture that is presented last in the first complete SESF capsule is a bottom field.

7. The information recording method of claim 6, wherein the first and second encode information are used for converting from the first format (TS) to the second format (PS).

8. The information recording method of claim 5, wherein each SESF capsule includes a plurality of multiplexing units and each multiplexing unit has a predetermined size or less.

* * * * *